United States Patent
Holman et al.

(10) Patent No.: US 9,167,376 B2
(45) Date of Patent: *Oct. 20, 2015

(54) SYSTEMS AND METHODS FOR SELECTING FOR USAGE ONE OR MORE FUNCTIONAL DEVICES DETECTED WITHIN A COMMUNICATION RANGE OF A WEARABLE COMPUTING DEVICE

(71) Applicant: Elwha LLC, Bellevue, WA (US)

(72) Inventors: Pablos Holman, Seattle, WA (US); Roderick A. Hyde, Redmond, WA (US); Royce A. Levien, Lexington, MA (US); Richard T. Lord, Tacoma, WA (US); Robert W. Lord, Seattle, WA (US); Mark A. Malamud, Seattle, WA (US); Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 46 days.

This patent is subject to a terminal disclaimer.

(21) Appl. No.: 14/059,036

(22) Filed: Oct. 21, 2013

(65) Prior Publication Data
US 2015/0031297 A1   Jan. 29, 2015

Related U.S. Application Data

(63) Continuation of application No. 14/057,082, filed on Oct. 18, 2013, which is a continuation-in-part of application No. 13/950,926, filed on Jul. 25, 2013, and a continuation-in-part of application No. 13/962,373, (Continued)

(51) Int. Cl.
*H04B 7/00* (2006.01)
*H04W 4/00* (2009.01)
*H04W 8/00* (2009.01)
*H04W 84/18* (2009.01)

(52) U.S. Cl.
CPC .............. *H04W 4/008* (2013.01); *H04W 8/005* (2013.01); *H04W 84/18* (2013.01)

(58) Field of Classification Search
CPC ......... H04B 1/385; H04B 7/26; H04W 4/008; H04W 8/005
USPC .................. 455/41.1, 41.2, 63.4, 66.1, 550.1, 455/556.1, 557, 134, 135, 334, 522
See application file for complete search history.

(56) References Cited

U.S. PATENT DOCUMENTS

| 6,711,414 | B1 | 3/2004 | Lightman et al. |
| 6,771,224 | B2 | 8/2004 | Apostolos |
| 6,995,723 | B1 | 2/2006 | Adams |

(Continued)

OTHER PUBLICATIONS

Brown, Michael, "Meet 60GHz Wi-Fi, the insanely fast future of wireless networking," PC World, Mar. 6, 2013, 4 pages, http://www.pcworld.com/article/2030041/meet-60ghz-wi-fi-the-insanely-fast-future-of-wireless-networking.html.

(Continued)

*Primary Examiner* — Tuan Pham

(57) ABSTRACT

Computationally implemented methods and systems include detecting presence of a plurality of functional devices within the communication range of a wearable computing device; and selecting, from the plurality of functional devices, one or more functional devices for providing to the wearable computing device one or more functionalities. In addition to the foregoing, other aspects are described in the claims, drawings, and text.

41 Claims, 30 Drawing Sheets

Related U.S. Application Data filed on Aug. 8, 2013, which is a continuation of application No. 13/961,187, filed on Aug. 7, 2013, application No. 14/057,082, which is a continuation-in-part of application No. 14/017,693, filed on Sep. 4, 2013, which is a continuation of application No. 14/014,882, filed on Aug. 30, 2013, application No. 14/057,082, which is a continuation-in-part of application No. 14/044,576, filed on Oct. 2, 2013, which is a continuation of application No. 14/043,395, filed on Oct. 1, 2013.

(56) References Cited

U.S. PATENT DOCUMENTS

| | | | |
|---|---|---|---|
| 7,500,747 B2 | 3/2009 | Howell et al. | |
| 7,715,873 B1* | 5/2010 | Biere et al. | 455/557 |
| 7,929,914 B2 | 4/2011 | Tegreene | |
| 8,184,983 B1 | 5/2012 | Ho et al. | |
| 8,340,658 B2 | 12/2012 | Tsui et al. | |
| 8,430,310 B1 | 4/2013 | Ho et al. | |
| 8,442,542 B2 | 5/2013 | Brisebois et al. | |
| 8,489,546 B2 | 7/2013 | Rappaport | |
| 8,493,353 B2 | 7/2013 | Blanchflower et al. | |
| 8,493,849 B2 | 7/2013 | Fuste Vilella et al. | |
| 2002/0142734 A1 | 10/2002 | Wickstead | |
| 2009/0069045 A1 | 3/2009 | Cheng | |
| 2012/0194399 A1 | 8/2012 | Bily et al. | |
| 2012/0195464 A1 | 8/2012 | Ahn | |
| 2012/0250615 A1 | 10/2012 | Gupta et al. | |
| 2013/0044130 A1* | 2/2013 | Geisner et al. | 345/633 |
| 2013/0080616 A1 | 3/2013 | Tsui et al. | |
| 2013/0165138 A1 | 6/2013 | Bahl et al. | |
| 2014/0241540 A1* | 8/2014 | Hodges et al. | 381/74 |
| 2015/0031286 A1* | 1/2015 | Holman et al. | 455/39 |
| 2015/0031290 A1* | 1/2015 | Holman et al. | 455/41.2 |
| 2015/0031291 A1* | 1/2015 | Holman et al. | 455/41.2 |
| 2015/0031292 A1* | 1/2015 | Holman et al. | 455/41.2 |
| 2015/0031293 A1* | 1/2015 | Holman et al. | 455/41.2 |
| 2015/0031294 A1* | 1/2015 | Holman et al. | 455/41.2 |
| 2015/0031295 A1* | 1/2015 | Holman et al. | 455/41.2 |
| 2015/0031296 A1* | 1/2015 | Holman et al. | 455/41.2 |
| 2015/0031297 A1 | 1/2015 | Holman et al. | |
| 2015/0031298 A1 | 1/2015 | Holman et al. | |
| 2015/0031299 A1 | 1/2015 | Holman et al. | |
| 2015/0031300 A1 | 1/2015 | Holman et al. | |
| 2015/0031301 A1 | 1/2015 | Holman et al. | |

OTHER PUBLICATIONS

Experton Group, "Bluetooth to Decide on 60GHZ Standard this Month," Experton Group, Apr. 19, 2010, 1 page, http://www.experton-group.com/nc/home/itnews/itnewsarticle/article/bluetooth-to-decide-on-60ghz-standard-this-month.html.

mmWAVES, "60GHz Wireless Technology Overview," 2013, 4 pages, http://www.mmwaves.com/products.cfm/product/20-194-0.htm, accessed Jul. 25, 2013.

Stevens et al., "White Paper: The Benefits of 60 GHz Unlicensed Wireless Communications," Dec. 2011, 10 pages, Sub10 Systems Limited, http://www.sub10systems.com/wp-content/uploads/2011/03/White-Paper-Benefits-of-60GHz.pdf.

University of California, Berkely, "60 GHz Short-Range Wireless Communication," Connectivity Lab, Feb. 2008, 1 page, http://connectivitylab.eecs.berkeley.edu/brochures/60ghz.pdf.

PCT International Search Report; International App. No.: PCT/US2014/048167; Nov. 4, 2014; pp. 1-3.

* cited by examiner

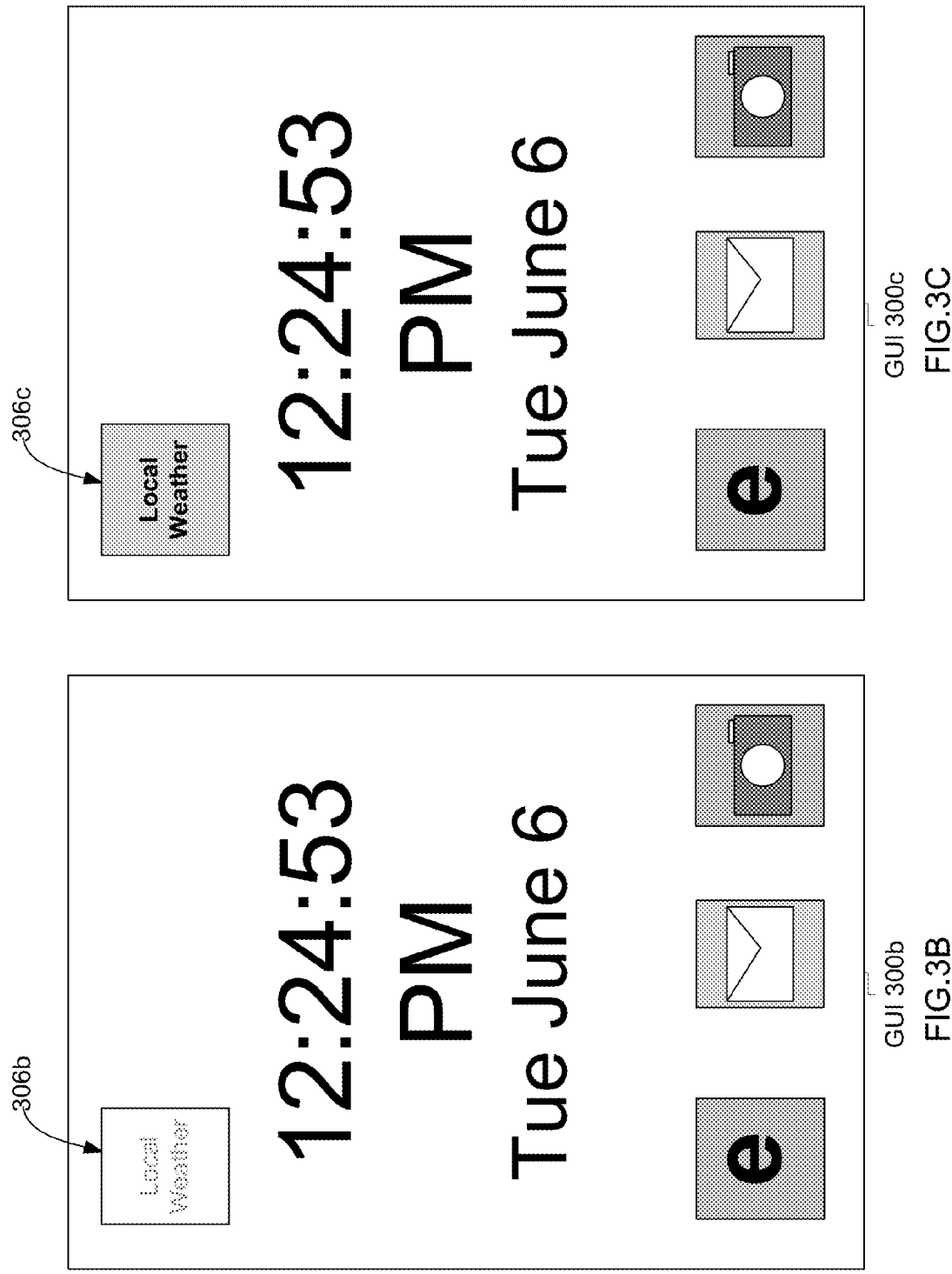

102* Functional Device Presence Sensing Module

502 Low-Power Prompting Signal Broadcasting Device Directing Module
  506 Transmitting Antenna Controlling Module

504 Responsive Signal Monitoring Device Directing Module
  508 Receiving Antenna Controlling Module

510 Beacon Signals Detecting Device Controlling Module

512 Power Optimal Functional Device Ascertaining Module
  514 Signal Strength Ascertaining Module

516 Functional Device Relative Location Ascertaining Module
  518 Directional Antenna Control Module

520 Low-Power Query Signal Transmit Directing Module

530 Confirmation Signal Monitor Directing Module

FIG. 5A

**104\* Functional Device Choosing Module**

540 Least Communication Power Requirement Determining Module

542 Earliest Functionality Access Determining Module

544 Relative Device Location Determining Module

546 Commonly Associated User Determining Module

548 Highest Data Transfer Rate Determining Module

550 Application Access Determining Module

552 Sensor Data Based Functional Device Choosing Module

554 Communication Link Providing Device Choosing Module

556 Sensor Functionality Providing Device Choosing Module

FIG. 5B

SYSTEMS AND METHODS FOR SELECTING FOR USAGE ONE OR MORE FUNCTIONAL DEVICES DETECTED WITHIN A COMMUNICATION RANGE OF A WEARABLE COMPUTING DEVICE

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation of U.S. patent application Ser. No. 14/057,082, entitled SYSTEMS AND METHODS FOR SELECTING FOR USAGE ONE OR MORE FUNCTIONAL DEVICES DETECTED WITHIN A COMMUNICATION RANGE OF A WEARABLE COMPUTING DEVICE, naming PABLOS HOLMAN; RODERICK A. HYDE; ROYCE A. LEVIEN; RICHARD T. LORD; ROBERT W. LORD; MARK A. MALAMUD; CLARENCE T. TEGREENE as inventors, filed 18 Oct. 2013, which is currently co-pending or is an application of which a currently co-pending application is entitled to the benefit of the filing date.

The present application constitutes a continuation-in-part of U.S. patent application Ser. No. 13/950,926, entitled SYSTEMS AND METHODS FOR PROVIDING ONE OR MORE FUNCTIONALITIES TO A WEARABLE COMPUTING DEVICE WITH SMALL FORM FACTOR, naming Pablos Holman, Roderick A. Hyde; Royce A. Levien; Richard T. Lord; Robert W. Lord; Mark A. Malamud; Clarence T. Tegreene as inventors, filed 25 Jul. 2013, which is currently co-pending or is an application of which a currently co-pending application is entitled to the benefit of the filing date.

The present application constitutes a continuation-in-part of U.S. patent application Ser. No. 13/962,373, entitled SYSTEMS AND METHODS FOR PROVIDING ONE OR MORE FUNCTIONALITIES TO A WEARABLE COMPUTING DEVICE, naming Pablos Holman, Roderick A. Hyde; Royce A. Levien; Richard T. Lord; Robert W. Lord; Mark A. Malamud; Clarence T. Tegreene as inventors, filed 8 Aug. 2013, which is currently co-pending or is an application of which a currently co-pending application is entitled to the benefit of the filing date, and which is a continuation of U.S. patent application Ser. No. 13/961,187, entitled SYSTEMS AND METHODS FOR PROVIDING ONE OR MORE FUNCTIONALITIES TO A WEARABLE COMPUTING DEVICE, naming Pablos Holman, Roderick A. Hyde; Royce A. Levien; Richard T. Lord; Robert W. Lord; Mark A. Malamud; Clarence T. Tegreene as inventors, filed 7 Aug. 2013.

The present application constitutes a continuation-in-part of U.S. patent application Ser. No. 14/017,693, entitled SYSTEMS AND METHODS FOR PROVIDING ONE OR MORE FUNCTIONALITIES TO A WEARABLE COMPUTING DEVICE WITH DIRECTIONAL ANTENNA, naming Pablos Holman, Roderick A. Hyde; Royce A. Levien; Richard T. Lord; Robert W. Lord; Mark A. Malamud; Clarence T. Tegreene as inventors, filed 4 Sep. 2013, which is currently co-pending or is an application of which a currently co-pending application is entitled to the benefit of the filing date, and which is a continuation of U.S. patent application Ser. No. 14/014,882, entitled SYSTEMS AND METHODS FOR PROVIDING ONE OR MORE FUNCTIONALITIES TO A WEARABLE COMPUTING DEVICE WITH DIRECTIONAL ANTENNA, naming Pablos Holman, Roderick A. Hyde; Royce A. Levien; Richard T. Lord; Robert W. Lord; Mark A. Malamud; Clarence T. Tegreene as inventors, filed 30 Aug. 2013.

The present application constitutes a continuation-in-part of U.S. patent application Ser. No. 14/044,576, entitled SYSTEMS AND METHODS FOR COMMUNICATING BEYOND COMMUNICATION RANGE OF A WEARABLE COMPUTING DEVICE, naming Pablos Holman, Roderick A. Hyde; Royce A. Levien; Richard T. Lord; Robert W. Lord; Mark A. Malamud; Clarence T. Tegreene as inventors, filed 2 Oct. 2013, which is currently co-pending or is an application of which a currently co-pending application is entitled to the benefit of the filing date, and which is a continuation of U.S. patent application Ser. No. 14/043,395, entitled SYSTEMS AND METHODS FOR COMMUNICATING BEYOND COMMUNICATION RANGE OF A WEARABLE COMPUTING DEVICE, naming Pablos Holman, Roderick A. Hyde; Royce A. Levien; Richard T. Lord; Robert W. Lord; Mark A. Malamud; Clarence T. Tegreene as inventors, filed 1 Oct. 2013.

RELATED APPLICATIONS

None as of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one or more various aspects, a method includes, but is not limited to, detecting presence of a plurality of functional devices within communication range of a wearable computing device, the communication range being a spatial volume that includes the wearable computing device and being externally defined by an enveloping boundary, where low-power signals transmitted by the wearable computing device being discernible over background noise within the enveloping boundary and not discernible over background noise outside the enveloping boundary, and selecting, from the plurality of functional devices, one or more functional devices for providing to the wearable computing device one or more functionalities. In various implementations, at least one of the detecting or selecting is performed by a machine or article of manufacture. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for detecting presence of a plurality of functional devices within communication range of a wearable computing device, the communication range being a spatial volume that includes the wearable computing device and being externally defined by an enveloping boundary, where low-power signals transmitted by the wearable computing device being discernible over background noise within the enveloping boundary and not discernible over background noise outside the enveloping boundary, and means for selecting, from the plurality of functional devices, one or more functional devices for providing to the wearable computing device one or more functionalities. In addition to the foregoing, other system aspects are described in the claims, drawings, and text forming a part of the disclosure set forth herein.

In one or more various aspects, a system includes, but is not limited to, circuitry for detecting presence of a plurality of functional devices within communication range of a wearable computing device, the communication range being a spatial volume that includes the wearable computing device and being externally defined by an enveloping boundary, where low-power signals transmitted by the wearable computing device being discernible over background noise within the enveloping boundary and not discernible over background noise outside the enveloping boundary, and circuitry for selecting, from the plurality of functional devices, one or more functional devices for providing to the wearable computing device one or more functionalities. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, detecting presence of a plurality of functional devices within communication range of a wearable computing device, the communication range being a spatial volume that includes the wearable computing device and being externally defined by an enveloping boundary, where low-power signals transmitted by the wearable computing device being discernible over background noise within the enveloping boundary and not discernible over background noise outside the enveloping boundary, selecting, from the plurality of functional devices, one or more functional devices for providing to the wearable computing device one or more functionalities, and selecting, from the plurality of functional devices, one or more functional devices for providing to the wearable computing device one or more functionalities. In addition to the foregoing, other computer program product aspects are described in the claims, drawings, and text forming a part of the disclosure set forth herein.

In one or more various aspects, a system includes, but is not limited to, a functional device presence sensing module configured to sense presence of a plurality of functional devices within communication range of a wearable computing device, the communication range of the wearable computing device being a spatial volume that includes the wearable computing device and being externally defined by an enveloping boundary, where low-power signals transmitted by the wearable computing device being discernible over background noise within the enveloping boundary and not discernible over background noise outside the enveloping boundary; a functional device choosing module configured to choose, from the plurality of functional devices that were sensed to be within the communication range of the wearable computing device, one or more functional devices for providing to the wearable computing device one or more functionalities; and a functionality use facilitating module configured to facilitate the wearable computing device to use the one or more functionalities provided by the one or more chosen functional devices.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 3B shows another exemplary Graphical User Interface (GUI) that may be displayed by the wearable computing device 10* of FIGS. 1A, 1B, 1C, and 1D.

FIG. 3C shows another exemplary Graphical User Interface (GUI) that may be displayed by the wearable computing device 10* of FIGS. 1A, 1B, 1C, and 1D.

FIG. 5A shows another perspective of the functional device presence sensing module 102* of FIGS. 4A and 4B (e.g., the functional device presence sensing module 102' of FIG. 4A or the functional device presence sensing module 102" of FIG. 4B) in accordance with various implementations.

FIG. 5B shows another perspective of the functional device choosing module 104* of FIGS. 4A and 4B (e.g., the functional device choosing module 104' of FIG. 4A or the functional device choosing module 104" of FIG. 4B) in accordance with various implementations.

DETAILED DESCRIPTION

Figure 1A:
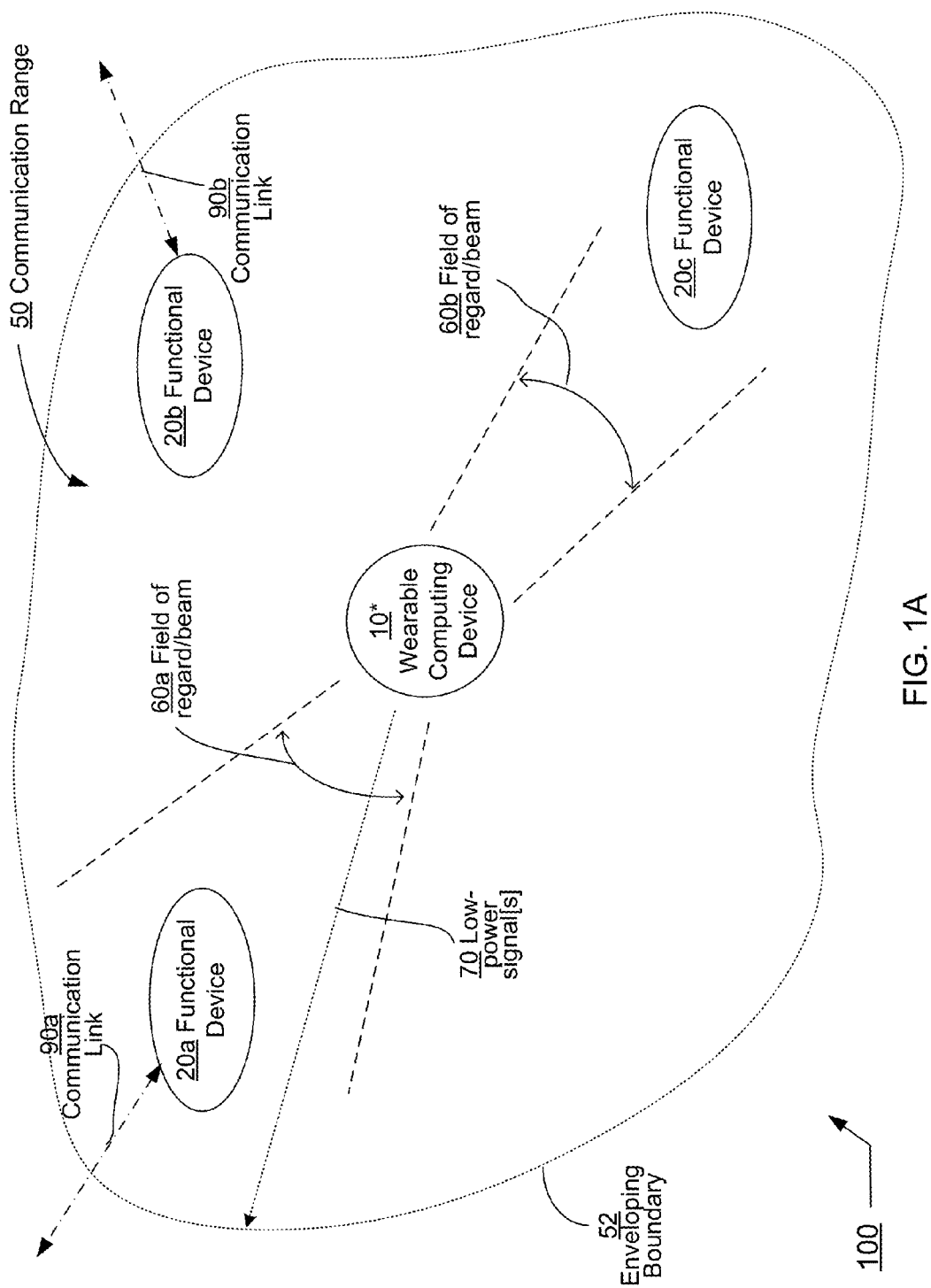
FIG. 1A is a high-level block diagram of one perspective of an example wearable computing device 10* operating in an exemplary environment 100.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide one or more wearable computing devices for the environment illustrated in FIG. 1.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional external linking devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "111100001010111100001111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media holds or transmits device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electromagnetically actuated devices, and/or virtually any combination thereof. Consequently, as used herein, "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include, but are not limited to, a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, application programs, one or more interaction devices (e.g., a touch pad, a touch screen, an antenna, etc.), and/or control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and application programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, application programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Specific examples of operably couplable include, but are not limited to, physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process (es)/operations heading(s) and/or process(es)/operations may be discussed under structure(s)/process(es) headings and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Although one or more users may be shown and/or described herein as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In the following detailed description, reference is made to the accompanying drawings, which form a part hereof. In the drawings, similar symbols typically identify similar or identical components or items, unless context dictates otherwise.

The illustrative embodiments described in the detailed description, drawings, and claims are not meant to be limiting. Other embodiments may be utilized, and other changes may be made, without departing from the spirit or scope of the subject matter presented here.

The rapid advancement and miniaturization of integrated circuitry and microelectronics over the last three decades have greatly facilitated those in the mobile computing industry to develop functionally powerful computing/communication devices, from the original clunky brick-sized portable telephones to today's sleek cellular telephones and Smartphones, and from yesterday's bulky laptops to today's slim tablet computers and e-readers. One recent trend in the evolution of mobile computing is the development of wearable computing devices. That is, there are currently multiple efforts by various high-tech groups to develop computing/communication devices in the form of wearable computing devices. Such devices having very small form-factors that are designed to be worn by people and that will supposedly be able to provide various functionalities beyond simple time/chronograph functionalities including, for example, at least some communication capabilities (e.g., connectivity to Wi-Fi or cellular networks) and capabilities for executing applications (e.g., software programs). Examples of such wearable computing devices include, for example, augmented reality (AR) devices having the form of glasses or goggles (herein "computing glasses"), and computerized watches (herein "computing watches" or "Smartwatches")

Although the recent advancements in the fields of integrated circuitry and microelectronics (e.g., microprocessors) make the eventual implementation of wearable computing devices a likely inevitability, developers of such devices still face a number of hurdles that may prevent such devices from being able to provide the same type of functionalities that larger mobile devices (e.g., Smartphones, tablet computers, and so forth) can provide. One of the problems faced by developers of wearable computing devices is to try to cram into such small form-factor devices all of the components that may be necessary in order to provide the same functionalities provided by larger mobile devices. That is, because a wearable computing device (e.g., an AR device or a Smartwatch) is designed to be worn by a user, it is generally preferable that such devices have relatively small form-factors and be relatively lightweight. As a result, such a device may only accommodate a small and/or limited number of core components including a power storage device (e.g., battery) that is relatively small (and as a result, with limited power storage capabilities) and light, and a relatively small communication system (e.g., a communication system that employs a small and/or limited number of antennas).

For example, and in contrast, larger mobile devices such as Smartphones and tablet computers typically have multiple antennas for various functionalities including, for example, an antenna for global positioning system (GPS), an antenna for Wi-Fi connectivity, and an antenna for cellular network connectivity. It may not be practical, if not impossible, to include multiple antennas into a small form-factor wearable computing device such as a computing watch or computing glasses. Also, because such wearable computing devices will be located somewhere on or adjacent to the body of a user, it will be generally desirable to employ a communication system that emits relatively low electromagnetic radiation at least towards the user's body.

In various embodiments, systems, articles of manufacture and methods are provided herein that allow a wearable computing device to have an extremely small form-factor while providing the same type functionalities that are available through larger mobile computing devices (e.g., Smartphones, tablet computers, and so forth). However, in order to minimize the size of its communication components (e.g., a relatively small antenna) and to minimize power consumption requirements during communication operations, the wearable computing device in accordance with various embodiments may include communication components that have very limited communication range. In various embodiments, a "wearable computing device" may be a computing device designed to be coupled to at least a portion (e.g., a limb or head) of a user and that has a relatively small form factor so that it can be comfortably worn by the user. Examples of a wearable computing device include, for example, a computing watch or computing glasses/goggles (e.g., augmented reality device or simply "AR" device). These wearable computing devices may include one or more components (e.g., eyeglass frame or wristband, or a clip to couple to a frame of a pair of glasses or a pin to couple to a wristband) to facilitate coupling the wearable computing device to at least a portion of a user's body.

In order to provide the same or similar functionalities provided by larger mobile devices (e.g. Smartphones, tablet computers, and so forth), the wearable computing device, in accordance with various embodiments, may be designed to "borrow" various functionalities from one or more nearby "functional devices" (e.g., Smartphones, tablet computers, workstations, access points, other wearable computing devices, and so forth) that are near the wearable computing device within the limited communication range of the wearable computing device. Various types of functionalities may be borrowed by a wearable computing device from nearby functional devices including, for example, communication links to beyond the limited communication range of the wearable computing device, sensor functionalities (e.g., GPS functionalities, audio and/or visual sensor functionalities, movement sensor functionalities, and so forth), application functionalities, and so forth. In various embodiments, and for purposes of the following description, a functional device may be a computing/communication device that is located within the limited communication range of the wearable computing device and that is designed to communicate with the wearable computing device as well as to be able to provide one or more functionalities to the wearable computing device. The "communication range" of a wearable computing device may be, for example, a spatial volume that includes the wearable computing device and being externally defined by an enveloping boundary, where low-power signals (e.g., wireless signals transmitted with less than 0.8 milliwatt of transmit power) transmitted by the wearable computing device being discernible over background noise within the enveloping boundary and not discernible over background noise outside the enveloping boundary.

In order to minimize the power requirements for communicating with nearby functional devices, in some embodiments the wearable computing device may be designed to communicate with the nearby external linking devices using a directional antenna, such as a metamaterial antenna, to transmit low-power signals (e.g., less than 1 milliwatt of transmit power). For these embodiments, the employment of a directional antenna rather than other types of antennas (e.g., omnidirectional antenna) to communicate with nearby functional devices may provide certain advantages including reducing power requirements for communicating with the nearby functional devices and minimizing the amount of electromagnetic (EM) radiation that the user of the wearable computing device may be exposed to by directing EM radiation away from the user.

It is contemplated that there may be many cases in which multiple functional devices that provide the same functionalities are found to be within the limited communication range of the wearable computing device. For example, there may be instances in which multiple functional devices are found to be within the communication range of a wearable computing device and that can provide to the wearable computing device the ability to communicate (e.g., via Wi-Fi links or cellular network links) beyond the communication range of the wearable computing device. In such situations, it may be desirable to be able to intelligently select, from the plurality of nearby functional devices that provides the same specific functionality (e.g., Wi-Fi links or cellular network links), at least one of the nearby functional devices for providing the specific functionality to the wearable computing device.

In various embodiments, the systems, articles of manufacture and methods may be designed to, among other things, detect presence of a plurality of functional devices within communication range of a wearable computing device, the communication range being a spatial volume that includes the wearable computing device and being externally defined by an enveloping boundary, where low-power signals transmitted by the wearable computing device being discernible over background noise within the enveloping boundary and not discernible over background noise outside the enveloping boundary; and select, from the plurality of functional devices that were detected as being present within the communication range of the wearable computing device, one or more functional devices for providing to the wearable computing device one or more functionalities.

Referring now to FIG. 1A, which is a block diagram of a wearable computing device 10* operating in an exemplary environment 100 in accordance with various embodiments. For ease of illustration and in order to facilitate understanding of various concepts to be introduced herein, the user (e.g., person) who is wearing/using the wearable computing device 10* while the wearable computing device 10* is operating will not be depicted in FIG. 1A (as well as FIGS. 1B, 1C, and 1D) even though the wearable computing device 10* may be actually designed to operate while being worn by a user. Note that in the following, "*" represents a wildcard. Thus, references in the following description to, for example, "wearable computing device 10*" may be in reference to the example wearable computing device 10* of FIG. 1A, as well as to the example wearable computing device 10' of FIG. 4A or to the wearable computing device 10" of FIG. 4B, which are two different implementations of the wearable computing device 10* of FIG. 1A (as well as of FIGS. 1B, 1C, and 1D).

In the illustrated environment 100, the wearable computing device 10* may employ a directional antenna or an omnidirectional antenna (e.g., antenna 130 in FIGS. 4A and 4B) in order to communicate with one or more functional devices 20* (e.g., functional device 20a, functional device 20b, and/or functional device 20c). If the wearable computing device 10* employs an omnidirectional antenna, then the process for communicating with the one or more functional devices 20* by the wearable computing device 10* is more straightforward—by simply making sure that the transmit power of the signals transmitted by the wearable computing device 10* is sufficiently high enough to ensure that the signals transmitted by the wearable computing device 10* reach the one or more functional devices 20*. If the wearable computing device 10*, on the other hand, employs a directional antenna such as metamaterial antenna, then the wearable computing device 10* may only communicate with the one or more functional devices 20* by pointing the directional antenna to different portions of the environment 100. In particular, the wearable computing device 10* may communicate with the various functional devices 20* by moving/adjusting the field of regard/beam 60* (e.g., FIG. 1A shows a first field of regard/beam 60a and a second field of regard/beam 60b as a result of pointing the directional antenna at different directions) of the directional antenna of the wearable computing device 10* to scan the surrounding environment 100.

By convention, "field of regard" is sometimes used herein when describing an example wherein a directional antenna is likely to receive a signal while a "beam" is used herein when describing an example wherein a directional antenna is likely to transmit a signal. That is, a directional antenna when transmitting signals (e.g., transmitting electromagnetic radiation) will transmit the signals primarily towards one direction thus having greater gain then, for example, multi-directional antennas such as omnidirectional antennas or isotropic radiators (note that a gain is a measure of how much of the power is radiated in a given direction relative to other directions). The narrower the beamwidth of the emitted radiation, the greater the gain. When the same directional antenna is in receiving mode, it may be able to receive signals from the same direction that the directional antenna primarily radiates signals to. Thus, references in the following to "pointing the directional antenna" or similar such phrases may be in reference to steering or directing the field of regard/beam of the directional antenna to different portions of the surrounding environment. A more detailed discussion related to the "field of regard" and "beam" is provided in U.S. Pat. No. 7,929,914, which is hereby incorporated by reference.

In order to communicate with the one or more functional devices 20* of FIG. 1A, the wearable computing device 10* may transmit one or more low-power signals 70 with limited transmission range (e.g., less than 30 or 40 feet) using a directional antenna (or an omnidirectional antenna). The range of the low-power signals 70 may define a communication range 50 that surrounds the wearable computing device 10*. From another perspective, the communication range 50 of the wearable computing device 10* may be a spatial volume that includes the wearable computing device 10* and that is externally defined by an enveloping boundary 52, where low-power signals 70 transmitted via the directional antenna (or by an omnidirectional antenna) being discernible over background noise within the enveloping boundary 52 and not discernible over background noise outside the enveloping boundary 52.

In various embodiments, references in the following to low-power signals may be in reference to wireless signals that may be transmitted using a directional antenna (or a omnidirectional antenna) with substantially less than 1 milliwatt of transmit power such as 0.5 milliwatt of transmit power. Note that the shape of the communication range 50 will not be spherical in most cases since the size and shape of the communication range 50 will be affected by environmental conditions (e.g., atmospheric conditions) and the presence of various objects in the environment (e.g., people, walls, chairs, etc.). FIG. 1A illustrates that functional device 20a and functional device 20b having capability to communicate beyond the communication range 50 of the wearable computing device 10* via communication links 90a and 90b. The illustrated communication links 90a and 90b may be any one or more of a variety communication channels/links including, for example, Wireless Fidelity (Wi-Fi) links, cellular network links, Ethernet, optical communication links, and so forth.

Figure 1B:
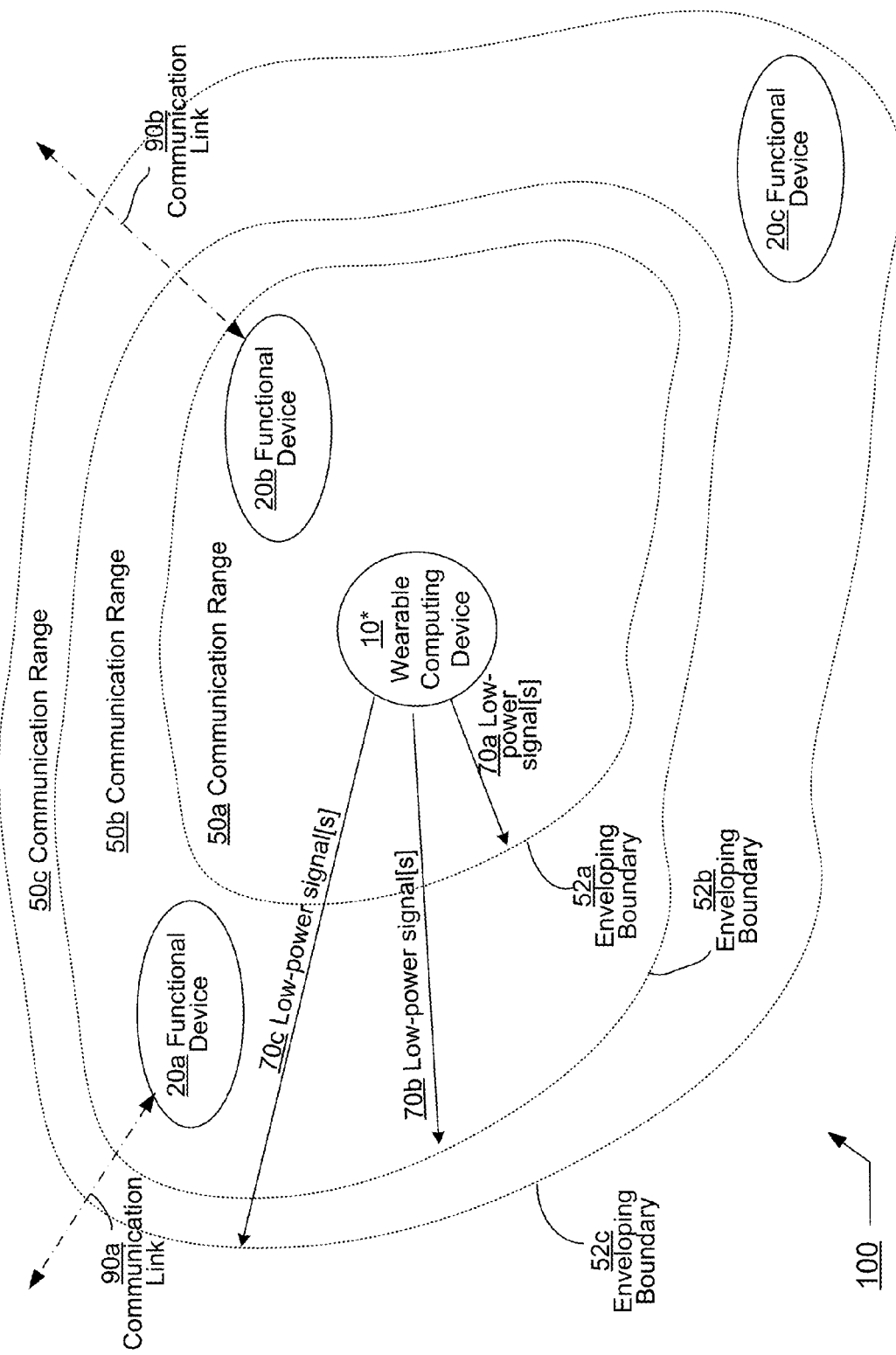
FIG. 1B is a high-level block diagram of another perspective of the example wearable computing device 10* operating in the exemplary environment 100.

Referring now to FIG. 1B, which illustrates another aspect of the wearable computing device 10* operating in the exemplary environment 100 of FIG. 1A in accordance with various embodiments. In FIG. 1B, the wearable computing device 10* is illustrated as transmitting low-power signals 70* (e.g., low-power signals 70a, low-power signals 70b, and low-power signals 70c) at various levels of transmit powers in order to generate various sizes of communication ranges 50*. For example, the wearable computing device 10* may initially transmit one or more low-power signals 70a with a first transmit power (e.g., 0.1 milliwatt of transmit power) using a directional or omnidirectional antenna in order to create a first communication range 50a that surrounds the wearable computing device 10*. Because the first communication range 50a is relatively small, only functional device 20b may be able to detect the one or more low-power signals 70a transmitted by the wearable computing device 10* and to respond to it when detected.

In order to increase the size of its communication range 50*, the wearable computing device 10* may then transmit one or more low-power signals 70b with a second transmit power (e.g., 0.2 milliwatt of transmit power) using a directional or omnidirectional antenna in order to create a second communication range 50b that surrounds the wearable computing device 10*. Because the second communication range 50b is bigger than the first communication range 50a, both functional device 20a and functional device 20b may be able to detect the one or more low-power signals 70b transmitted by the wearable computing device 10* and to respond to it when detected. In order to further increase the size of its communication range 50*, the wearable computing device 10* may then further transmit one or more low-power signals 70c with a third transmit power (e.g., 0.3 milliwatt of transmit power) using a directional or omnidirectional antenna in order to create a third communication range 50c that surrounds the wearable computing device 10*. Because the third communication range 50c is even bigger than the second communication range 50b, functional devices 20a and 20b, as well as functional device 20c may be able to detect the one or more low-power signals 70c transmitted by the wearable computing device 10* and to respond to such signals when detected.

There are at least two ways to determine whether there are any functional devices 20* within a communication range[s] 50* of the wearable computing device 10* and/or which functional devices 20* that are detected within the communication range 50* of the wearable computing device 10* is or are nearest to the wearable computing device 10* (e.g., which functional devices 20* require the least or less power to communicate with by the wearable computing device 10*). The first possible way is to measure the signal strengths of beacon signals received by the wearable computing device 10* and transmitted by each of the functional devices 20*. That is, if each of the functional devices 20* transmits beacon signals that were originally transmitted with known transmit power or powers, then by detecting the signal strengths of the beacon signals upon being received by the wearable computing device 10*, a determination can be made as to which of the functional devices 20* are in the communication range 50* of the wearable computing device 10* (e.g., within the communication range of the wearable computing device 10*) and/or which of the functional devices 20* are nearest to the wearable computing device 10* (as well as the amount of power needed by the wearable computing device 10* in order to communicate with such devices). That is, the amount of transmit power needed by the wearable computing device 10* in order to communicate with the one or more functional devices 20* may be determined based on the detected signal strengths of the beacon signals received by the wearable computing device 10*. The stronger the signal strength of the beacon signals received by the wearable computing device 10* (which suggests that the functional device[s] 20* that transmitted the beacon signals are relatively close), the less transmit power will be needed by the wearable computing device 10* in order to successfully communicate with the functional device[s] 20* that transmitted the beacon signals.

A second way of determining which functional devices 20* are within communication range[s] 50* of the wearable computing device 10* and/or which of the functional devices 20* that are detected near the wearable computing device 10* are nearest to the wearable computing device 10* is by having the wearable computing device 10* to transmit one or more low-power "prompting" signals at various levels of low transmission power and wait to see if any of the functional devices 20* respond to the prompting signals after each transmission of the prompting signals at each level of low transmission power. For example, the wearable computing device 10* may initially transmit first prompting signals at a very low transmit power (0.1 milliwatt of transmit power) that are designed to, upon being received/detected by a functional device 20*, prompt the functional device 20* that detects the first prompting signals to transmit back to the wearable computing device 10* one or more "responsive" signals. After the transmission of the first prompting signals, the wearable computing device 10* may monitor for the one or more responsive signals in order to determine whether any functional devices 20* are nearby.

If the wearable computing device 10* does not detect any responsive signals from a functional device 20* and/or if there is a need to find more functional devices 20* (that may be further away from the wearable computing device 10*) then the wearable computing device 10* may repeat the above process by transmitting a second prompting signal at a higher transmit power (e.g., 0.2 milliwatt of transmit power) than the first prompting signal and then monitoring for responsive signals. This process may then be repeated over and over again for incrementally higher transmit powers in order to determine whether there are any functional devices 20* near the wearable computing device 10* within different communication ranges 50* of the wearable computing device 10*, to determine the amount of power needed to communicate with those functional devices 20* found nearby, and/or to determine which functional devices 20* are nearest to the wearable computing device 10* when multiple functional devices 20* are located nearby. In some cases, this process of transmitting prompting signals and monitoring for responsive signals may be part of a handshaking protocol.

In some embodiments, two different processes may be executed in order for the wearable computing device 10* to obtain one or more functionalities from one or more functional devices 20* that are located within the communication range 50* of the wearable computing device 10*. The first process involves determining whether there are any functional devices 20* located within the communication range 50* of the wearable computing device 10*. If multiple functional devices 20* that provide similar or the same functionalities are detected within the communication range 50* of the wearable computing device 10* then a second process may be implemented that selects, from the multiple functional devices 20* detected within the communication range 50* of the wearable computing device 10*, one or more functional devices 20* for providing to the wearable computing device 10* one or more functionalities. Various criteria may be used in order to select which of the plurality of functional devices 20* that were detected as being within the communication range 50* of the wearable computing device 10* should provide the one or more specific functionalities to the wearable computing device 10*. For example, in some cases, the functional device 20* that is determined to be nearest to the wearable computing device 10* may be selected in some cases in order to minimize the power requirements for communicating with such a device. In other cases, the functional device 20* that provides the highest data transfer rate may be selected. In yet other cases, the specific locations of the nearby functional devices 20* may be the basis for selecting which nearby functional device 20* should be selected for providing to the wearable computing device 10* one or more specific functionalities. Other factors for selecting one or more functional devices 20* for providing one or more functionalities to the wearable computing device 10* will be described in greater detail herein.

Figure 1C:
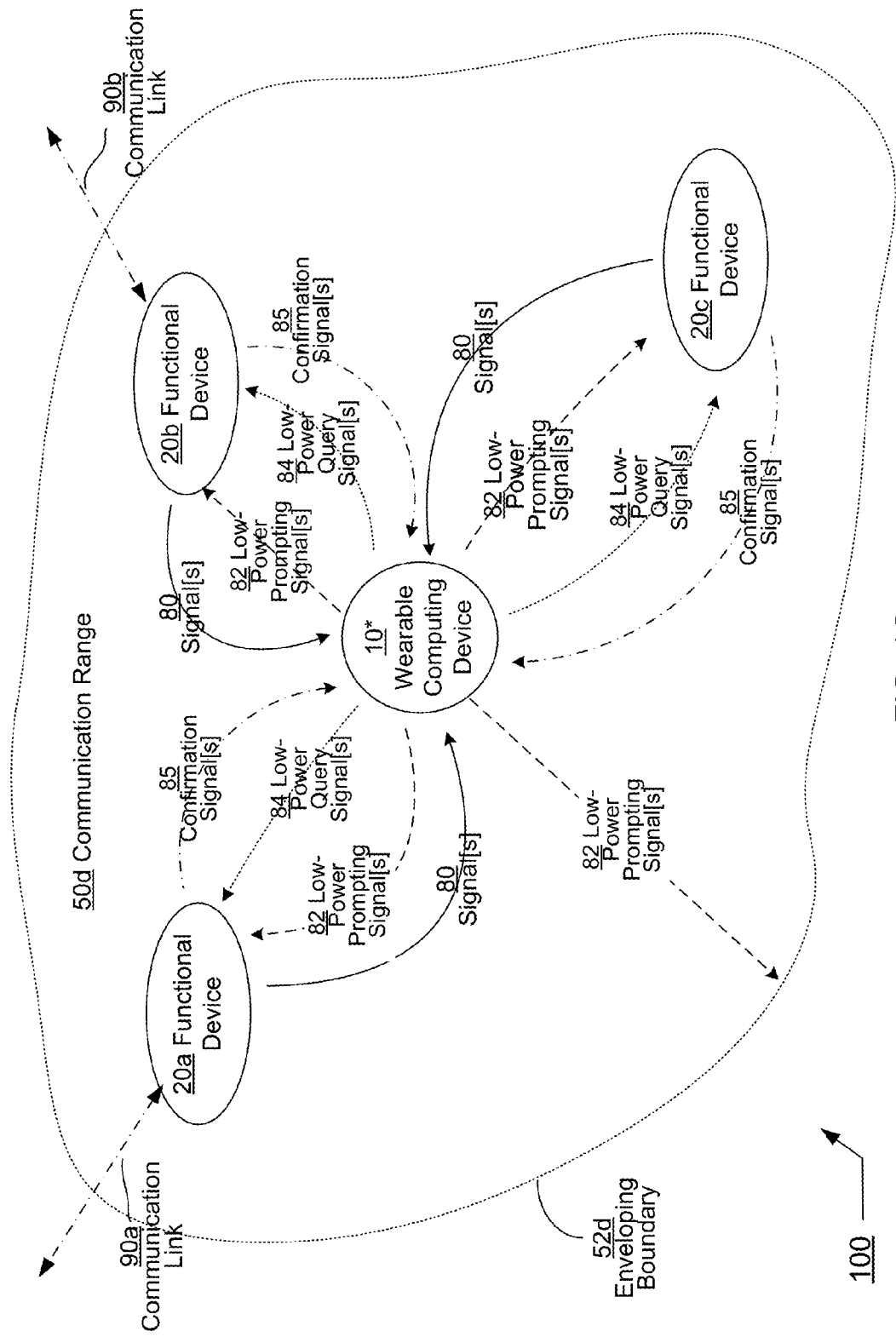
FIG. 1C is a high-level block diagram of still another perspective of the example wearable computing device 10* operating in the exemplary environment 100.

FIG. 1C illustrates how the wearable computing device 10* may communicate with a plurality of functional devices 20* that are within the communication range 50d of the wearable computing device 10*. As described previously, a communication range 50d of the wearable computing device 10* may be a spatial volume that includes the wearable computing device 10* and that is externally defined (e.g., enclosed) by an enveloping boundary 52d, where low-power signals (e.g., signals transmitted with less than 0.5 or 0.8 milliwatt of transmit power) transmitted via an antenna 130 (e.g., directional or omnidirectional antenna) being discernible over background noise (e.g., noise as a result of background radiation) within the enveloping boundary 52d and not discernible over background noise outside the enveloping boundary 52d.

In various embodiments, in order to determine whether there are a plurality of functional devices 20* (e.g., two or more functional devices 20*) within the communication range 50d of the wearable computing device 10*, the wearable computing device 10* through transceiver 118 and an antenna 130 (see FIG. 4A or 4B) may be controlled or directed to initially receive or monitor for signals 80 transmitted by the plurality of functional devices 20*. In some embodiments, the signals 80 that are received by the wearable computing device 10* may be beacon signals that were transmitted by the plurality of functional devices 20* with known amounts of transmit powers. In such cases, the signal strengths of the beacon signals, upon being received by the wearable computing device 10*, may be ascertained in order to, among other things, determine whether the plurality of functional devices 20* are within the communication range 50d of the wearable computing device 10*, to determine the amount of transmission power needed by the wearable computing device 10* to communicate with each of the plurality of functional devices 20*, and/or to determine which of the functional devices 20* are nearest to the wearable computing device 10* (e.g., requires least amount of power to communicate with the wearable computing device 10*).

In alternative embodiments, the signals 80 that are received by the wearable computing device 10* may be responsive signals that were transmitted by the plurality of functional devices 20* in response to the plurality of functional devices 20* receiving/detecting one or more low-power prompting signals 82 (e.g., signals that are designed to prompt functional devices 20*, upon receiving/detecting the prompting signals, to transmit responsive signals) broadcasted by the wearable computing device 10*. In some embodiments, by merely detecting the responsive signals (e.g., signals 80) transmitted by the plurality of functional devices 20*, a determination can be made that the plurality of functional devices 20* are within the communication range 50d of the wearable computing device 10*. If multiple functional devices 20* transmit multiple responsive signals in response to the one or more low-power prompting signals 82, then the wearable computing device 10* may determine which of the functional devices 20* are nearest to the wearable computing device 10* based on the detected signal strengths of the responsive signals (e.g., signals 80) received by the wearable computing device 10*. Note that shown at the bottom left side of FIG. 1C is one or more low-power promoting signals 82 that has a range only up to the edge (e.g., enveloping boundary 52d) of the communication range 50d.

In some embodiments, the wearable computing device 10* (or at least its components such as the transceiver 118) may be directed (e.g., controlled or instructed) to transmit the one or more low-power prompting signals 82 at different levels of transmit powers. The wearable computing device 10* may also be directed (e.g., controlled, instructed, or configured) to monitor for responsive signals (e.g., one or more signals 80 of FIG. 1C) transmitted by a plurality of functional devices 20* in response to the plurality of functional devices 20* detecting the one or more low-power prompting signals 82 transmitted at varying levels of transmit powers. Such operations may be executed, in some cases, in order to see which of the functional devices 20* is or are closest to the wearable computing device 10* based on how the nearby functional devices 20* respond to the prompting signals 82 transmitted by the wearable computing device 10* at varying transmit powers. That is, an inference may be made in some cases that those functional devices 20* that respond to prompting signals 82 that were transmitted by the wearable computing device 10* at relatively low transmit powers may be closer to the wearable computing device 10* (and thus requires less power to communicate with) than those functional devices 20* that respond only when the wearable computing device 10* transmits the prompting signals 82 at relatively higher levels of transmit powers.

In some embodiments, the wearable computing device 10* (e.g., the components of the wearable computing device 10*) may be directed (e.g., controlled, instructed, or configured) to transmit one or more low-power query signals 84 to query each of a plurality of functional devices 20* that are detected to be near the wearable computing device 10* (e.g., detected to be within the communication range 50d of the wearable computing device 10*) to provide certain information or confirmations that may be useful in determining which functional device 20* should be used in order to provide to the wearable computing device 10* one or more functionalities. For example, in some cases, the low-power query signals 84 that may be transmitted to the plurality of functional devices 20* that are detected as being within the communication range 50d of the wearable computing device 10* may be transmitted in order to obtain confirmation (e.g., in the form of one or more confirmation signals 85) that the functional devices 20* can provide one or more specific functionalities (e.g., ability to communicate beyond the communication range 50d of the wearable computing device 10*, sensor functionalities, and so forth) that may be sought by the wearable computing device 10*. If the plurality of nearby functional devices 20* can confirm that they can indeed provide the one or more specific functionalities, then in various embodiments the functional devices 20* may transmit back to the wearable computing device 10* confirmation signals 85 to confirm the availability of the one or more specific functionalities through the functional devices 20*.

Other types of information/confirmations may also be sought through the low-power query signals 84 as will be further described herein with respect to the process and operations to be described herein. For example, in some cases the low-power query signals 84 may be transmitted to multiple functional devices 20* in order to, among other things, obtain indications of the data transfer rates of the communication links 90* available through the plurality of functional devices 20* (e.g., functional devices 20a and 20b, which may also be referred to as "external linking devices" that are designed to communicate beyond the communication range 50* of the wearable computing device 10*), obtain indications of the specific types of data (e.g., whether image data of user's hand/fingers are available) that may be available through the functionalities (e.g., sensor functionalities) provided through the multiple functional devices 20*, obtain indications as to when the one or more functionalities that are available through the multiple functional devices 20* will actually become available for use by the wearable computing device 10*, and so forth.

In some embodiments, the above described processes for detecting presence of a plurality of functional devices 20* within the communication range 50d of the wearable computing device 10* and the process for determining whether those functional devices 20* detected as being within the communication range 50d can provide one or more specific functionalities can be combined into a single process. That is, in various alternative embodiments, the wearable computing device 10* may be directed to broadcast the low-power query signals 84 and then directed to monitor for confirmation signals 85 transmitted by a plurality of functional devices 20* in response to the plurality of functional devices 20* detecting the low-power query signals 84. If the wearable computing device 10* detects confirmation signals 85 transmitted by a plurality of functional devices 20*, then a determination can be made that the responding functional devices 20* associated with the confirmation signals 85 are within the communication range 50d of the wearable computing device 10* as well as, among other things, confirmation that the responding functional devices 20* can provide at least access to one or more specific functionalities.

Figure 1D:
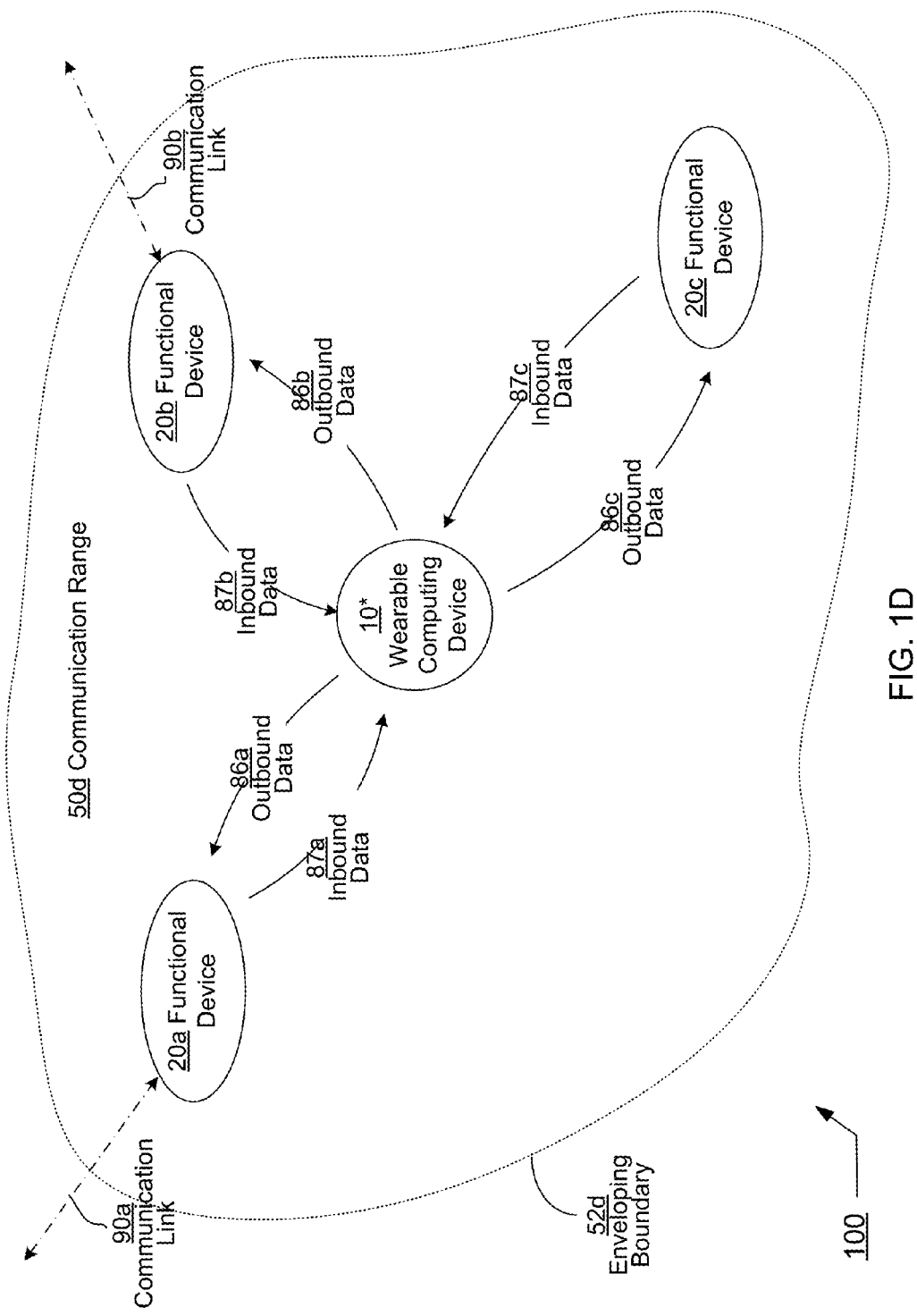
FIG. 1D is a high-level block diagram of yet another perspective of the wearable computing device 10* operating in the exemplary environment 100.

Turning now to FIG. 1D, which illustrates how the wearable computing device 10* may exchange data with one or more functional devices 20* after the one or more functional devices 20* have been selected for providing one or more functionalities to the wearable computing device 10*. In various embodiments, and as previous described, each of the one or more functional devices 20* that are detected being within the communication range 50d of the wearable computing device 10* may also be able to provide to the wearable computing device 10* the same functionalities. In order to utilize the functionalities available through the one or more functional devices 20*, the wearable computing device 10* may, in some embodiments, transmit to the one or more functional devices 20* outbound data 86* (e.g., outbound data 86a, outbound data 86b, and/or outbound data 86c). Alternatively or additionally, the wearable computing device 10* in order to utilize the one or more functionalities may receive inbound data 87* (e.g., inbound data 87a, inbound data 87b, and/or inbound data 87c) from the functional devices 20*.

The outbound data 86* that may be transmitted by the wearable computing device 10* to the one or more selected functional devices 20* may include a variety of information/data in various alternative embodiments. For example, in various embodiments, the outbound data 86* may include one or more addresses such as URLs (uniform resource locators), one or more web-based application commands/requests, one or more electronic messages (e.g., telephone calls, emails text messages, instant messages, and so forth), and so forth. The outbound data 86* that may be transmitted by the wearable computing device 10* may be in the form of one or more low-power signals 70* (see FIG. 1A or 1B) transmitted using one or more frequencies from, for example, the 2.4 GHz frequency band (e.g., frequency range between 2.400 GHz and 2.4835 GHz), 5 GHz frequency band (e.g., frequency range between 5.180 GHz and 5.825 GHz), or 60 GHz frequency band (e.g., frequency range between 57 GHz and 64 GHz).

The inbound data 87* that may be received by the one or more selected functional devices 20* may also include a variety of information/data in various alternative embodiments. For example, in various embodiments, the inbound data 87* may include one or more electronic messages (e.g., telephone calls, emails text messages, instant messages, and so forth), one or more web-based application GUIs (graphical user interfaces), one or more results of executing one or more web-based applications, content from consumer media such as news or movies, sensor data including visual, audio, and/or movement data, and so forth. Additional discussions related to the outbound data 86* and the inbound data 87* will be provided below with respect to the processes/operations to be described herein.

Figure 2A:
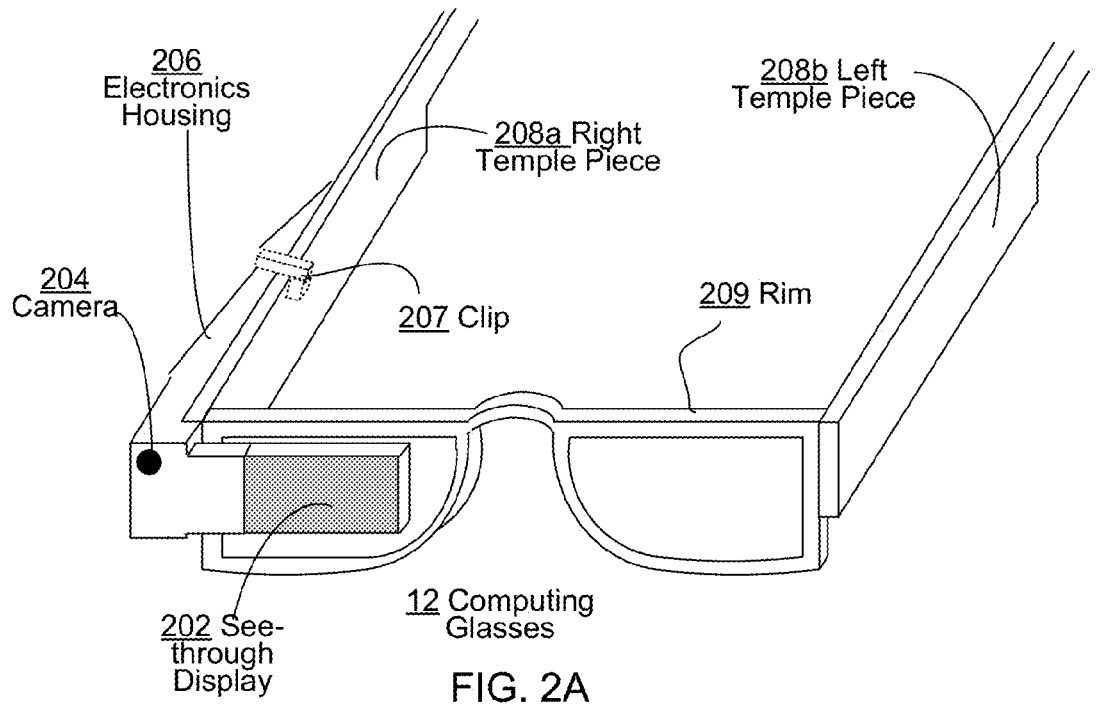
FIG. 2A shows exemplary computing glasses 12 that the example wearable computing device 10* of FIGS. 1A, 1B, 1C, and 1D may be in the form of in accordance with various embodiments.

FIG. 2A illustrates exemplary computing glasses 12, which is one form that the wearable computing device 10* of FIGS. 1A, 1B, 1C, and 1D (as well as FIG. 4A or 4B) may take on in accordance with various embodiments. The computing glasses 12, in various embodiments, may be an augmented reality (AR) system or device. The computing glasses 12 may comprise a see-through display 202, a camera 204, an electronic housing 206 (which houses the electronics), and/or a frame that comprises a right temple piece 208a, a left temple piece 208b, and a rim 209. The right temple piece 208a and the left temple piece 208b are designed to extend to and wrap around the ears of the user and to couple the computing glasses 12 to the head of the user. Note that in alternative implementations, the wearable computing device 10* may take on the form of computing goggles rather than computing glasses 12, where the computing goggles employ a "regular" display such as a light emitting diode (LED) display rather than a see-through display 202. Note further that in some cases, a wearable computing device 10* may comprise merely the electronic housing 206 and the electronics housed by the electronic housing 206, the see-through display 202, the camera 204, and a coupling component such as a clip 207 for coupling to a frame (e.g., the rim 209 and the right temple piece 208a and the left temple piece 208b). That is, the rim 209 and the right and left temple pieces 208* are optional and may not necessarily be required in various alternative embodiments.

Figure 2B:
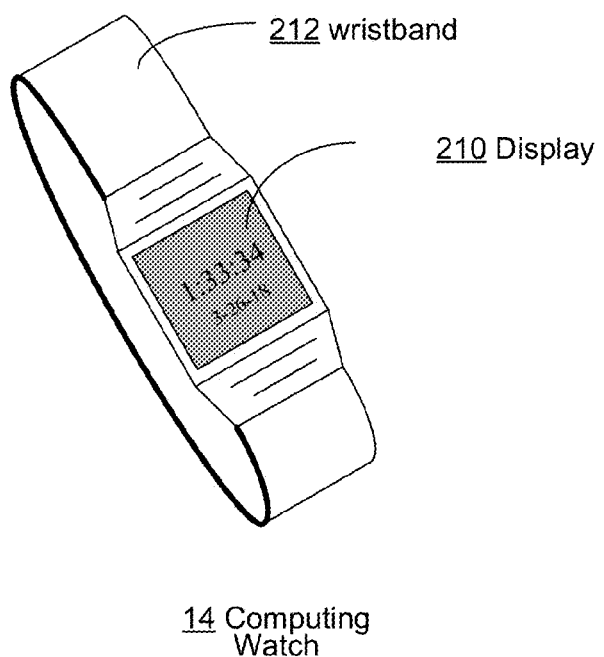
FIG. 2B shows an exemplary computing watch 14 that the example wearable computing device 10* of FIGS. 1A, 1B, 1C, and 1D may be in the form of in accordance with various embodiments.

FIG. 2B illustrates an exemplary computing watch 14, which is another form that the wearable computing device 10* of FIGS. 1A, 1B, 1C, and 1D (as well as FIG. 4A or 4B) may take on in accordance with various embodiments. The computing watch 14 includes at least a display 210 and a wristband 212 for wrapping around the wrist/arm of a user (e.g., coupling with the limb of the user). The display 210 may be a variety of displays including, for example, an LED display or liquid crystal display (LCD). In some embodiments, the wearable computing device 10* may comprise merely the watch portion of the computing watch 14 without the wristband 212 and one or more coupling components that couples with the wristband 212 (e.g., the wristband 212 portion of the computing watch is optional). Note that both forms of the wearable computing device 10* illustrated, for example, in FIGS. 2A and 2B (e.g., computing glasses 12 or computing watch 14) include one or more components (e.g., the right temple piece 208a, the left temple piece 208b, and the rim 209 of the computing glasses 12, a clip 207 of the computing glasses 12, or the wristband 212 of the computing watch 14)

to facilitate coupling the wearable computing device 10* to at least a portion of a user's body.

In some embodiments, a wearable computing device 10* may employ only a single directional antenna 130 (see FIG. 4A or 4B) that may be used to communicate with one or more nearby functional devices 20*. In various embodiments, the antenna 130 that may be employed may be an omnidirectional antenna, or alternatively, a directional antenna such as a metamaterial antenna (see, for example, U.S. Patent Application Pub. No. 2012/0194399, which is hereby incorporated by reference).

In various embodiments, a wearable computing device 10* may wirelessly communicate with one or more functional devices 20* that are located within communication range 50* of the wearable computing device 10* via one or more low-power wireless signals having one or more frequencies from at least one of a variety of frequency bands. For example, in some embodiments, the wearable computing device 10* may communicate with nearby functional devices 20* via one or more low-power signals 70* having one or more frequencies from the 2.4 GHz industrial, scientific and medical (ISM) frequency band, which has a frequency range from 2.4 GHz to 2.4835 GHz. Alternatively, the wearable computing device 10* may communicate with nearby functional devices 20* via one or more low-power signals 70* having one or more frequencies from the 5 GHz ISM frequency band or the 5 GHz U-NII (Unlicensed National Information Infrastructure) frequency band with a frequency range between 5.180 GHz and 5.825 GHz. In still other alternative embodiments, the wearable computing device 10* may communicate with nearby functional devices 20* via one or more low-power signals 70* having one or more frequencies from the 60 GHz band (e.g., millimeter waveband or mmWave band with a frequency range between 57 and 64 GHz (U.S) or between 57 and 66 GHz (Japan and Europe)).

Note that the 60 GHz frequency band provides certain advantages over the other two frequency bands. For example, signals from the 60 GHz frequency band tend to attenuate very quickly in nominal environmental conditions (e.g., gets easily absorbed by materials, moisture, etc.) and therefore when used for communicating by a wearable computing device 10* may cause the communication range 50* of the wearable computing device 10* to be relatively small (which may be desirable in some cases in order to avoid overlapping with adjacent communication ranges of other devices). Further, higher data rates are possible using the 60 GHz frequency band rather than the two lower frequency bands (2.4 GHz frequency band and the 5 GHz frequency band).

In various embodiments, a communication range 50* that envelopes a wearable computing device 10* may be a spatial volume that includes the wearable computing device 10* and that is externally defined or enclosed by an enveloping boundary 52*, where low-power wireless signals generated by the wearable computing device 10* being discernible over background noise (e.g., background electromagnetic radiation noise) within the enveloping boundary 52* and not discernible over background noise outside the enveloping boundary 52*. In various embodiments, reference in the following to "low-power signals" may be in reference to wireless signals that were transmitted using less than 1 milliwatt of transmitting power. In some cases, low-power signals 70* (see FIG. 1A or 1B) may be, for example, wireless signals that were transmitting with 0.8 milliwatt, 0.5 milliwatt, 0.3 milliwatt, or less than 0.3 milliwatt of transmit power.

In various embodiments, the low-power signals 70* that may define the enveloping boundary 52* of a communication range 50* may be the maximum low-power wireless signals that may be allowed to be transmitted by the wearable computing device 10*. That is, in order to keep the size of a communication range 50* of the wearable computing device 10* relatively small and to keep power consumption relatively low, the logic endowed in the wearable computing device 10* may restrict the transmission power of wireless signals transmitted by the wearable computing device 10*.

Figure 3A:
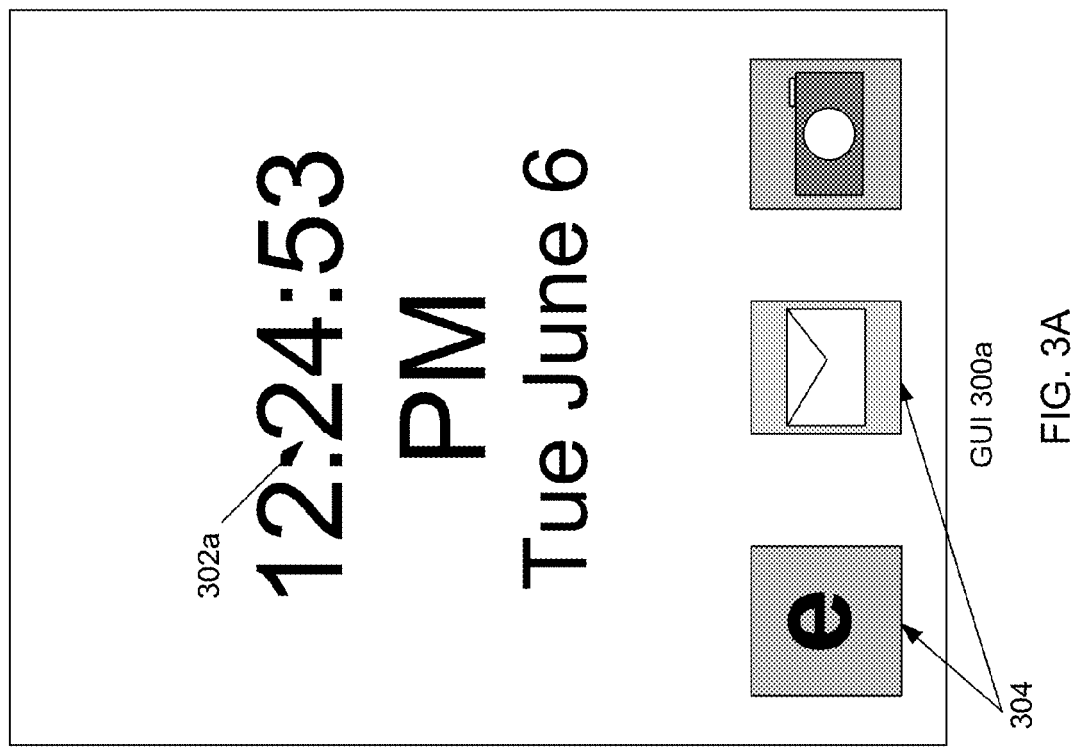
FIG. 3A shows an exemplary Graphical User Interface (GUI) that may be displayed by the wearable computing device 10* of FIGS. 1A, 1B, 1C, and 1D.

Turning now to FIGS. 3A, 3B, and 3C, which illustrate some exemplary graphical user interfaces (GUIs) that the wearable computing device 10* may present through a display (e.g., liquid crystal display) when the wearable computing device 10* is in the form of a computing watch 14. Turning particularly now to FIG. 3A, which illustrates an exemplary GUI 300a that includes three icons 304 representing three different applications that may be available through the wearable computing device 10*. Note that at least some of the applications (e.g., browser or email application) that may be provided through the wearable computing device 10* may only be available only if the wearable computing device 10* is able to communicate beyond the communication range 50* of the wearable computing device 10* via one or more functional devices 20*.

FIG. 3B illustrates an exemplary GUI 300b that may be displayed by the wearable computing device 10*. In particular, the exemplary GUI 300b includes an icon 306b that represents an application (e.g., local weather reporting application) and that is being displayed in a first format (e.g., semi-transparent) that indicates that the application is disabled. That is, the associated application (e.g., local weather reporting application) may be fully executable only if the wearable computing device 10* has obtained access to communication links 90* to beyond the communication range 50* of the wearable computing device 10*. In contrast, the GUI 300c of FIG. 3C may be displayed by the wearable computing device 10* once the wearable computing device 10* is able to communicate beyond the communication range 50* via the one or more functional devices 20*. The GUI 300c includes icon 306c, which is similar or the same as icon 306b of FIG. 3B except that icon 306c being in a second format (e.g., bolded) that indicates that the associated application (e.g., local weather reporting application) is now functional or executable as a result of the wearable computing device 10* establishing a communication link 90* to beyond the communication range 50* of the wearable computing device 10* via the one or more functional devices 20*.

Figure 4A:
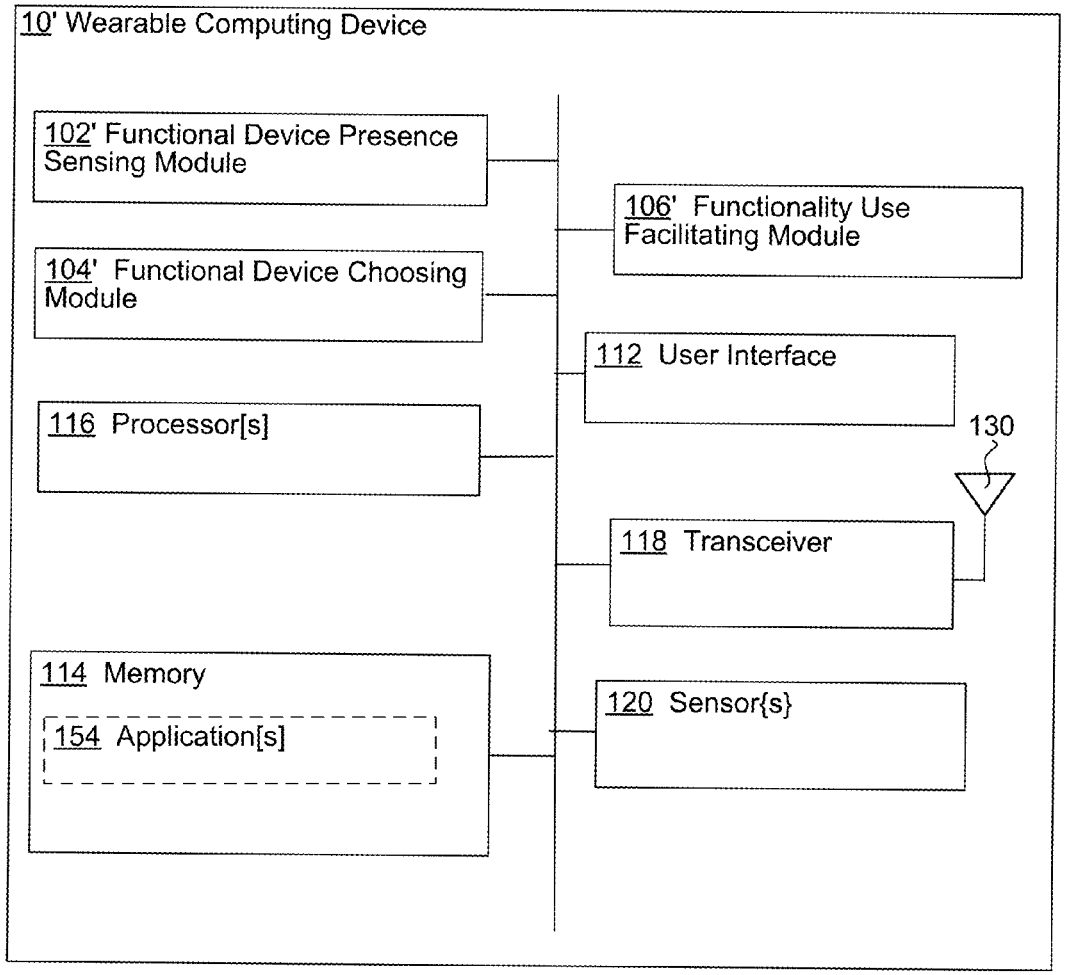
FIG. 4A shows a block diagram of particular implementation of the wearable computing device 10* of FIGS. 1A, 1B, 1C, and 1D.
Figure 4B:
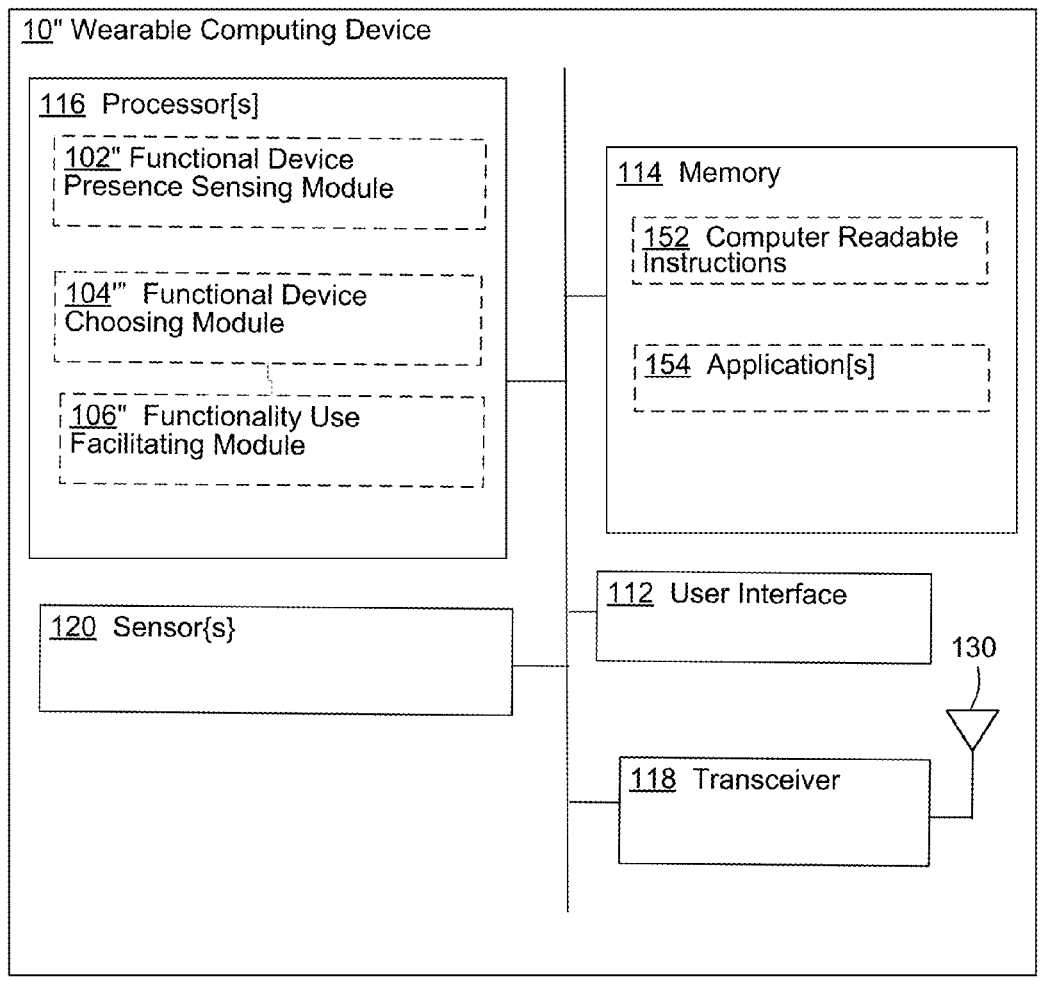
FIG. 4B shows a block diagram of another implementation of the wearable computing device 10* of FIGS. 1A, 1B, 1C, and 1D

Referring now to FIGS. 4A and 4B, illustrating two block diagrams representing two different implementations of the wearable computing device 10* of FIGS. 1A, 1B, 1C, and 1D and that are designed to execute the operations and processes to be described herein. In particular, and as will be further described herein, FIG. 4A illustrates a wearable computing device 10' that is the "hardwired" or "hard" implementation of a small form-factor wearable device that can implement the operations and processes to be described herein. The wearable computing device 10' may comprise certain logic modules including, for example, a functional device presence sensing module 102', a functional device choosing module 104', and/or a functionality use facilitating module 106' that are implemented using purely hardware or circuitry components (e.g., application specific integrated circuit or "ASIC"). In contrast, FIG. 4B illustrates a wearable computing device 10" that is the "soft" implementation of a small form-factor wearable device that can implement the operations and processes to be described herein. In various embodiments, the wearable computing device 10" may also include certain logic modules including, for example, a functional device presence sensing module 102", a functional device choosing module 104", and/or a functionality use facilitating module 106" that are implemented using electronic circuitry (e.g., one or more processors 116 including one or more microprocessors, controllers, etc.) executing one or more programming instructions (e.g., software in the form of computer readable instructions 152—see FIG. 4B).

The embodiments of the wearable computing device 10* illustrated in FIGS. 4A and 4B are two extreme implementations of a small form-factor wearable system in which all of the logic modules (e.g., the functional device presence sensing module 102', the functional device choosing module 104', and the functionality use facilitating module 106') are implemented using purely hardware solutions (e.g., circuitry such as ASIC) as illustrated in, for example, FIG. 4A or in which all of the logic modules (e.g., the functional device presence sensing module 102", the functional device choosing module 104", and the functionality use facilitating module 106") are implemented using software solutions (e.g., programmable instructions in the form of computer readable instructions 152 being executed by hardware such as one or more processors 116) as illustrated in, for example, FIG. 4B. Since there are many ways of combining hardware, software, and/or firmware in order to implement the various logic modules (e.g., the functional device presence sensing module 102*, the functional device choosing module 104*, and the functionality use facilitating module 106*), only the two extreme implementations (e.g., the purely hardware solution as illustrated in FIG. 4A and the software solution of FIG. 4B) are illustrated here. It should be noted here that with respect to the "soft" implementation illustrated in FIG. 4B, hardware in the form of circuitry such as one or more processors 116 are still needed in order to execute the software. Further details related to the two implementations of the wearable computing device 10* illustrated in FIGS. 4A and 4B will be provided in greater detail below.

In still other implementations, the wearable computing device 10* may not actually include the various logic modules (e.g., the functional device presence sensing module 102*, the functional device choosing module 104*, and the functionality use facilitating module 106*) that implements the various operations/processes described herein. Instead, such logic modules may be located in a remote device such as at another device located near the wearable computing device 10* (e.g., another computing device located within the communication range 50* of the wearable computing device 10*). In such implementations, the other device having the various logic may direct or control the wearable computing device 10* to perform at least some of the processes and operations to be described herein.

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g., "configured to") generally encompass active-state components and/or inactive-state components and/or standby-state components, unless context requires otherwise.

Referring particularly now to FIG. 4A, which illustrates a block diagram of an wearable computing device 10' that includes a functional device presence sensing module 102', a functional device choosing module 104', a functionality use facilitating module 106', memory 114, user interface 112 (e.g., a display, a speaker, and so forth), one or more processors 116 (e.g., one or more microprocessors), transceiver 118, one or more sensors 120, and an antenna 130 (e.g., a directional antenna such as a metamaterial antenna, or an omnidirectional antenna). In various embodiments, the memory 114 may store one or more applications 154 (e.g., communication applications such as email, instant messaging, text messaging, and VoIP applications, personal information manager application such as Microsoft Outlook, gaming applications, productivity applications, and so forth). The one or more sensors 120 that may be included in the wearable computing device 10' may include, for example, one or more audio sensors (e.g., microphones), one or more visual sensors (e.g., cameras), one or more myoelectric sensors, and so forth.

In various embodiments, the functional device presence sensing module 102' of FIG. 4A is a logic module that may be designed to, among other things, detect or sense presence of a plurality of functional devices 20* within communication range 50* of the wearable computing device 10', the communication range 50* of the wearable computing device 10' being a spatial volume that includes the wearable computing device 10' and being externally defined by an enveloping boundary 52*, where low-power signals 70* transmitted by the wearable computing device 10' being discernible over background noise within the enveloping boundary 52* and not discernible over background noise outside the enveloping boundary 52*. In contrast, the functional device choosing module 104' of FIG. 4A is a logic module that may be configured to choose or select, from the plurality of functional devices 20* that were sensed to be within the communication range 50* of the wearable computing device 10', one or more functional devices 20* for providing to the wearable computing device 10' one or more functionalities. The functionality use facilitating module 106' of FIG. 4A, on the other hand, is a logic module that may be configured to facilitate the wearable computing device 10' to use the one or more functionalities provided by the one or more chosen or selected functional devices 20*.

Turning now to FIG. 4B, which illustrates a block diagram of another wearable computing device 10" that can implement the operations and processes to be described herein. As indicated earlier, the wearable computing device 10" in FIG. 4B is merely the "soft" version of the wearable computing device 10' of FIG. 4A because the various logic modules: the functional device presence sensing module 102", the functional device choosing module 104", and the functionality use facilitating module 106" are implemented using one or more processors 116 (e.g., one or more microprocessors or controllers) executing software (e.g., computer readable instructions 152) rather than being implemented using purely hardware (e.g., ASIC) solutions as was the case in the wearable computing device 10' of FIG. 4A. Thus, the functional device presence sensing module 102", the functional device choosing module 104", and the functionality use facilitating module 106" of FIG. 4B may be designed to execute the same functions as the functional device presence sensing module 102', the functional device choosing module 104', and the functionality use facilitating module 106' of FIG. 4A. The wearable computing device 10", as illustrated in FIG. 4B, may include other components (e.g., the user interface 112, the transceiver 118, directional antenna 130, memory 114 that stores one or more applications 154 as well as the computer readable instructions 152, and so forth) that are the same or similar to the other components that may be included in the wearable computing device 10' of FIG. 4A. Note that in the embodiment of the wearable computing device 10" illustrated in FIG. 4B, the various logic modules (e.g., the functional device presence sensing module 102", the functional device choosing module 104", and the functionality use facilitating module 106") may be implemented by the one or more processors 116 (or other types of circuitry such as field programmable gate arrays or FPGAs) executing one or more computer readable instructions 152 stored in memory 114.

In various embodiments, the memory 114 of the wearable computing device 10' of FIG. 4A and the wearable computing device 10" of FIG. 4B may comprise one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices.

Turning now to FIG. 5A illustrating a particular implementation of the functional device presence sensing module 102* (e.g., the functional device presence sensing module 102' or the functional device presence sensing module 102") of FIGS. 4A and 4B. As illustrated, the functional device presence sensing module 102* may include one or more sub-logic modules in various alternative implementations. For example, in various embodiments, the functional device presence sensing module 102* may include a low-power prompting signal broadcasting device directing module 502 (which may further include a transmitting antenna controlling module 506), a responsive signal monitoring device directing module 504 (which may further include a receiving antenna controlling module 508), a beacon signals detecting device controlling module 510, a power optimal functional device ascertaining module 512 (which may further include a signal strength ascertaining module 514), a functional device relative location ascertaining module 516 (which may further include a directional antenna control module 518), a low-power query signal transmit directing module 520, and/or a confirmation signal monitor directing module 530. Specific details related to the functional device presence sensing module 102* as well as the above-described sub-modules of the functional device presence sensing module 102* will be provided below with respect to the operations and processes to be described herein.

Turning now to FIG. 5B illustrating a particular implementation of the functional device choosing module 104* (e.g., the functional device choosing module 104' or the functional device choosing module 104") of FIGS. 4A and 4B. As illustrated, the functional device choosing module 104* may include one or more sub-logic modules in various alternative implementations. For example, in various embodiments, the functional device choosing module 104* may include a least communication power requirement determining module 540, an earliest functionality access determining module 542, a relative device location determining module 544, a commonly associated user determining module 546, a highest data transfer rate determining module 548, an application access determining module 550, a sensor data based functional device choosing module 552, a communication link providing device choosing module 554, and/or a sensor functionality providing device choosing module 556. Specific details related to the functional device choosing module 104* as well as the above-described sub-modules of the functional device choosing module 104* will be provided below with respect to the operations and processes to be described herein.

Figure 5C:
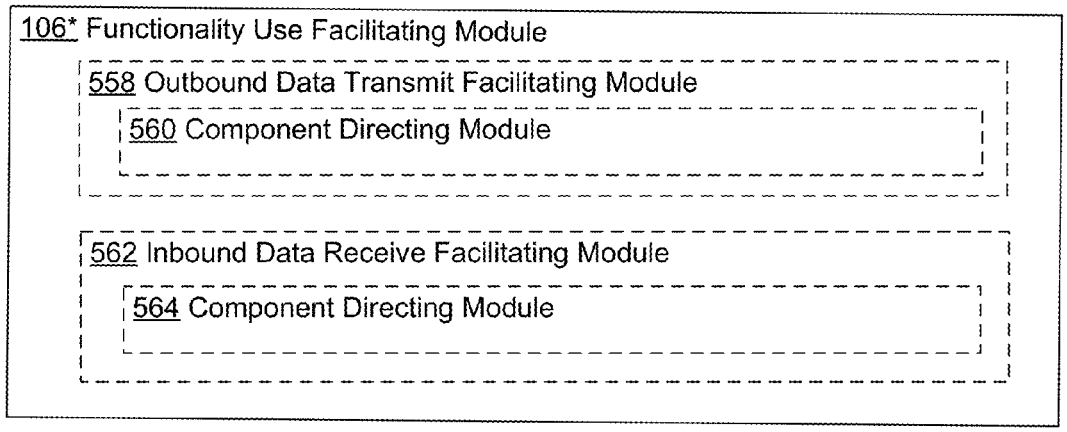
FIG. 5C shows another perspective of the functionality use facilitating module 106* of FIGS. 4A and 4B (e.g., the functionality use facilitating module 106' of FIG. 4A or the functionality use facilitating module 106" of FIG. 4B) in accordance with various implementations.

FIG. 5C illustrates a particular implementation of the functionality use facilitating module 106* (e.g., the functionality use facilitating module 106' or the functionality use facilitating module 106") of FIG. 4A or 4B. As illustrated, the functionality use facilitating module 106* may include one or more sub-logic modules in various alternative embodiments. For example, in various embodiments, the functionality use facilitating module 106* may include an outbound data transmit facilitating module 558 (which may further include a component directing module 560) and/or an inbound data receive facilitating module 562 (which may further include a component directing module 564). Note that in some embodiments, the component directing module 560 and the component directing module 564 may be the same common module. Specific details related to the functionality use facilitating module 106*, as well as the above-described sub-modules of the functionality use facilitating module 106*, will be provided below with respect to the operations and processes to be described herein.

Figure 6:
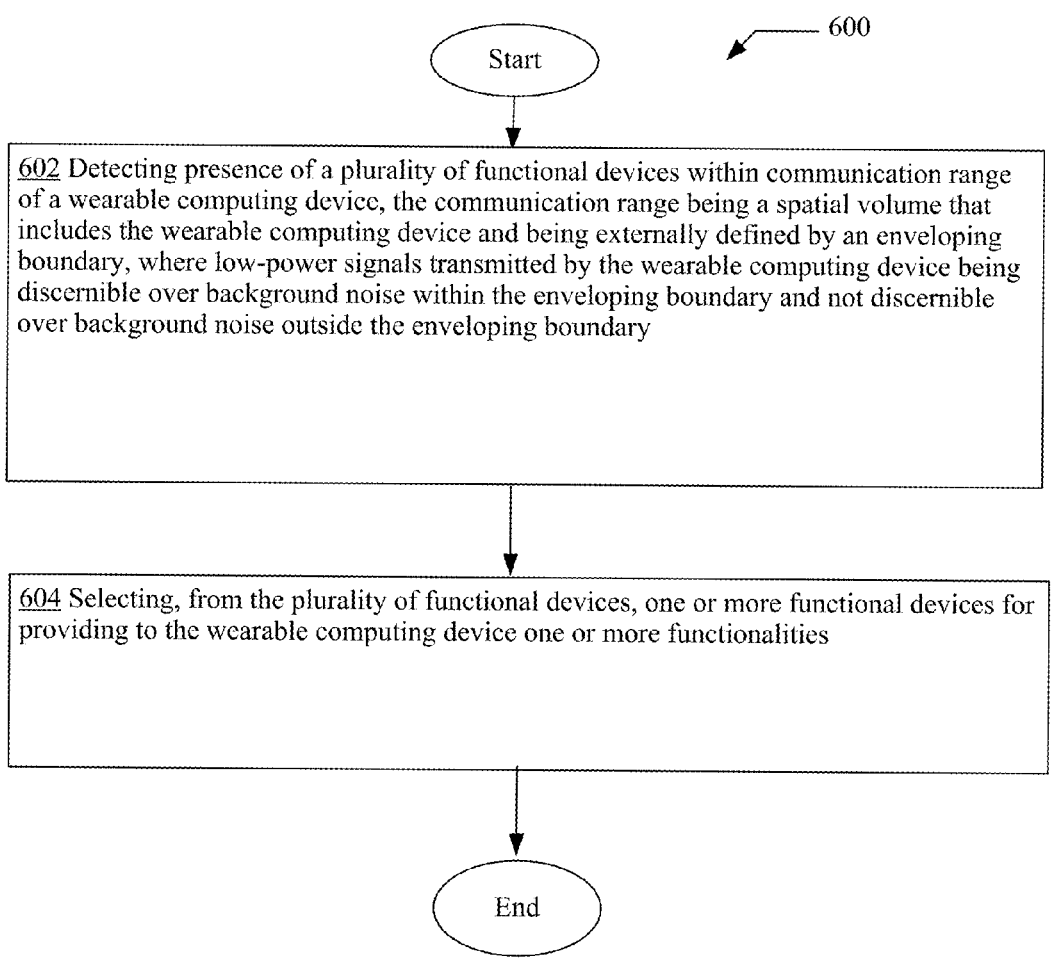
FIG. 6 is a high-level logic flowchart of a process, e.g., operational flow 600, according to some embodiments.

A more detailed discussion related to the wearable computing device 10* (e.g., the wearable computing device 10' of FIG. 4A or the wearable computing device 10" of FIG. 4B) discussed above will now be provided with respect to the processes and operations to be described herein. FIG. 6 illustrates an operational flow 600 representing example computationally-implemented operations that may be implemented for, among other things, detecting or sensing presence of a plurality of functional devices 20* within the limited communication range 50* of a wearable computing device 10* having relatively small form-factor; and selecting or choosing from the plurality of functional devices 20* that were detected or sensed to be present within the limited communication range 50* of the wearable computing device 10*, one or more functional devices 20* for providing to the wearable computing device 10* one or more functionalities (e.g., communication links to beyond the communication range 50* of the wearable computing device 10*, sensor functionalities, GPS functionalities, and so forth). In various implementations, these operations may be implemented through the wearable computing device 10* of FIG. 4A or 4B (as well as FIG. 1A, 1B, 1C, or 1D).

In FIG. 6 and in the following figures that include various examples of operational flows, discussions and explanations will be provided with respect to the wearable computing device 10* described above and as illustrated in FIGS. 4A, 4B, 5A, 5B, 5C, and/or with respect to other examples (e.g., as provided in FIGS. 1A, 1B, 1C, 1D, 2A, 2B, 3A, 3B, and 3C) and contexts. However, it should be understood that the operational flows may be executed in a number of other environments and contexts, and/or in modified versions of FIGS. 1A, 1B, 1C, 1D, 2A, 2B, 3A, 3B, 3C, 4A, 4B, 5A, 5B, and/or 5C. Also, although the various operational flows are presented in the sequence(s) illustrated, it should be understood that the various operations may be performed in orders other than those which are illustrated, or may be performed concurrently.

Further, in FIG. 6 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 6 as well as the other operations to be described herein are performed by at least one of a machine, an article of manufacture, or a composition of matter unless indicated otherwise.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

In any event, after a start operation, the operational flow 600 of FIG. 6 may move to a functional device presence detecting operation 602 for detecting presence of a plurality of functional devices within communication range of a wearable computing device, the communication range being a spatial volume that includes the wearable computing device and being externally defined by an enveloping boundary, where low-power signals transmitted by the wearable computing device being discernible over background noise within the enveloping boundary and not discernible over background noise outside the enveloping boundary. For instance, and as illustration, the functional device presence sensing module 102* of the wearable computing device 10* of FIG. 4A or 4B (e.g., the functional device presence sensing module 102' of FIG. 4A or the functional device presence sensing module 102" of FIG. 4B) detecting or sensing presence of a plurality of (e.g., two or more) functional devices 20* within communication range 50* of a wearable computing device 10*, the communication range 50* (see, for example, FIG. 1A or 1B) being a spatial volume that includes the wearable computing device 10* and being externally defined by an enveloping boundary 52* (see, for example, FIG. 1A or 1B), where low-power signals 70* (see, for example, FIG. 1A or 1B) transmitted by the wearable computing device 10* being discernible over background noise within the enveloping boundary 52* and not discernible over background noise outside the enveloping boundary 52*. Note that references in the following to "low-power" such as, for example, the one or more "low-power" signals 70* (or similar such phrases such as the "low-power" prompting signals 82 or the "low-power" query signals 84) may be in reference to the relatively low amount of transmit power (e.g., less than 0.8 milliwatt) used to wirelessly transmit such signals. As described earlier, a functional device 20* may be any device that can provide one or more functionalities (e.g., ability to communicate beyond the communication range 50* of the wearable computing device 10*, sensor functionalities, GPS functionalities, and so forth) that may be needed or sought by wearable computing device 10*.

Operational flow 600 may also include a functional device selecting operation 604 for selecting, from the plurality of functional devices, one or more functional devices for providing to the wearable computing device one or more functionalities. For instance, the functional device choosing module 104* (e.g., the functional device choosing module 104' of FIG. 4A or the functional device choosing module 104" of FIG. 4B) of the wearable computing device 10* of FIG. 4A or 4B selecting or choosing, from the plurality of functional devices 20* that were detected or sensed to be present within the communication range 50* of the wearable computing device 10*, one or more functional devices 20* for providing to the wearable computing device 10* one or more functionalities (e.g., a communication link 90* to beyond the communication range 50* of the wearable computing device 10* or one or more sensor functionalities such visual, audio, and/ or movement sensor functionalities). For example, in the example illustrated in FIG. 1A, selecting functional device 20a for providing to the wearable computing device 10* a communication link 90a to beyond the communication range 50* of the wearable computing device 10*.

As will be described below, the functional device presence detecting operation 602 and the functional device selecting operation 604 may be executed in a variety of different ways in various alternative implementations. FIGS. 7A, 7B, 7C, 7D, 7E, 7F, 7G, 7H, 7J, and 7K, for example, illustrate at least some of the alternative ways that the functional device presence detecting operation 602 of FIG. 6 may be executed in various alternative implementations. In some cases, for example, the functional device presence detecting operation 602 may include an operation 702 for detecting the presence of the plurality of functional devices within the communication range of the wearable computing device by detecting presence of a plurality of functional devices within the communication range of the wearable computing device based, at least in part, on plurality of signals transmitted by the plurality of functional devices and received by the wearable computing device as illustrated in FIGS. 7A, 7B, 7C, 7D, 7E, 7F, and 7G. For instance, the functional device presence sensing module 102* of the wearable computing device 10* (e.g., the wearable computing device 10' of FIG. 4A or the wearable computing device 10" of FIG. 4B) detecting the presence of the plurality of functional devices 20* within the communication range 50* of the wearable computing device 10* by detecting or sensing presence of a plurality of functional devices 20* (e.g., functional devices 20a, 20b, and 20c of FIGS. 1A, 1B, 1C, and 1D) within the communication range 50* of the wearable computing device 10* based, at least in part, on plurality of signals 80 (see, for example, FIG. 1C) transmitted by the plurality of functional devices 20* and received (e.g., detected) by the wearable computing device 10*.

In various implementations, operation 702 may further include one or more additional operations including, in some implementations, an operation 703a for directing the wearable computing device to broadcast one or more low-power prompting signals that are designed to, when one or more functional devices detect the one or more low-power prompting signals, prompt the one or more functional devices to generate one or more responsive signals to acknowledge detection by the one or more functional devices of the one or more low-power prompting signals and an operation 703b for directing the wearable computing device to monitor for the plurality of signals, the plurality of signals being a plurality of responsive signals that acknowledges that the plurality of functional devices detected the one or more low-power prompting signals as illustrated, for example, in FIG. 7A, 7B, 7C, 7D, or 7E. For instance, the low-power prompting signal broadcast directing module 502 (see FIG. 5A) of the wearable computing device 10* of FIG. 4A or 4B directing the wearable computing device 10* (e.g., controlling or instructing one or more components of the wearable computing device 10* such as the transceiver 118) to broadcast one or more low-power prompting signals 82 (see, for example, FIG. 1C) that are designed to, when one or more functional devices 20* detect the one or more low-power prompting signals 82, prompt the one or more functional devices 20* to generate one or more responsive signals (e.g., signals 80 of FIG. 1C) to acknowledge detection by the one or more functional devices 20* of the one or more low-power prompting signals 82. The responsive signal monitor directing module 504 of the wearable computing device 10* of FIG. 4A or 4B may then direct the wearable computing device 10* (e.g., control or instruct one or more components of the wearable computing device 10* such as the transceiver 118) to monitor for the plurality of signals 80, the plurality of signals 80 being a plurality of responsive signals that acknowledges that the plurality of functional devices 20* detected the one or more low-power prompting signals 82.

Figure 7A:
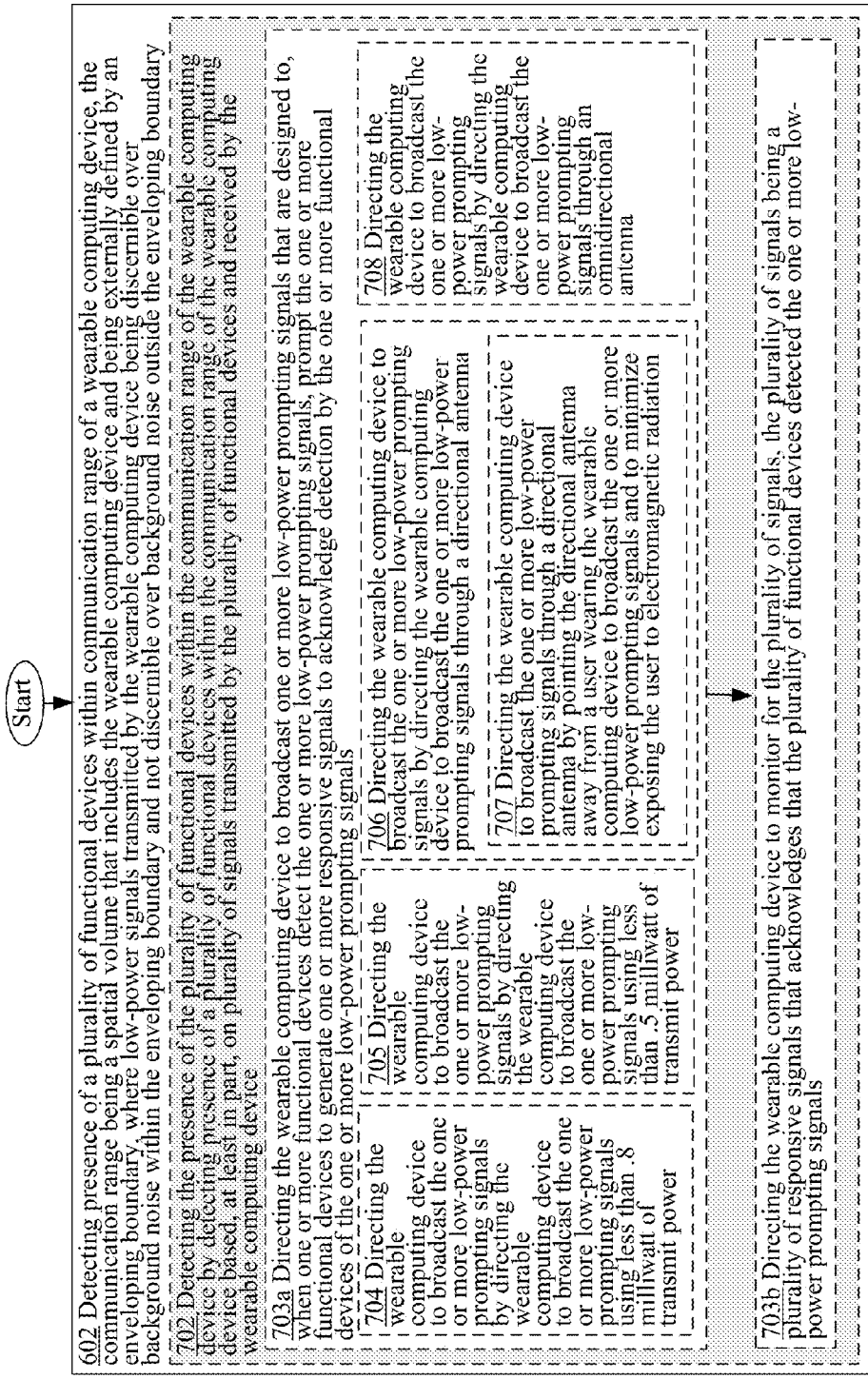
FIG. 7A is a high-level logic flowchart of a process depicting alternate implementations of the functional device presence detecting operation 602 of FIG. 6.

As further illustrated in FIG. 7A, in some cases, operation 703a may further include or involve an operation 704 for directing the wearable computing device to broadcast the one or more low-power prompting signals by directing the wearable computing device to broadcast the one or more low-power prompting signals using less than 0.8 milliwatt of transmit power. For instance, the low-power prompting signal broadcast directing module 502 of the wearable computing device 10* of FIG. 4A or 4B directing the wearable computing device 10* to broadcast or transmit the one or more low-power prompting signals 82 by directing (e.g., controlling or instructing) the wearable computing device 10* to broadcast, via an antenna 130 (e.g., directional or omnidirectional antenna), the one or more low-power prompting signals 82 using less than 0.8 milliwatt of transmit power.

In some implementations, the operation 703a may actually include or involve an operation 705 for directing the wearable computing device to broadcast the one or more low-power prompting signals by directing the wearable computing device to broadcast the one or more low-power prompting signals using less than 0.5 milliwatt of transmit power. For instance, the low-power prompting signal broadcast directing module 502 of the wearable computing device 10* of FIG. 4A or 4B directing the wearable computing device 10* to broadcast the one or more low-power prompting signals 82 by directing the wearable computing device 10* to broadcast or transmit, via an antenna 130 such as a directional or omnidirectional antenna, the one or more low-power prompting signals 82 using less than 0.5 milliwatt of transmit power. For example, instructing/controlling the transceiver 118 of the wearable computing device 10* and using a directional antenna in order to transmit the one or more low-power prompting signals 82.

In the same or alternative implementations, operation 703a may additionally or alternatively include or involve an operation 706 for directing the wearable computing device to broadcast the one or more low-power prompting signals by directing the wearable computing device to broadcast the one or more low-power prompting signals through a directional antenna. For instance, the low-power prompting signal broadcast directing module 502 of the wearable computing device 10* of FIG. 4A or 4B directing the wearable computing device 10* to broadcast the one or more low-power prompting signals 82 by directing the wearable computing device 10* to broadcast the one or more low-power prompting signals 82 through a directional antenna (e.g., antenna 130 of FIG. 4A or 4B).

In some cases, operation 706 may further include or involve an operation 707 for directing the wearable computing device to broadcast the one or more low-power prompting signals through a directional antenna by pointing the directional antenna away from a user wearing the wearable computing device to broadcast the one or more low-power prompting signals and to minimize exposing the user to electromagnetic radiation. For instance, the low-power prompting signal broadcast directing module 502 including the transmitting antenna controlling module 506 (see FIG. 5A) of the wearable computing device 10* of FIG. 4A or 4B directing the wearable computing device 10* to broadcast the one or more low-power prompting signals 82 through a directional antenna (e.g., metamaterial antenna) when the transmitting antenna controlling module 506 points or controls the directional antenna (e.g., antenna 130) away from a user wearing the wearable computing device 10* to broadcast the one or more low-power prompting signals 82 and to minimize exposing the user to electromagnetic radiation.

In various implementations, operation 703a may include or involve an operation 708 for directing the wearable computing device to broadcast the one or more low-power prompting signals by directing the wearable computing device to broadcast the one or more low-power prompting signals through an omnidirectional antenna. For instance, the low-power prompting signal broadcast directing module 502 of the wearable computing device 10* of FIG. 4A or 4B directing the wearable computing device 10* to broadcast the one or more low-power prompting signals 82 by directing the wearable computing device 10* (e.g., controlling or instructing the transceiver 118 of the wearable computing device 10*) to broadcast the one or more low-power prompting signals 82 through an omnidirectional antenna (e.g., antenna 130).

Figure 7B:
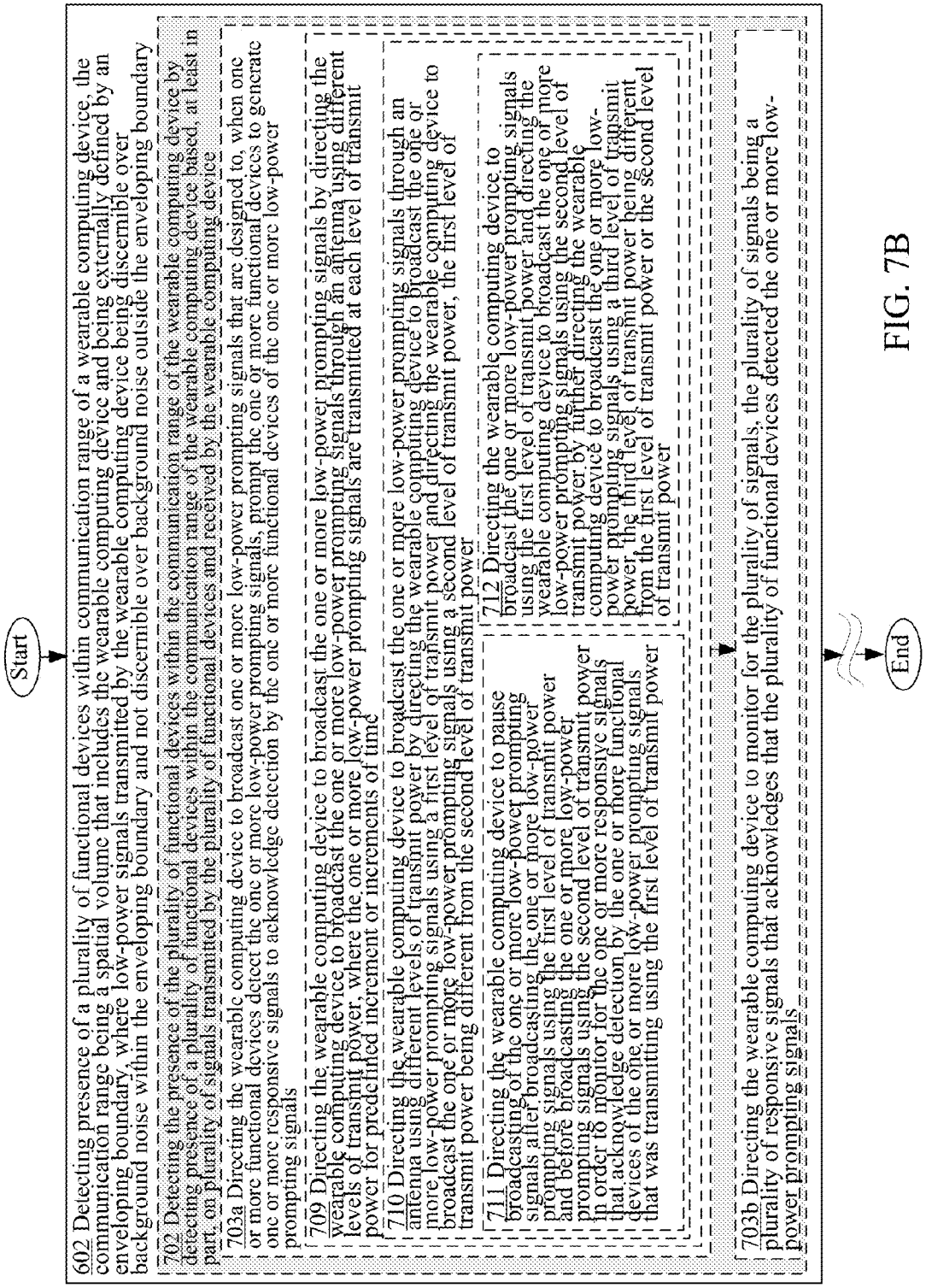
FIG. 7B is a high-level logic flowchart of a process depicting alternate implementations of the functional device presence detecting operation 602 of FIG. 6.

Turning now to FIG. 7B, in various implementations, operation 703a may include or involve an operation 709 for directing the wearable computing device to broadcast the one or more low-power prompting signals by directing the wearable computing device to broadcast the one or more low-power prompting signals through an antenna using different levels of transmit power, where the one or more low-power prompting signals are transmitted at each level of transmit power for predefined increment or increments of time. For instance, the low-power prompting signal broadcast directing module 502 of the wearable computing device 10* of FIG. 4A or 4B directing the wearable computing device 10* to broadcast the one or more low-power prompting signals 82 by directing the wearable computing device 10* (e.g., controlling or instructing one or more components of the wearable computing device 10*) to broadcast the one or more low-power prompting signals 82 through an antenna 130 using different levels of transmit power, where the one or more low-power prompting signals 82 are transmitted at each level of transmit power for predefined increment or increments of time. For example, initially transmitting the one or more low-power prompting signals 82 using 0.3 milliwatt of transmit power for 0.1 microseconds, then transmitting the one or more low-power prompting signals 82 using 0.4 milliwatt of transmit power for 0.1 microseconds, then transmitting the one or more low-power prompting signals 82 using 0.5 milliwatt of transmit power for 0.1 microseconds, and so forth.

As further illustrated in FIG. 7B, in some implementations operation 709 may further include or involve an operation 710 for directing the wearable computing device to broadcast the one or more low-power prompting signals through an antenna using different levels of transmit power by directing the wearable computing device to broadcast the one or more low-power prompting signals using a first level of transmit power and directing the wearable computing device to broadcast the one or more low-power prompting signals using a second level of transmit power, the first level of transmit power being different from the second level of transmit power. For instance, the low-power prompting signal broadcast directing module 502 of the wearable computing device 10* of FIG. 4A or 4B directing the wearable computing device 10* to broadcast the one or more low-power prompting signals 82 through an antenna 130 using different levels of transmit power by directing or controlling the wearable computing device 10* to broadcast the one or more low-power prompting signals 10* using a first level of transmit power (e.g., 0.3 milliwatt) and directing the wearable computing device 10* to broadcast the one or more low-power prompting signals 82 using a second level of transmit power (e.g., 5 milliwatt), the first level of transmit power being different from the second level of transmit power.

In some cases, operation 710 may, in turn, further include or involve an operation 711 for directing the wearable computing device to pause broadcasting of the one or more low-power prompting signals after broadcasting the one or more low-power prompting signals using the first level of transmit power and before broadcasting the one or more low-power prompting signals using the second level of transmit power in order to monitor for the one or more responsive signals that acknowledge detection by the one or more functional devices of the one or more low-power prompting signals that was transmitting using the first level of transmit power. For instance, the low-power prompting signal broadcast directing module 502 of the wearable computing device 10* of FIG. 4A or 4B directing the wearable computing device 10* to pause (e.g., pause for 0.05 microseconds) broadcasting of the one or more low-power prompting signals 82 after broadcasting the one or more low-power prompting signals 82 using the first level of transmit power (e.g., 3 milliwatt) and before broadcasting the one or more low-power prompting signals 82 using the second level of transmit power (e.g., 0.5 milliwatt) in order to monitor for the one or more responsive signals (e.g., signals 80) that acknowledge detection by the one or more functional devices 20* of the one or more low-power prompting signals 82 that was transmitting using the first level of transmit power (e.g., 0.3 milliwatt).

In the same or alternative implementations, operation 710 may additionally or alternatively include or involve an operation 712 for directing the wearable computing device to broadcast the one or more low-power prompting signals using the first level of transmit power and directing the wearable computing device to broadcast the one or more low-power prompting signals using the second level of transmit power by further directing the wearable computing device to broadcast the one or more low-power prompting signals using a third level of transmit power, the third level of transmit power being different from the first level of transmit power or the second level of transmit power. For instance, the low-power prompting signal broadcast directing module 502 of the wearable computing device 10* of FIG. 4A or 4B directing the wearable computing device 10* to broadcast the one or more low-power prompting signals 82 using the first level of transmit power (e.g., 0.3 milliwatt) and directing the wearable computing device 10* to broadcast the one or more low-power prompting signals 82 using the second level of transmit power (e.g., 0.5 milliwatt) by further directing or controlling the wearable computing device 10* to broadcast the one or more low-power prompting signals 82 using a third level of transmit power (e.g., 0.7 milliwatt), the third level of transmit power being different from the first level of transmit power or the second level of transmit power.

Figure 7C:
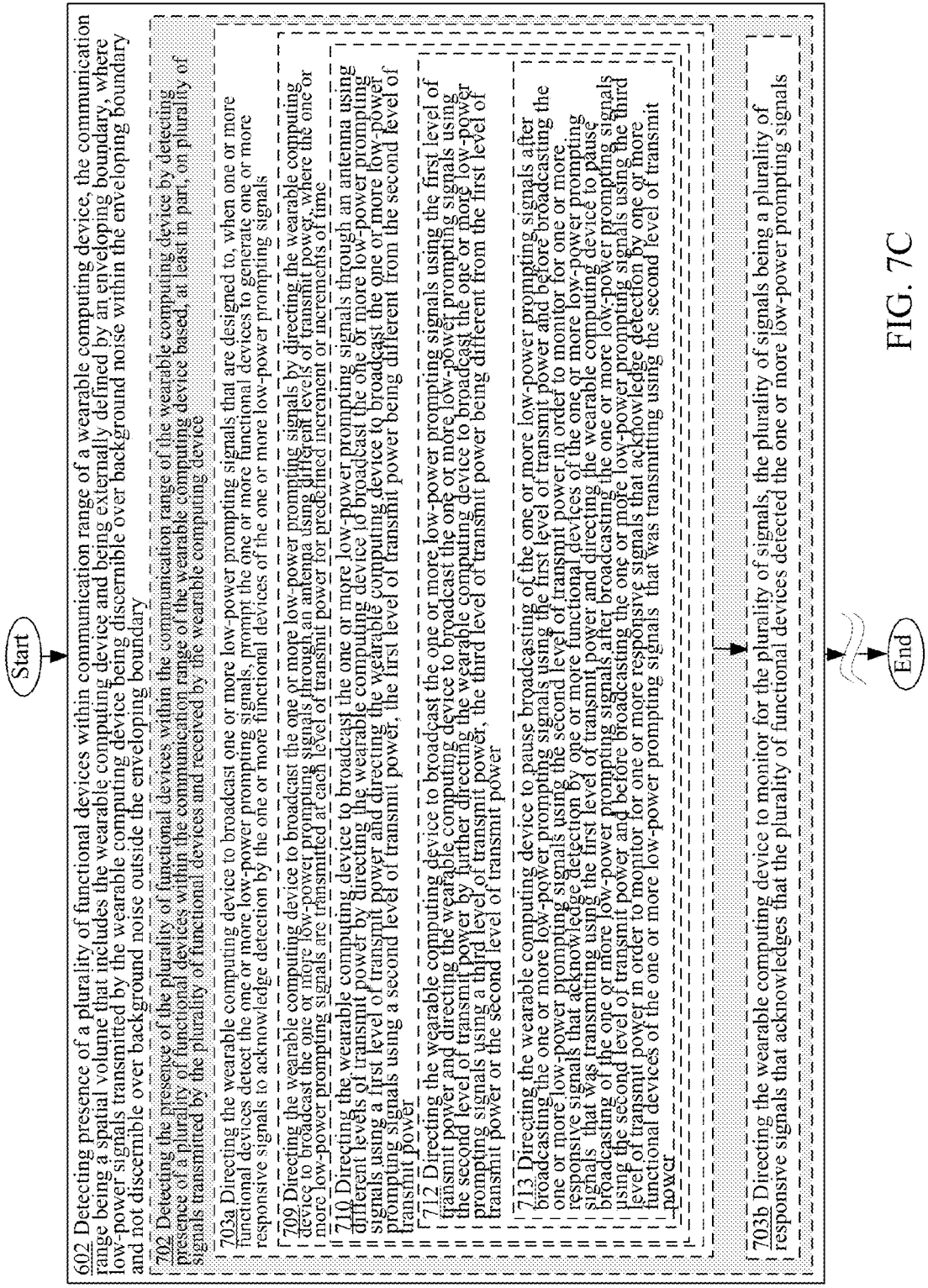
FIG. 7C is a high-level logic flowchart of a process depicting alternate implementations of the functional device presence detecting operation 602 of FIG. 6.

In some cases, operation 712 may further include or involve an operation 713 for directing the wearable computing device to pause broadcasting of the one or more low-power prompting signals after broadcasting the one or more low-power prompting signals using the first level of transmit power and before broadcasting the one or more low-power prompting signals using the second level of transmit power in order to monitor for one or more responsive signals that acknowledge detection by one or more functional devices of the one or more low-power prompting signals that was transmitted using the first level of transmit power and directing the wearable computing device to pause broadcasting of the one or more low-power prompting signals after broadcasting the one or more low-power prompting signals using the second level of transmit power and before broadcasting the one or more low-power prompting signals using the third level of transmit power in order to monitor for one or more responsive signals that acknowledge detection by one or more functional devices of the one or more low-power prompting signals that was transmitting using the second level of transmit power as illustrated in FIG. 7C. For instance, the low-power prompting signal broadcast directing module 502 of the wearable computing device 10* of FIG. 4A or 4B directing the wearable computing device 10* to pause (e.g., pause for 0.03 microseconds) broadcasting of the one or more low-power prompting signals 82 after broadcasting the one or more low-power prompting signals using the first level of transmit power (e.g., 0.3 milliwatt) and before broadcasting the one or more low-power prompting signals 82 using the second level of transmit power (e.g., 0.5 milliwatt) in order to monitor for one or more responsive signals (e.g., signals 80 of FIG. 1C) that acknowledge detection by one or more functional devices 20* of the one or more low-power prompting signals 82 that was transmitted using the first level of transmit power (e.g., 0.3 milliwatt) and directing the wearable computing device 10* to pause (e.g., 0.03 microseconds) broadcasting of the one or more low-power prompting signals 82 after broadcasting the one or more low-power prompting signals 82 using the second level of transmit power (e.g., 0.5 milliwatt) and before broadcasting the one or more low-power prompting signals 82 using the third level of transmit power (e.g., 0.7 milliwatt) in order to monitor for one or more responsive signals (e.g., signals 80 of FIG. 1C) that acknowledge detection by one or more functional devices 20* of the one or more low-power prompting signals 82 that was transmitting using the second level of transmit power (e.g., 0.5 milliwatt).

Figure 7D:
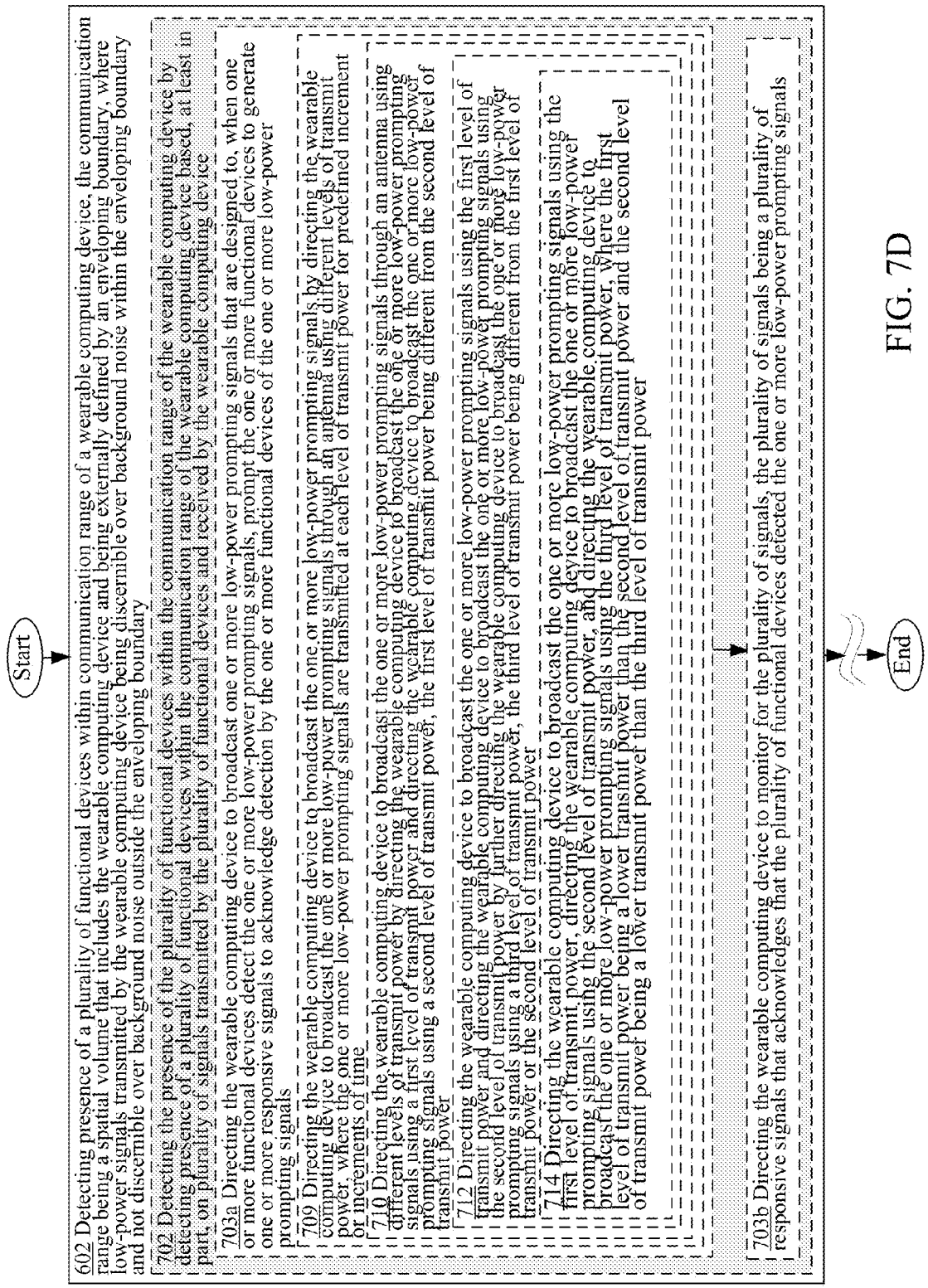
FIG. 7D is a high-level logic flowchart of a process depicting alternate implementations of the functional device presence detecting operation 602 of FIG. 6.

Referring to FIG. 7D, in the same or alternative implementations, operation 712 may additionally or alternatively include or involve an operation 714 for directing the wearable computing device to broadcast the one or more low-power prompting signals using the first level of transmit power, directing the wearable computing device to broadcast the one or more low-power prompting signals using the second level of transmit power, and directing the wearable computing device to broadcast the one or more low-power prompting signals using the third level of transmit power, where the first level of transmit power being a lower transmit power than the second level of transmit power and the second level of transmit power being a lower transmit power than the third level of transmit power. For instance, the low-power prompting signal broadcast directing module 502 of the wearable computing device 10* of FIG. 4A or 4B directing the wearable computing device 10* to broadcast the one or more low-power prompting signals 82 using the first level of transmit power (e.g., 0.2 milliwatt), directing the wearable computing device 10* to broadcast the one or more low-power prompting signals 82 using the second level of transmit power (e.g., 0.4 milliwatt), and directing the wearable computing device 10* to broadcast the one or more low-power prompting signals 82 using the third level of transmit power (e.g., 0.6 milliwatt), where the first level of transmit power being a lower transmit power than the second level of transmit power and the second level of transmit power being a lower transmit power than the third level of transmit power.

Figure 7E:
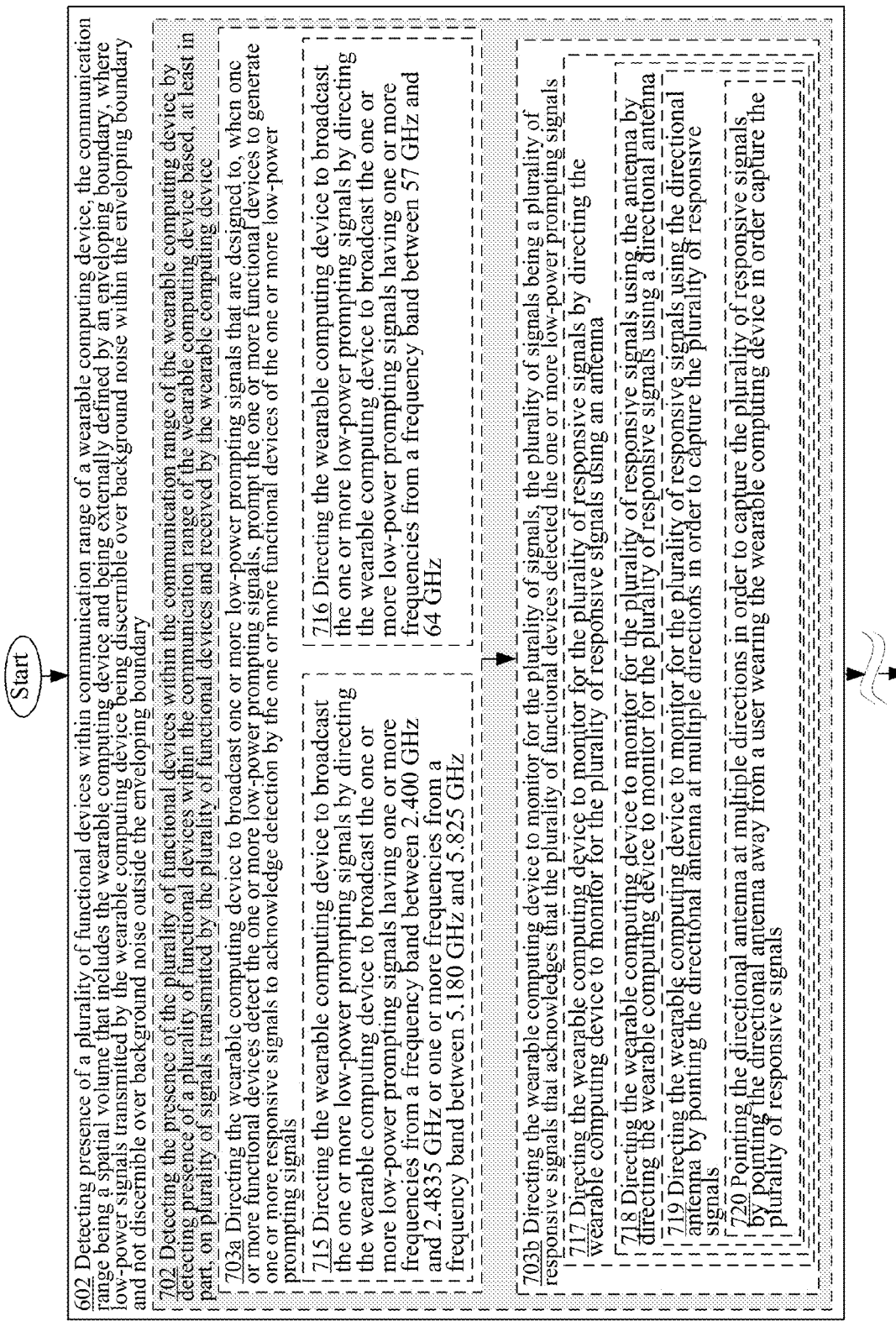
FIG. 7E is a high-level logic flowchart of a process depicting alternate implementations of the functional device presence detecting operation 602 of FIG. 6.

Turning now to FIG. 7E, in various implementations, operation 703a may include or involve an operation 715 for directing the wearable computing device to broadcast the one or more low-power prompting signals by directing the wearable computing device to broadcast the one or more low-power prompting signals having one or more frequencies from a frequency band between 2.400 GHz and 2.4835 GHz or one or more frequencies from a frequency band between 5.180 GHz and 5.825 GHz. For instance, the low-power prompting signal broadcast directing module 502 of the wearable computing device 10* of FIG. 4A or 4B directing the wearable computing device 10* to broadcast the one or more low-power prompting signals 82 by directing or controlling the wearable computing device 10* to broadcast the one or more low-power prompting signals 82 having one or more frequencies from a frequency band between 2.400 GHz and 2.4835 GHz (e.g., the 2.4 GHz frequency band) or one or more frequencies from a frequency band between 5.180 GHz and 5.825 GHz (e.g., the 5 GHz frequency band).

In some alternative implementations, operation 703*a* may include or involve an operation 716 for directing the wearable computing device to broadcast the one or more low-power prompting signals by directing the wearable computing device to broadcast the one or more low-power prompting signals having one or more frequencies from a frequency band between 57 GHz and 64 GHz. For instance, the low-power prompting signal broadcast directing module 502 of the wearable computing device 10* of FIG. 4A or 4B directing the wearable computing device 10* to broadcast the one or more low-power prompting signals 82 by directing or controlling the wearable computing device 10* to broadcast the one or more low-power prompting signals 82 having one or more frequencies from a frequency band between 57 GHz and 64 GHz (e.g., the 60 GHz frequency band).

In various implementations, the operation 703*b* for directing the wearable computing device to monitor for the plurality of signals, the plurality of signals being a plurality of responsive signals that acknowledges that the plurality of functional devices detected the one or more low-power prompting signals may actually include or involve an operation 717 for directing the wearable computing device to monitor for the plurality of responsive signals by directing the wearable computing device to monitor for the plurality of responsive signals using an antenna as further illustrated in FIG. 7E. For instance, the responsive signal monitor directing module 504 of the wearable computing device 10* of FIG. 4A or 4B directing the wearable computing device 10* to monitor for the plurality of responsive signals by directing the wearable computing device 10* (e.g., by controlling or instructing one or more components of the wearable computing device 10*) to monitor for the plurality of responsive signals (e.g., signals 80 of FIG. 1C) using an antenna 130.

As further illustrated in FIG. 7E, operation 717 may, in turn, further include or involve an operation 718 for directing the wearable computing device to monitor for the plurality of responsive signals using the antenna by directing the wearable computing device to monitor for the plurality of responsive signals using a directional antenna. For instance, the responsive signal monitor directing module 504 of the wearable computing device 10* of FIG. 4A or 4B directing the wearable computing device 10* to monitor for the plurality of responsive signals using the antenna 130 by directing the wearable computing device 10* (e.g., by controlling or instructing one or more components of the wearable computing device 10*) to monitor for the plurality of responsive signals (e.g., signals 80 of FIG. 1C) using a directional antenna (e.g., metamaterial antenna).

In some implementations operation 718 may further include or involve an operation 719 for directing the wearable computing device to monitor for the plurality of responsive signals using the directional antenna by pointing the directional antenna at multiple directions in order to capture the plurality of responsive signals. For instance, the responsive signal monitor directing module 504 including the receiving antenna controlling module 508 (see FIG. 5A) of the wearable computing device 10* of FIG. 4A or 4B directing the wearable computing device 10* to monitor for the plurality of responsive signals using the directional antenna when the receiving antenna controlling module 508 points the directional antenna (e.g., metamaterial antenna) at multiple directions in order to capture the plurality of responsive signals (e.g., signals 80 of FIG. 7C).

As further illustrated in FIG. 7E, in some implementations, operation 719 may further include or involve an operation 720 for pointing the directional antenna at multiple directions in order to capture the plurality of responsive signals by pointing the directional antenna away from a user wearing the wearable computing device in order capture the plurality of responsive signals. For instance, the receiving antenna controlling module 508 of the wearable computing device 10* of FIG. 4A or 4B pointing the directional antenna at multiple directions in order to capture the plurality of responsive signals by pointing the directional antenna (e.g., antenna 130 of FIG. 4A or 4B) away from a user wearing the wearable computing device 10* in order capture the plurality of responsive signals (e.g., signals 80 of FIG. 1C).

Figure 7F:
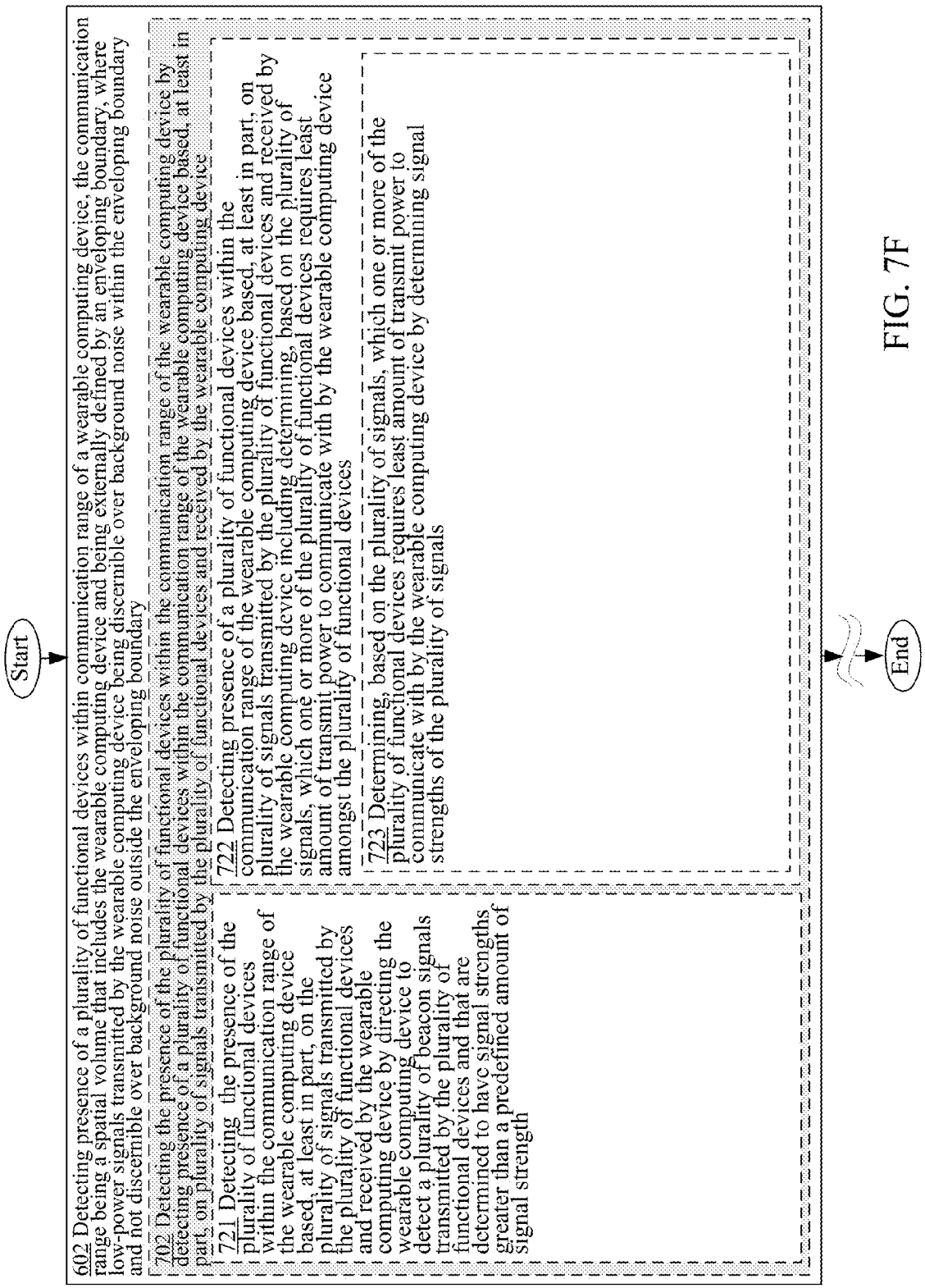
FIG. 7F is a high-level logic flowchart of a process depicting alternate implementations of the functional device presence detecting operation 602 of FIG. 6.

Turning now to FIG. 7F, in various implementations, the operation 702 for detecting the presence of the plurality of functional devices within the communication range of the wearable computing device by detecting presence of a plurality of functional devices within the communication range of the wearable computing device based, at least in part, on plurality of signals transmitted by the plurality of functional devices and received by the wearable computing device may include or involve an operation 721 for detecting the presence of the plurality of functional devices within the communication range of the wearable computing device based, at least in part, on the plurality of signals transmitted by the plurality of functional devices and received by the wearable computing device by directing the wearable computing device to detect a plurality of beacon signals transmitted by the plurality of functional devices and that are determined to have signal strengths greater than a predefined amount of signal strength. For instance, the functional device presence sensing module 102* including the beacon signals detect controlling module 510 (see FIG. 5A) of the wearable computing device 10* of FIG. 4A or 4B detecting the presence of the plurality of functional devices 20* within the communication range 50* of the wearable computing device 10* based, at least in part, on the plurality of signals 80 (see FIG. 1C for example) transmitted by the plurality of functional devices 20* and received by the wearable computing device 10* when the beacon signals detect controlling module 510 directs or controls the wearable computing device 10* to detect a plurality of beacon signals (e.g., signals 80 of FIG. 1C) transmitted by the plurality of functional devices 20* and that are determined by, for example, the beacon signals detect controlling module 510 to have signal strengths greater than a predefined amount of signal strength. That is, in some cases, the strengths of the plurality of beacon signals received by the wearable computing device 10* may be ascertained in order to determine whether the plurality of functional devices 20* that transmitted the plurality of beacon signals are within the communication range 50* of the wearable computing device 10*. In some cases, "beacon signals" are unsolicited signals that are transmitted by functional devices 20*, which is in contrast to "responsive signals" that were previously described and which are transmitted by functional devices 20* in response to the functional devices 20* detecting one or more low-power prompting signals 82.

In the same or alternative implementations, operation 702 may include or involve an operation 722 for detecting presence of a plurality of functional devices within the communication range of the wearable computing device based, at least in part, on plurality of signals transmitted by the plurality of functional devices and received by the wearable computing device including determining, based on the plurality of signals, which one or more of the plurality of functional devices requires least amount of transmit power to communicate with by the wearable computing device amongst the plurality of functional devices. For instance, the functional device presence sensing module 102* including the power optimal functional device ascertaining module 512 (see FIG. 5A) of the wearable computing device 10* of FIG. 4A or 4B detecting presence of a plurality of functional devices 20* within the communication range 50* of the wearable computing device 10* based, at least in part, on plurality of signals 80 transmitted by the plurality of functional devices 20* and received by the wearable computing device 10* including determining, by the power optimal functional device ascertaining module 512 and based on the plurality of signals 80, which one or more of the plurality of functional devices 20* that were determined to be within the communication range 50* of the wearable computing device 10* requires least amount of transmit power to communicate with by the wearable computing device 10* amongst the plurality of functional devices 20*. That is, the nearer that a particular functional device 20* is to the wearable computing device 10* the lessor amount of power may be needed by the wearable computing device 10* in order to communicate with the particular functional device 20*.

In some cases, operation 722 may, in turn, further include or involve an operation 723 for determining, based on the plurality of signals, which one or more of the plurality of functional devices requires least amount of transmit power to communicate with by the wearable computing device by determining signal strengths of the plurality of signals. For instance, the power optimal functional device ascertaining module 512 including the signal strength ascertaining module 514 (see FIG. 5A) of the wearable computing device 10* of FIG. 4A or 4B determining, based at least in part on the plurality of signals 80 transmitted by the plurality of functional devices 20*, which one or more of the plurality of functional devices 20* requires least amount of transmit power to communicate with by the wearable computing device 10* when the signal strength ascertaining module 514 determines or ascertains signal strengths of the plurality of signals 80 received by the wearable computing device 10*. For example, if the signal strength of a first signal 80 (that was transmitted by a first functional device 20a) received by the wearable computing device 10* is determined to be greater than the signal strength of a second signal 80 (that was transmitted by a second functional device 20b) received by the wearable computing device 10*, then an inference may be made that less power will be needed by the wearable computing device 10* in order to communicate with the first functional device 20a than the second functional device 20b. Of course, this inference can only be made if the first signal 80 and the second signal 80 were transmitted by the first functional device 20a and the second functional device 20b under similar or the same conditions (e.g., transmitted using same transmit power and same frequencies).

Figure 7G:
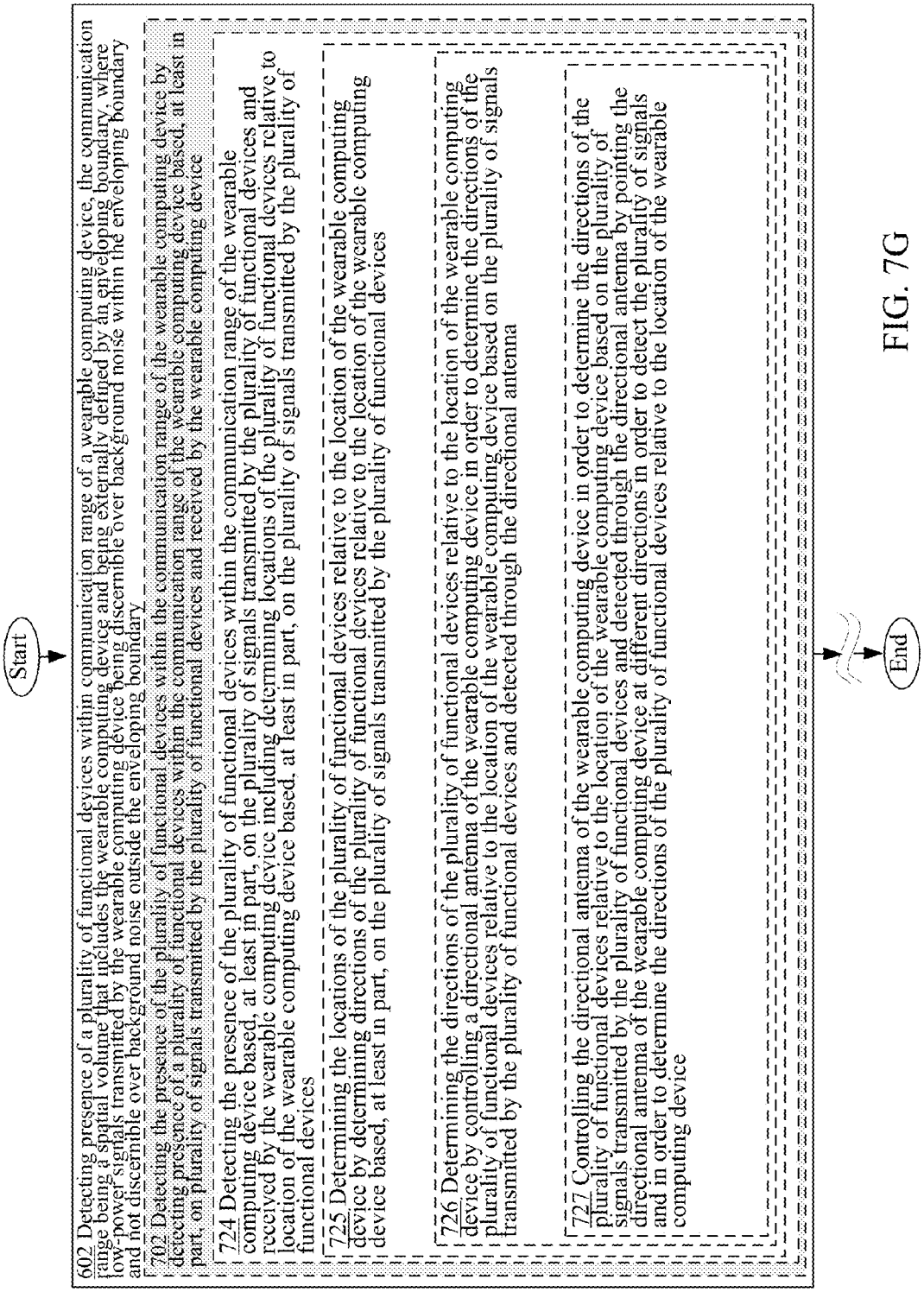
FIG. 7G is a high-level logic flowchart of a process depicting alternate implementations of the functional device presence detecting operation 602 of FIG. 6.

Referring to FIG. 7G, in the same or alternative implementations, operation 702 may include or involve an operation 724 for detecting the presence of the plurality of functional devices within the communication range of the wearable computing device based, at least in part, on the plurality of signals transmitted by the plurality of functional devices and received by the wearable computing device including determining locations of the plurality of functional devices relative to location of the wearable computing device based, at least in part, on the plurality of signals transmitted by the plurality of functional devices. For instance, the functional device presence sensing module 102* including the functional device relative location ascertaining module 516 (see FIG. 5A) of the wearable computing device 10* of FIG. 4A or 4B detecting the presence of the plurality of functional devices 20* within the communication range 50* of the wearable computing device 10* based, at least in part, on the plurality of signals 80 transmitted by the plurality of functional devices 20* and received by the wearable computing device 10* including determining or ascertaining, by the functional device relative location ascertaining module 516, the relative locations of the plurality of functional devices 20* relative to the location of the wearable computing device 10* based, at least in part, on the plurality of signals 80 transmitted by the plurality of functional devices 20*. In some embodiments, the locations of each of the functional devices 20* may at least be one of the basis for selecting or choosing one or more of the plurality of functional devices 20* for providing one or more functionalities to the wearable computing device 10*. For example, a particular functional device 20* that is located dead center of the "line of sight" (e.g., field of regard) of a directional antenna of the wearable computing device 10* may be preferred over another functional device 20* that is not so centered.

As further illustrated in FIG. 7G, operation 724 may further include one or more additional operations in various alternative implementations including, in some cases, an operation 725 for determining the locations of the plurality of functional devices relative to the location of the wearable computing device by determining directions of the plurality of functional devices relative to the location of the wearable computing device based, at least in part, on the plurality of signals transmitted by the plurality of functional devices. For instance, the functional device relative location ascertaining module 516 of the wearable computing device 10* of FIG. 4A or 4B determining the locations of the plurality of functional devices 20* relative to the location of the wearable computing device 10* by determining directions of the plurality of functional devices 20* relative to the location of the wearable computing device 10* based, at least in part, on the plurality of signals 80 transmitted by the plurality of functional devices 20*. In some cases, this operation may be implemented using a directional antenna.

In some implementations, operation 725 may include or involve an operation 726 for determining the directions of the plurality of functional devices relative to the location of the wearable computing device by controlling a directional antenna of the wearable computing device in order to determine the directions of the plurality of functional devices relative to the location of the wearable computing device based on the plurality of signals transmitted by the plurality of functional devices and detected through the directional antenna. For instance, the functional device relative location ascertaining module 516 including the directional antenna control module 518 (see FIG. 5A) of the wearable computing device 10* of FIG. 4A or 4B determining the directions of the plurality of functional devices 20* relative to the location of the wearable computing device 10* by having the directional antenna control module 518 control a directional antenna (e.g., antenna 130 of FIG. 4A or 4B) of the wearable computing device 10* in order to determine the directions of the plurality of functional devices 20* relative to the location of the wearable computing device 10* based on the plurality of signals 80 transmitted by the plurality of functional devices 20* and detected through the directional antenna (e.g., antenna 130 of FIG. 4A or 4B).

In some implementations, operation 726 may, in turn, further include or involve an operation 727 for controlling the directional antenna of the wearable computing device in order to determine the directions of the plurality of functional devices relative to the location of the wearable computing device based on the plurality of signals transmitted by the plurality of functional devices and detected through the directional antenna by pointing the directional antenna of the wearable computing device at different directions in order to detect the plurality of signals and in order to determine the directions of the plurality of functional devices relative to the location of the wearable computing device. For instance, the directional antenna control module 518 of the wearable computing device 10* of FIG. 4A or 4B controlling the directional antenna of the wearable computing device 10* in order to determine the directions of the plurality of functional devices 20* relative to the location of the wearable computing device 10* based on the plurality of signals 80 transmitted by the plurality of functional devices 20* and detected through the directional antenna by having the directional antenna control module 518 point the directional antenna (e.g., antenna 130 of FIG. 4A or 4B) of the wearable computing device 10* at different directions in order to detect the plurality of signals 80 and in order to determine the directions of the plurality of functional devices 20* relative to the location of the wearable computing device 10*.

Figure 7H:
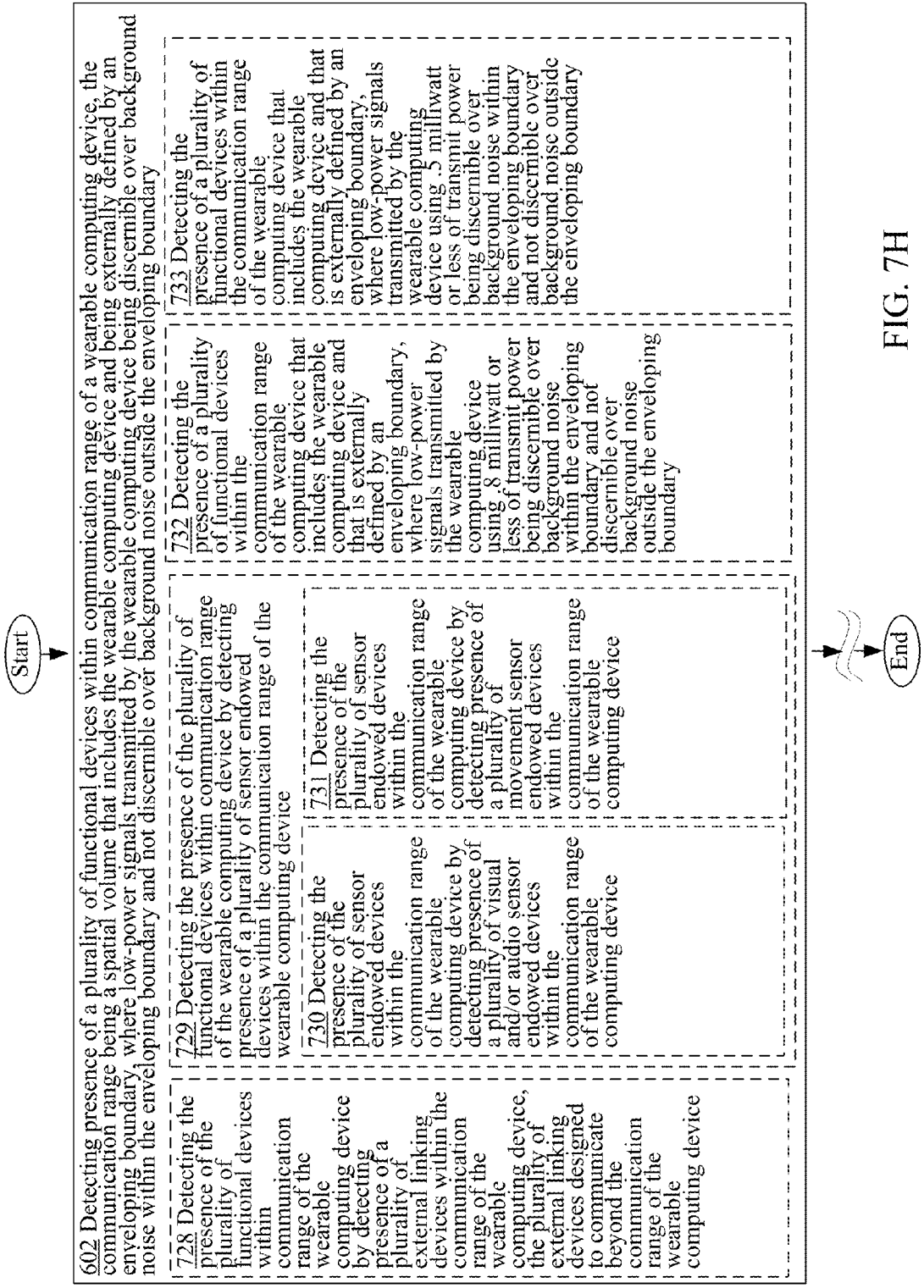
FIG. 7H is a high-level logic flowchart of a process depicting alternate implementations of the functional device presence detecting operation 602 of FIG. 6.

Referring now to FIG. 7H, in various implementations, the functional device presence detecting operation 602 may include or involve an operation 728 for detecting the presence of the plurality of functional devices within communication range of the wearable computing device by detecting presence of a plurality of external linking devices within the communication range of the wearable computing device, the plurality of external linking devices designed to communicate beyond the communication range of the wearable computing device. For instance, the functional device presence sensing module 102* of the wearable computing device 10* of FIG. 4A or 4B detecting the presence of the plurality of functional devices 20* within communication range 50* of the wearable computing device 10* by detecting or sensing presence of a plurality of external linking devices within the communication range 50* of the wearable computing device 10*, the plurality of external linking devices (e.g., Smartphones, tablet computers, laptop or desktop computers, access points, base stations, repeaters, and so forth) designed to communicate beyond the communication range 50* of the wearable computing device 10*.

In various implementations, the functional device presence detecting operation 602 may include or involve an operation 729 for detecting the presence of the plurality of functional devices within communication range of the wearable computing device by detecting presence of a plurality of sensor endowed devices within the communication range of the wearable computing device. For instance, the functional device presence sensing module 102* of the wearable computing device 10* of FIG. 4A or 4B detecting the presence of the plurality of functional devices 20* within communication range 50* of the wearable computing device 10* by detecting or sensing presence of a plurality of sensor endowed devices within the communication range 50 of the wearable computing device 10*. Examples of sensor endowed devices include, for example, Smartphones with audio, visual, and/or movement sensors, other wearable computing devices (e.g., AR devices with audio and/or visual sensors, or Smartwatches with audio, visual, movement, and/or electrical activity sensors), and so forth. Note that for purposes of this description, references to movement sensors may be in reference to a variety of sensors capable of sensing various aspects of movements including accelerometers, gyroscope, inertia sensors, and so forth. References herein to electrical activity sensors may be in reference to those types of sensors that can detect or sense electrical activities of human tissue (e.g., muscles, tendons, and so forth).

In some cases, operation 729 may actually involve an operation 730 for detecting the presence of the plurality of sensor endowed devices within the communication range of the wearable computing device by detecting presence of a plurality of visual and/or audio sensor endowed devices within the communication range of the wearable computing device. For instance, the functional device presence sensing module 102* of the wearable computing device 10* of FIG. 4A or 4B detecting the presence of the plurality of sensor endowed devices within the communication range 50* of the wearable computing device 10* by detecting presence of a plurality of visual and/or audio sensors endowed devices (e.g., devices endowed with various sensors including conventional or infrared cameras, black silicon sensors, microphones, and so forth) within the communication range 50* of the wearable computing device 10*.

Alternatively or additionally operation 729 may actually involve or involve an operation 731 for detecting the presence of the plurality of sensor endowed devices within the communication range of the wearable computing device by detecting presence of a plurality of movement sensor endowed devices within the communication range of the wearable computing device. For instance, the functional device presence sensing module 102* of the wearable computing device 10* of FIG. 4A or 4B detecting the presence of the plurality of sensor endowed devices within the communication range 50* of the wearable computing device 10* by detecting presence of a plurality of movement sensors (e.g., accelerometers, inertia sensors, and so forth) endowed devices within the communication range 50* of the wearable computing device 10*. Note that in some cases the movement sensor endowed devices that are detected within the communication range 50* of the wearable computing device 10* may include one or more other wearable computing devices 10* that may be endowed with one or more movement sensors.

In the same or alternative implementations, the functional device presence detecting operation 602 may additionally or alternatively include an operation 732 for detecting the presence of a plurality of functional devices within the communication range of the wearable computing device that includes the wearable computing device and that is externally defined by an enveloping boundary, where low-power signals transmitted by the wearable computing device using 0.8 milliwatt or less of transmit power being discernible over background noise within the enveloping boundary and not discernible over background noise outside the enveloping boundary. For instance, the functional device presence sensing module 102* of the wearable computing device 10* of FIG. 4A or 4B detecting the presence of a plurality of functional devices 20* within the communication range 50* (see, for example, FIG. 1A or 1B) of the wearable computing device 10* that includes the wearable computing device 10* and that is externally defined by an enveloping boundary 52* (see, for example, FIG. 1A or 1B), where low-power signals 70* transmitted by the wearable computing device 10* using 0.8 milliwatt or less of transmit power being discernible over background noise (e.g., noise as a result of background radiation) within the enveloping boundary 52* and not discernible over background noise outside the enveloping boundary 52*.

In some implementations, the functional device presence detecting operation 602 may additionally or alternatively include an operation 733 for detecting the presence of a plurality of functional devices within the communication range of the wearable computing device that includes the wearable computing device and that is externally defined by an enveloping boundary, where low-power signals transmitted by the wearable computing device using 0.5 milliwatt or less of transmit power being discernible over background noise within the enveloping boundary and not discernible over background noise outside the enveloping boundary. For instance, the functional device presence sensing module 102* of the wearable computing device 10* of FIG. 4A or 4B detecting the presence of a plurality of functional devices 20* within the communication range 50* (see, for example, FIG. 1A or 1B) of the wearable computing device 10* that includes the wearable computing device 10* and that is externally defined by an enveloping boundary 52* (see, for example, FIG. 1A or 1B), where low-power signals 70* transmitted by the wearable computing device 10* using 0.5 milliwatt or less of transmit power being discernible over background noise (e.g., noise as a result of background radiation) within the enveloping boundary 52* and not discernible over background noise outside the enveloping boundary 52*.

Figure 7J:
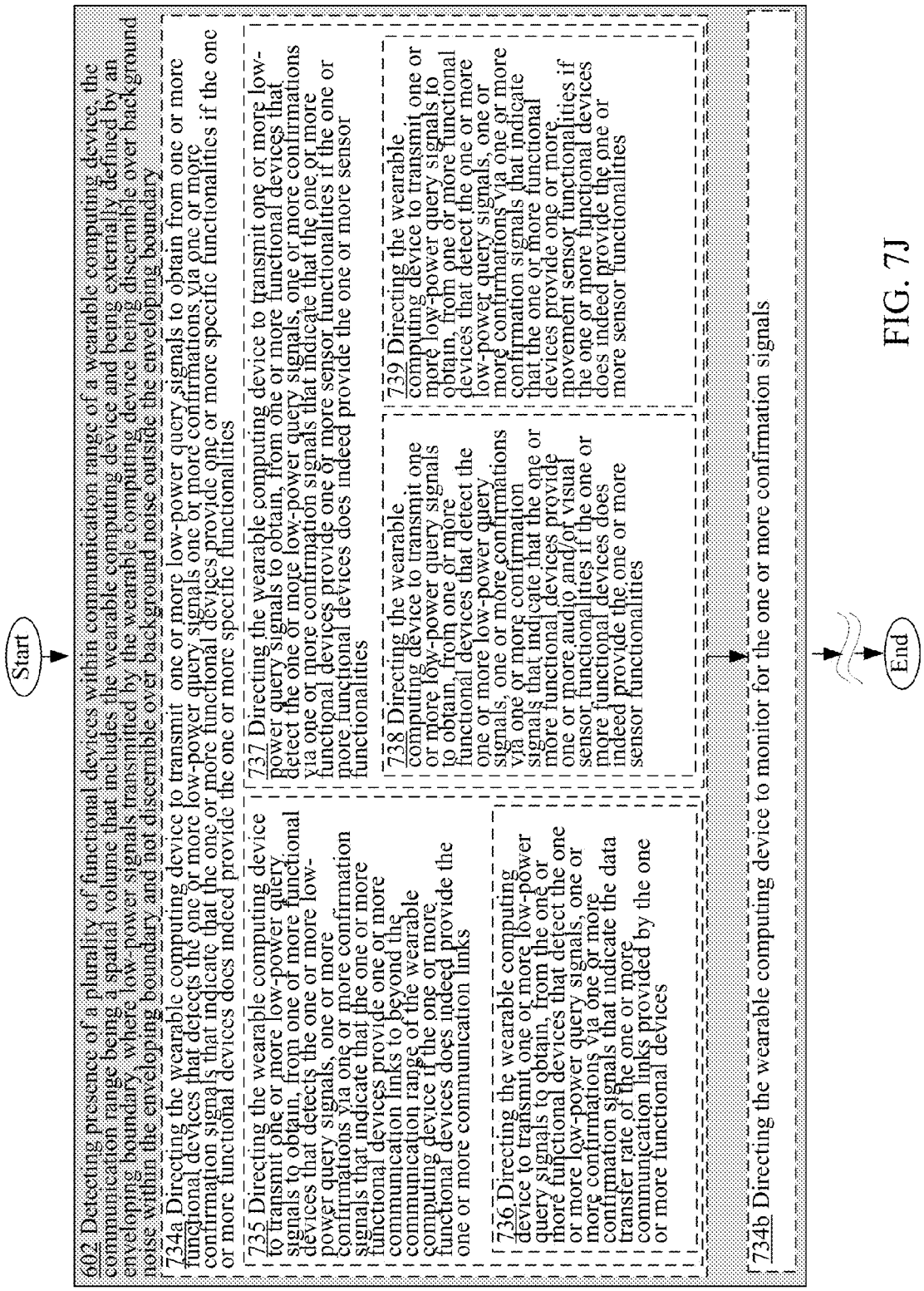
FIG. 7J is a high-level logic flowchart of a process depicting alternate implementations of the functional device presence detecting operation 602 of FIG. 6.
Figure 7K:
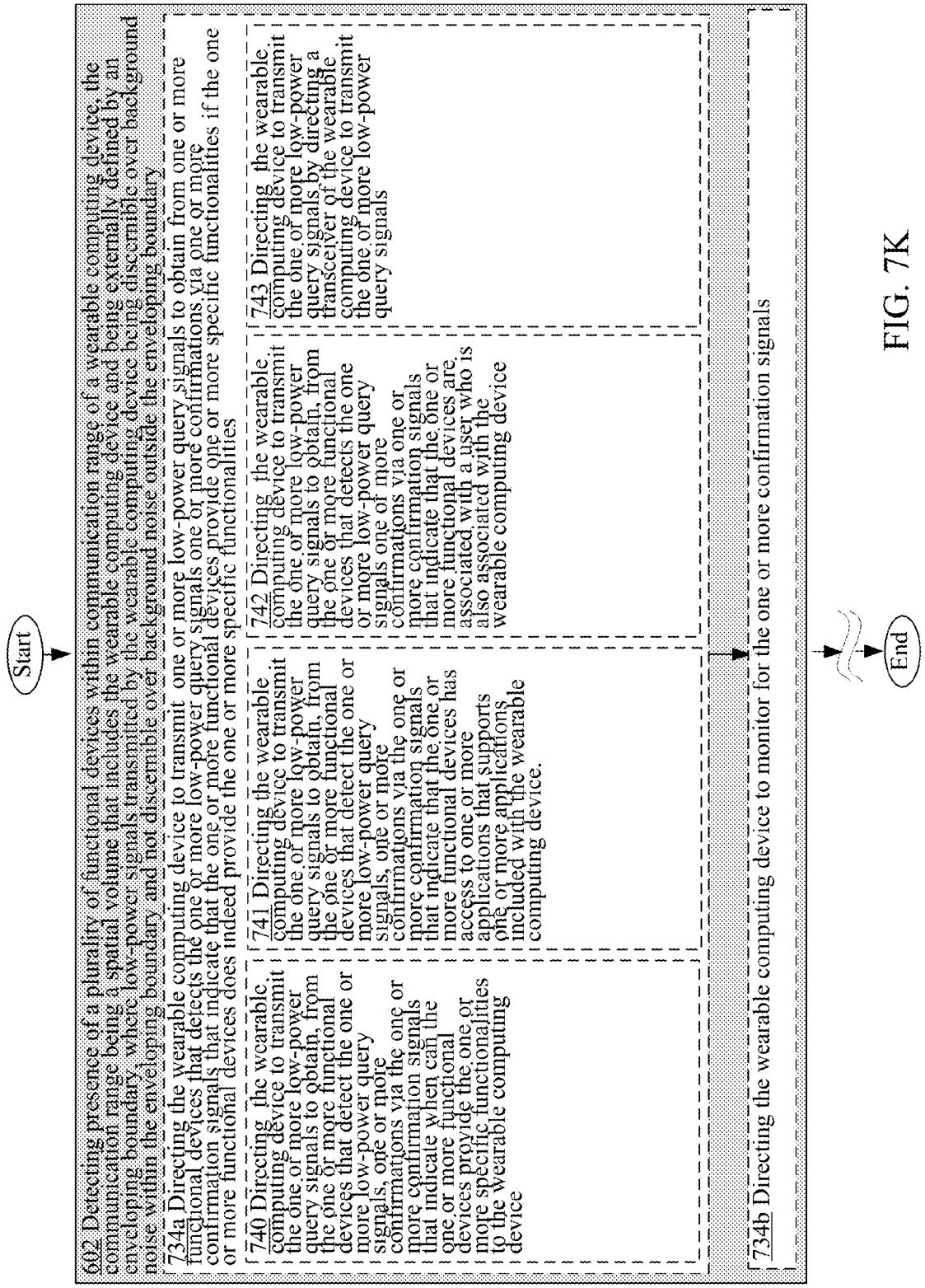
FIG. 7K is a high-level logic flowchart of a process depicting alternate implementations of the functional device presence detecting operation 602 of FIG. 6.

Referring now to FIGS. 7J and 7K, in various implementations, the functional device presence detecting operation 602 may actually include or involve an operation 734a for directing the wearable computing device to transmit one or more low-power query signals to obtain from one or more functional devices that detects the one or more low-power query signals one or more confirmations via one or more confirmation signals that indicate that the one or more functional devices provide one or more specific functionalities if the one or more functional devices does indeed provide the one or more specific functionalities and an operation 734b for directing the wearable computing device to monitor for the one or more confirmation signals. For instance, the low-power query signal transmit directing module 520 (see FIG. 5A) of the wearable computing device 10* of FIG. 4A or 4B directing (e.g., controlling or instructing) the wearable computing device 10* to transmit one or more low-power query signals 84 (see, for example, FIG. 1C) to obtain or solicit from one or more functional devices 20* that detects the one or more low-power query signals 84 one or more confirmations via one or more confirmation signals 85 (see, for example, FIG. 1C) that indicate that the one or more functional devices 20* provide one or more specific functionalities if the one or more functional devices 20* does indeed provide the one or more specific functionalities, and the confirmation signal monitor directing module 530 (see FIG. 5A) of the wearable computing device 10* of FIG. 4A or 4B directing (e.g., controlling or instructing) the wearable computing device 10* to monitor for the one or more confirmation signals 85.

As further illustrated in FIGS. 7J and 7K operation 734a may include one or more additional operations in various alternative implementations. For example, in some implementations, operation 734a may further include or involve an operation 735 for directing the wearable computing device to transmit one or more low-power query signals to obtain, from one or more functional devices that detects the one or more low-power query signals, one or more confirmations via one or more confirmation signals that indicate that the one or more functional devices provide one or more communication links to beyond the communication range of the wearable computing device if the one or more functional devices does indeed provide the one or more communication links as illustrated, for example, in FIG. 7J. For instance, the low-power query signal transmit directing module 520 of the wearable computing device 10* of FIG. 4A or 4B directing the wearable computing device 10* to transmit one or more low-power query signals 84 to obtain (e.g., solicit), from one or more functional devices 20* that detects the one or more low-power query signals 84, one or more confirmations via one or more confirmation signals 85 that indicate that the one or more functional devices 20* provide one or more communication links 90* (e.g., Wi-Fi links and/or cellular network links) to beyond the communication range 50* of the wearable computing device 10* if the one or more functional devices 20* does indeed provide the one or more communication links 90*.

In some cases, operation 735 may, in turn, further include an operation 736 for directing the wearable computing device to transmit one or more low-power query signals to obtain, from the one or more functional devices that detect the one or more low-power query signals, one or more confirmations via one or more confirmation signals that indicate the data transfer rate of the one or more communication links provided by the one or more functional devices. For instance, the low-power query signal transmit directing module 520 of the wearable computing device 10* of FIG. 4A or 4B directing the wearable computing device 10* to transmit one or more low-power query signals 84 to obtain or solicit, from the one or more functional devices 20* that detect the one or more low-power query signals 84, one or more confirmations via one or more confirmation signals 85 that indicate the data transfer rate of the one or more communication links 90* provided by the one or more functional devices 20*. In some cases, it may be desirable or preferable to use one or more functional devices 20* that provide one or more communication links 90* having the highest data transfer rates.

In the same or alternative implementations, operation 734a may include or involve an operation 737 for directing the wearable computing device to transmit one or more low-power query signals to obtain, from one or more functional devices that detect the one or more low-power query signals, one or more confirmations via one or more confirmation signals that indicate that the one or more functional devices provide one or more sensor functionalities if the one or more functional devices does indeed provide the one or more sensor functionalities. For instance, the low-power query signal transmit directing module 520 of the wearable computing device 10* of FIG. 4A or 4B directing (e.g., controlling or instructing) the wearable computing device 10* to transmit one or more low-power query signals 84 to obtain or solicit, from one or more functional devices 20* that detect the one or more low-power query signals 84, one or more confirmations via one or more confirmation signals 85 that indicate that the one or more functional devices 20* provide one or more sensor functionalities (e.g., visual or movement sensor functionalities to capture movements of a user's hand) if the one or more functional devices 20* does indeed provide the one or more sensor functionalities.

In some implementations, operation 737 may further include or involve an operation 738 for directing the wearable computing device to transmit one or more low-power query signals to obtain, from one or more functional devices that detect the one or more low-power query signals, one or more confirmations via one or more confirmation signals that indicate that the one or more functional devices provide one or more audio and/or visual sensor functionalities if the one or more functional devices does indeed provide the one or more sensor functionalities. For instance, the low-power query signal transmit directing module 520 of the wearable computing device 10\* of FIG. 4A or 4B directing the wearable computing device 10\* to transmit one or more low-power query signals 84 to obtain or solicit, from one or more functional devices 20\* that detect the one or more low-power query signals 84, one or more confirmations via one or more confirmation signals 85 that indicate that the one or more functional devices 20\* provide one or more audio and/or visual sensor functionalities (e.g., visual and/or audio functionalities provided by cameras, microphones, etc.) if the one or more functional devices 20\* does indeed provide the one or more sensor functionalities.

In some implementations, operation 737 may actually include or involve an operation 739 for directing the wearable computing device to transmit one or more low-power query signals to obtain, from one or more functional devices that detect the one or more low-power query signals, one or more confirmations via one or more confirmation signals that indicate that the one or more functional devices provide one or more movement sensor functionalities if the one or more functional devices does indeed provide the one or more sensor functionalities. For instance, the low-power query signal transmit directing module 520 of the wearable computing device 10\* of FIG. 4A or 4B directing the wearable computing device 10\* to transmit one or more low-power query signals 84 to obtain or solicit from one or more functional devices 20\* that detect the one or more low-power query signals 84 one or more confirmations via one or more confirmation signals 85 that indicate that the one or more functional devices 20\* provide one or more movement sensor functionalities (e.g., functionalities provided by accelerometers, inertia sensors, gyroscope, etc.) if the one or more functional devices 20\* does indeed provide the one or more sensor functionalities.

Turning now to FIG. 7K, in some implementations, operation 734a may include or involve an operation 740 for directing the wearable computing device to transmit the one or more low-power query signals to obtain, from the one or more functional devices that detect the one or more low-power query signals, one or more confirmations via the one or more confirmation signals that indicate when can the one or more functional devices provide the one or more specific functionalities to the wearable computing device. For instance, the low-power query signal transmit directing module 520 of the wearable computing device 10\* of FIG. 4A or 4B directing the wearable computing device 10\* to transmit (e.g., broadcast) the one or more low-power query signals 84 to obtain or solicit from the one or more functional devices 20\* that detect the one or more low-power query signals 84 one or more confirmations via the one or more confirmation signals 85 that indicate when can the one or more functional devices 20\* provide the one or more specific functionalities to the wearable computing device 10\*.

In the same or alternative implementations, operation 734a may additionally or alternatively include an operation 741 for directing the wearable computing device to transmit the one or more low-power query signals to obtain, from the one or more functional devices that detect the one or more low-power query signals, one or more confirmations via the one or more confirmation signals that indicate that the one or more functional devices has access to one or more applications that supports one or more applications included with the wearable computing device. For instance, the low-power query signal transmit directing module 520 of the wearable computing device 10\* of FIG. 4A or 4B directing the wearable computing device 10\* to transmit the one or more low-power query signals 84 to obtain or solicit from the one or more functional devices 20\* that detect the one or more low-power query signals 84 one or more confirmations via the one or more confirmation signals 85 that indicate that the one or more functional devices 20\* has access to one or more applications that support one or more applications (e.g., electronic messaging applications) included with the wearable computing device 10\*.

In the same or alternative implementations, operation 734a may additionally or alternatively include an operation 742 for directing the wearable computing device to transmit the one or more low-power query signals to obtain, from the one or more functional devices that detects the one or more low-power query signals, one or more confirmations via one or more confirmation signals that indicate that the one or more functional devices are associated with a user who is also associated with the wearable computing device. For instance, the low-power query signal transmit directing module 520 of the wearable computing device 10\* of FIG. 4A or 4B directing the wearable computing device 10\* to transmit the one or more low-power query signals 84 to obtain or solicit from the one or more functional devices 20\* that detects the one or more low-power query signals 84 one or more confirmations via one or more confirmation signals 85 that indicate that the one or more functional devices 20\* are associated with a user who is also associated with the wearable computing device 10\*.

In the same or alternative implementations, operation 734a may additionally or alternatively include an operation 743 for directing the wearable computing device to transmit the one or more low-power query signals by directing a transceiver of the wearable computing device to transmit the one or more low-power query signals. For instance, the low-power query signal transmit directing module 520 of the wearable computing device 10\* of FIG. 4A or 4B directing the wearable computing device 10\* to transmit the one or more low-power query signals 84 by directing (e.g., controlling or instructing) a transceiver 118 of the wearable computing device to transmit the one or more low-power query signals 84.

Figure 8A:
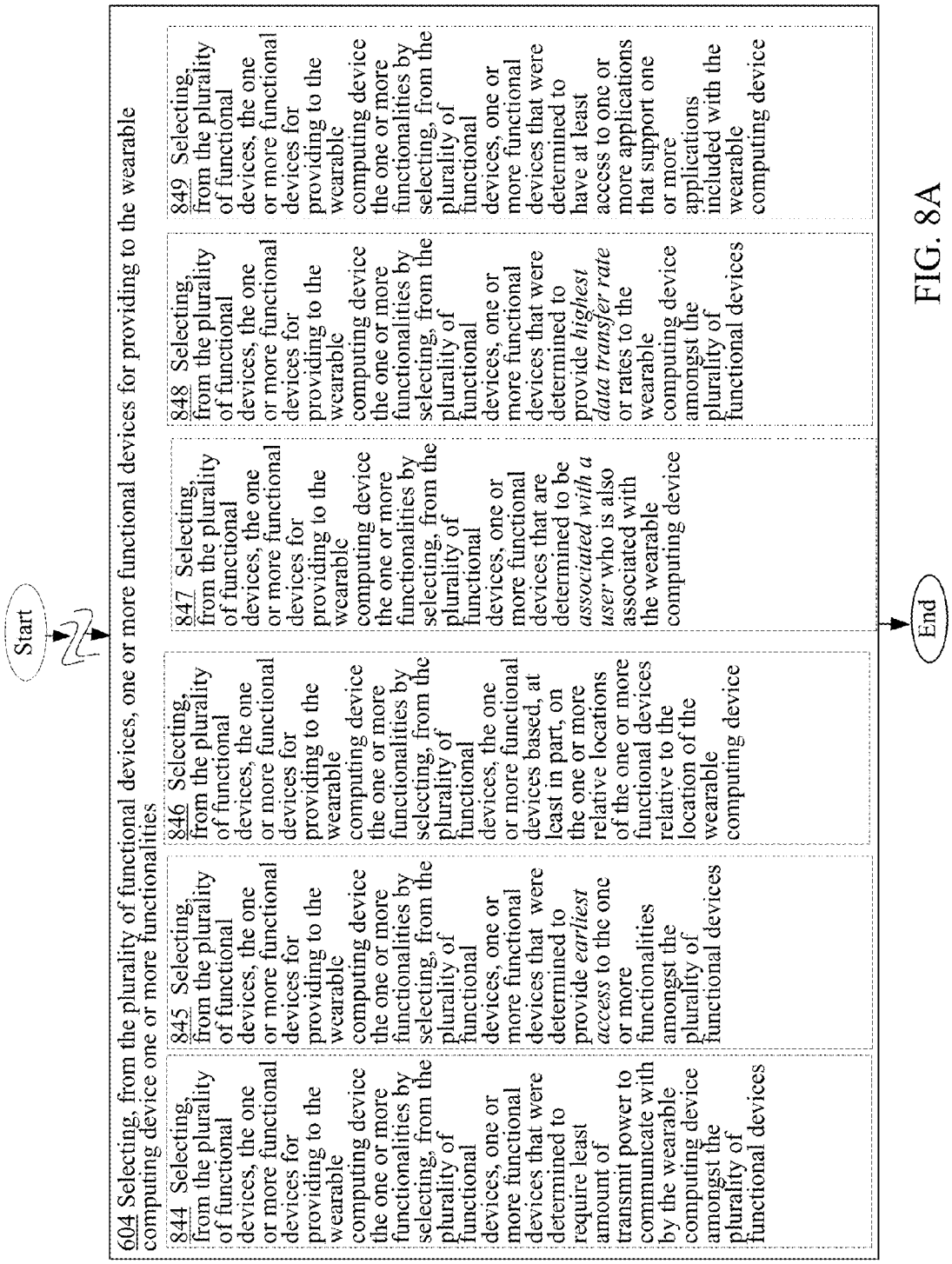
FIG. 8A is a high-level logic flowchart of a process depicting alternate implementations of the functional device selecting operation 604 of FIG. 6.
Figure 8B:
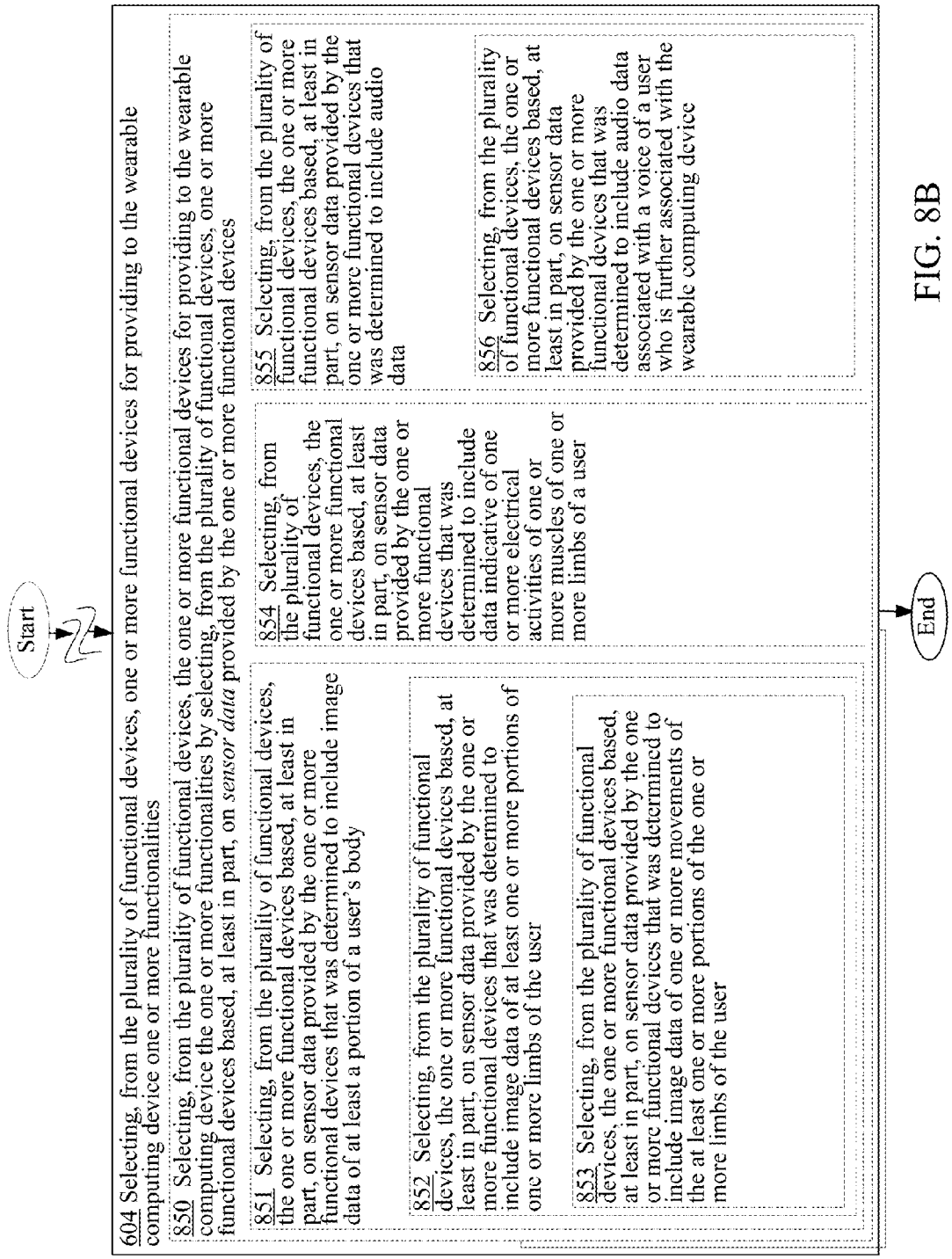
FIG. 8B is a high-level logic flowchart of a process depicting alternate implementations of the functional device selecting operation 604 of FIG. 6.
Figure 8C:
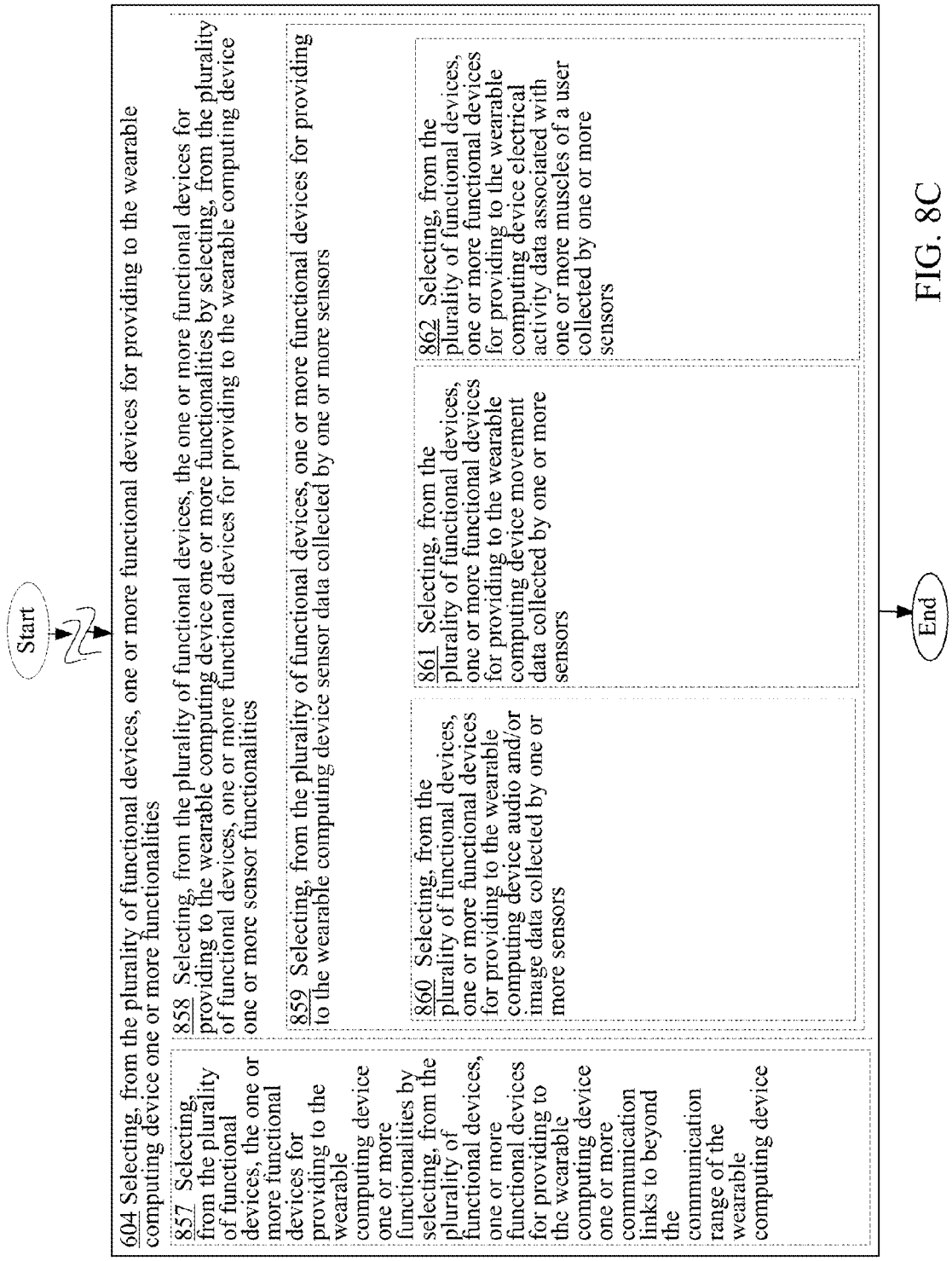
FIG. 8C is a high-level logic flowchart of a process depicting alternate implementations of the functional device selecting operation 604 of FIG. 6.

Referring back to the functional device selecting operation 604 of FIG. 6, the functional device selecting operation 604 similar to the functional device presence detecting operation 602 of FIG. 6 may be executed in a number of different ways in various alternative embodiments as illustrated, for example, in FIGS. 8A, 8B, and 8C. In some cases, for example, the functional device selecting operation 604 may actually include or involve an operation 844 for selecting, from the plurality of functional devices, the one or more functional devices for providing to the wearable computing device the one or more functionalities by selecting, from the plurality of functional devices, one or more functional devices that were determined to require least amount of transmit power to communicate with by the wearable computing device amongst the plurality of functional devices as illustrated in FIG. 8A. For instance, the functional device choosing module 104\* including the least communication power requirement determining module 540 (see FIG. 5B) of the wearable computing device 10\* of FIG. 4A or 4B selecting, from the plurality of functional devices 20\*, the one or more functional devices 20\* for providing to the wearable computing device 10\* the one or more functionalities by selecting or choosing, from the plurality of functional devices 20\* that were detected as being present within the communication range 50\* of the wearable computing device 10\*, one or more functional devices 20\* that were determined by the least communication power requirement determining module 540 to require least amount of transmit power to communicate with by the wearable computing device 10* amongst the plurality of functional devices 20*.

In the same or alternative implementations, the functional device selecting operation 604 may additionally or alternatively include an operation 845 for selecting, from the plurality of functional devices, the one or more functional devices for providing to the wearable computing device the one or more functionalities by selecting, from the plurality of functional devices, one or more functional devices that were determined to provide earliest access to the one or more functionalities amongst the plurality of functional devices. For instance, the functional device choosing module 104* including the earliest functionality access determining module 542 (see FIG. 5B) of the wearable computing device 10* of FIG. 4A or 4B selecting, from the plurality of functional devices 20*, the one or more functional devices 20* for providing to the wearable computing device 10* the one or more functionalities by selecting or choosing, from the plurality of functional devices 20* that were detected as being present within the communication range 50* of the wearable computing device 10*, one or more functional devices 20* that were determined by the earliest functionality access determining module 542 to provide earliest access to the one or more functionalities amongst the plurality of functional devices 20*.

In the same or alternative implementations, the functional device selecting operation 604 may additionally or alternatively include an operation 846 for selecting, from the plurality of functional devices, the one or more functional devices for providing to the wearable computing device the one or more functionalities by selecting, from the plurality of functional devices, the one or more functional devices based, at least in part, on the one or more relative locations of the one or more functional devices relative to the location of the wearable computing device. For instance, the functional device choosing module 104* including the relative device location determining module 544 (see FIG. 5B) of the wearable computing device 10* of FIG. 4A or 4B selecting, from the plurality of functional devices 20*, the one or more functional devices 20* for providing to the wearable computing device 10* the one or more functionalities by selecting or choosing, from the plurality of functional devices 20* that were detected as being present within the communication range 50* of the wearable computing device 10*, the one or more functional devices 20* based, at least in part, on determination made by the relative device location determining module 544 of the one or more relative locations of the one or more functional devices 20* relative to the location of the wearable computing device 10*.

In the same or alternative implementations, the functional device selecting operation 604 may additionally or alternatively include an operation 847 for selecting, from the plurality of functional devices, the one or more functional devices for providing to the wearable computing device the one or more functionalities by selecting, from the plurality of functional devices, one or more functional devices that are determined to be associated with a user who is also associated with the wearable computing device. For instance, the functional device choosing module 104* including the commonly associated user determining module 546 (see FIG. 5B) of the wearable computing device 10* of FIG. 4A or 4B selecting, from the plurality of functional devices 20*, the one or more functional devices 20* for providing to the wearable computing device 10* the one or more functionalities by selecting or choosing, from the plurality of functional devices 20* that were detected as being present within the communication range 50* of the wearable computing device 10*, one or more functional devices 20* that are determined by the commonly associated user determining module 546 to be associated with a user who is also associated with the wearable computing device 10*. In some implementations, the determination as to whether the one or more functional devices 20* are commonly associated with a user who is associated with the wearable computing device 10* may be executed by querying the one or more functional devices 20* to confirm that the one or more functional devices 20* are, in fact, commonly associated with a common user.

In the same or alternative implementations, the functional device selecting operation 604 may additionally or alternatively include an operation 848 for selecting, from the plurality of functional devices, the one or more functional devices for providing to the wearable computing device the one or more functionalities by selecting, from the plurality of functional devices, one or more functional devices that were determined to provide highest data transfer rate or rates to the wearable computing device amongst the plurality of functional devices. For instance, the functional device choosing module 104* including the highest data transfer rate determining module 548 (see FIG. 5B) of the wearable computing device 10* of FIG. 4A or 4B selecting, from the plurality of functional devices 20*, the one or more functional devices 20* for providing to the wearable computing device 10* the one or more functionalities by selecting or choosing, from the plurality of functional devices 20* that were detected as being present within the communication range 50* of the wearable computing device 10*, one or more functional devices 20* that were determined by the highest data transfer rate determining module 548 to provide highest data transfer rate or rates to the wearable computing device 10* amongst the plurality of functional devices 20*.

In the same or alternative implementations, the functional device selecting operation 604 may additionally or alternatively include an operation 849 for selecting, from the plurality of functional devices, the one or more functional devices for providing to the wearable computing device the one or more functionalities by selecting, from the plurality of functional devices, one or more functional devices that were determined to have at least access to one or more applications that supports one or more applications included with the wearable computing device. For instance, the functional device choosing module 104* including the application access determining module 550 (see FIG. 5B) of the wearable computing device 10* of FIG. 4A or 4B selecting, from the plurality of functional devices 20*, the one or more functional devices 20* for providing to the wearable computing device 10* the one or more functionalities by selecting or choosing, from the plurality of functional devices 20* that were detected as being present within the communication range 50* of the wearable computing device 10*, one or more functional devices 20* that were determined by the application access determining module 550 to have at least access to one or more applications (e.g., hand gesture recognition application) that supports one or more applications (e.g., hand gesture recognition application) included with the wearable computing device 10*.

In the same or alternative implementations, the functional device selecting operation 604 may additionally or alternatively include an operation 850 for selecting, from the plurality of functional devices, the one or more functional devices for providing to the wearable computing device the one or more functionalities by selecting, from the plurality of functional devices, one or more functional devices based, at least in part, on sensor data provided by the one or more functional devices as illustrated in FIG. 8B. For instance, the functional device choosing module 104* including the sensor data based functional device choosing module 552 (see FIG. 5B) of the wearable computing device 10* of FIG. 4A or 4B selecting, from the plurality of functional devices 20*, the one or more functional devices 20* for providing to the wearable computing device 10* the one or more functionalities by selecting or choosing by the sensor data based functional device choosing module 552, from the plurality of functional devices 20* that were detected as being present within the communication range 50* of the wearable computing device 10*, one or more functional devices 20* that are selected based, at least in part, on sensor data provided by the one or more functional devices 20*.

As further illustrated in FIG. 8B, operation 850 may further include or involve one or more additional operations in various alternative implementations, including, in some cases, an operation 851 for selecting, from the plurality of functional devices, the one or more functional devices based, at least in part, on sensor data provided by the one or more functional devices that was determined to include image data of at least a portion of a user's body. For instance, the sensor data based functional device choosing module 552 of the wearable computing device 10* of FIG. 4A or 4B selecting or choosing, from the plurality of functional devices 20* that were detected as being present within the communication range 50* of the wearable computing device 10*, the one or more functional devices 20* that are selected based, at least in part, on sensor data provided by the one or more functional devices 20* that was determined to include image data of at least a portion of a user's body.

In various implementations, operation 851 may further include or involve an operation 852 for selecting, from the plurality of functional devices, the one or more functional devices based, at least in part, on sensor data provided by the one or more functional devices that was determined to include image data of at least one or more portions of one or more limbs of the user. For instance, the sensor data based functional device choosing module 552 of the wearable computing device 10* of FIG. 4A or 4B selecting or choosing, from the plurality of functional devices 20* that were detected as being present within the communication range 50* of the wearable computing device 10*, the one or more functional devices 20* that are selected based, at least in part, on sensor data provided by the one or more functional devices 20* that was determined to include image data of at least one or more portions of one or more limbs of the user.

Operation 852 may, in turn, further include or involve an operation 853 for selecting, from the plurality of functional devices, the one or more functional devices based, at least in part, on sensor data provided by the one or more functional devices that was determined to include image data of one or more movements of the at least one or more portions of the one or more limbs of the user. For instance, the sensor data based functional device choosing module 552 of the wearable computing device 10* of FIG. 4A or 4B selecting, from the plurality of functional devices 20* that were detected as being present within the communication range 50* of the wearable computing device 10*, the one or more functional devices 20* that are selected based, at least in part, on sensor data provided by the one or more functional devices 20* that was determined to include image data of one or more movements (e.g., hand/finger gestures) of the at least one or more portions of the one or more limbs of the user.

In the same or alternative implementations, operation 850 may include or involve an operation 854 for selecting, from the plurality of functional devices, the one or more functional devices based, at least in part, on sensor data provided by the one or more functional devices that was determined to include data indicative of one or more electrical activities of one or more muscles of one or more limbs of a user. For instance, the sensor data based functional device choosing module 552 of the wearable computing device 10* of FIG. 4A or 4B selecting or choosing, from the plurality of functional devices 20* that were detected as being present within the communication range 50* of the wearable computing device 10*, the one or more functional devices 20* that are selected based, at least in part, on sensor data provided by the one or more functional devices 20* that was determined to include data indicative of one or more electrical activities of one or more muscles of one or more limbs of a user.

In the same or alternative implementations, operation 850 may include or involve an operation 855 for selecting, from the plurality of functional devices, the one or more functional devices based, at least in part, on sensor data provided by the one or more functional devices that was determined to include audio data. For instance, the sensor data based functional device choosing module 552 of the wearable computing device 10* of FIG. 4A or 4B selecting or choosing, from the plurality of functional devices 20* that were detected as being present within the communication range 50* of the wearable computing device 10*, the one or more functional devices 20* that are selected based, at least in part, on sensor data provided by the one or more functional devices 20* that was determined to include audio data.

In some cases, operation 855 may, in turn, further include or involve an operation 856 for selecting, from the plurality of functional devices, the one or more functional devices based, at least in part, on sensor data provided by the one or more functional devices that was determined to include audio data associated with a voice of a user who is further associated with the wearable computing device. For instance, the sensor data based functional device choosing module 552 of the wearable computing device 10* of FIG. 4A or 4B selecting, from the plurality of functional devices 20* that were detected as being present within the communication range 50* of the wearable computing device 10*, the one or more functional devices 20* based, at least in part, on sensor data provided by the one or more functional devices 20* that was determined to include audio data associated with a voice of a user who is further associated with the wearable computing device 10*.

Referring now to FIG. 8C, in some implementations, the functional device selecting operation 604 may include or involve an operation 857 for selecting, from the plurality of functional devices, the one or more functional devices for providing to the wearable computing device one or more functionalities by selecting, from the plurality of functional devices, one or more functional devices for providing to the wearable computing device one or more communication links to beyond the communication range of the wearable computing device. For instance, the functional device choosing module 104* including the communication link providing device choosing module 554 (see FIG. 5B) of the wearable computing device 10* of FIG. 4A or 4B selecting or choosing, from the plurality of functional devices 20*, the one or more functional devices 20* for providing to the wearable computing device 10* one or more functionalities by having the communication link providing device choosing module 554 select or choose, from the plurality of functional devices 20* that were detected as being present within the communication range 50* of the wearable computing device 10*, one or more functional devices 20* for providing to the wearable computing device 10* one or more communication links 90* to beyond the communication range 50* of the wearable computing device 10*.

In the same or alternative implementations, the functional device selecting operation 604 may include an operation 858 for selecting, from the plurality of functional devices, the one or more functional devices for providing to the wearable computing device one or more functionalities by selecting, from the plurality of functional devices, one or more functional devices for providing to the wearable computing device one or more sensor functionalities. For instance, the functional device choosing module 104* including the sensor functionality providing device choosing module 556 (see FIG. 5B) of the wearable computing device 10* of FIG. 4A or 4B selecting, from the plurality of functional devices 20*, the one or more functional devices 20* for providing to the wearable computing device 10* one or more functionalities by having the sensor functionality providing device choosing module 556 select or choose, from the plurality of functional devices 20* that were detected as being present within the communication range 50* of the wearable computing device 10*, one or more functional devices 20* for providing to the wearable computing device 10* one or more sensor functionalities.

As further illustrated in FIG. 8C, operation 858 may further include one or more additional operations in various alternative implementations including, in some cases, an operation 859 for selecting, from the plurality of functional devices, one or more functional devices for providing to the wearable computing device sensor data collected by one or more sensors. For instance, the sensor functionality providing device choosing module 556 of the wearable computing device 10* of FIG. 4A or 4B selecting or choosing, from the plurality of functional devices 20* that were detected as being present within the communication range 50* of the wearable computing device 10*, one or more functional devices 20* for providing to the wearable computing device 10* sensor data collected by one or more sensors.

In some implementations, operation 859 may further include or involve an operation 860 for selecting, from the plurality of functional devices, one or more functional devices for providing to the wearable computing device audio and/or image data collected by one or more sensors. For instance, the sensor functionality providing device choosing module 556 of the wearable computing device 10* of FIG. 4A or 4B selecting, from the plurality of functional devices 20* that were detected as being present within the communication range 50* of the wearable computing device 10*, one or more functional devices 20* for providing to the wearable computing device 10* audio and/or image data collected by one or more sensors (e.g., audio sensors and/or visual sensors such as cameras).

In some implementations, operation 859 may additionally or alternatively include an operation 861 for selecting, from the plurality of functional devices, one or more functional devices for providing to the wearable computing device movement data collected by one or more sensors. For instance, the sensor functionality providing device choosing module 556 of the wearable computing device 10* of FIG. 4A or 4B selecting, from the plurality of functional devices 20* that were detected as being present within the communication range 50* of the wearable computing device 10*, one or more functional devices 20* for providing to the wearable computing device 10* movement data collected by one or more sensors (e.g., accelerometers, inertia sensors, gyroscope, and so forth).

In some implementations, operation 859 may additionally or alternatively include an operation 862 for selecting, from the plurality of functional devices, one or more functional devices for providing to the wearable computing device electrical activity data associated with one or more muscles of a user collected by one or more sensors. For instance, the sensor functionality providing device choosing module 556 of the wearable computing device 10* of FIG. 4A or 4B selecting, from the plurality of functional devices 20* that were detected as being present within the communication range 50* of the wearable computing device 10*, one or more functional devices 20* for providing to the wearable computing device 10* electrical activity data associated with one or more muscles of a user collected by one or more sensors (e.g., electromyography or EMG sensors).

Figure 9:
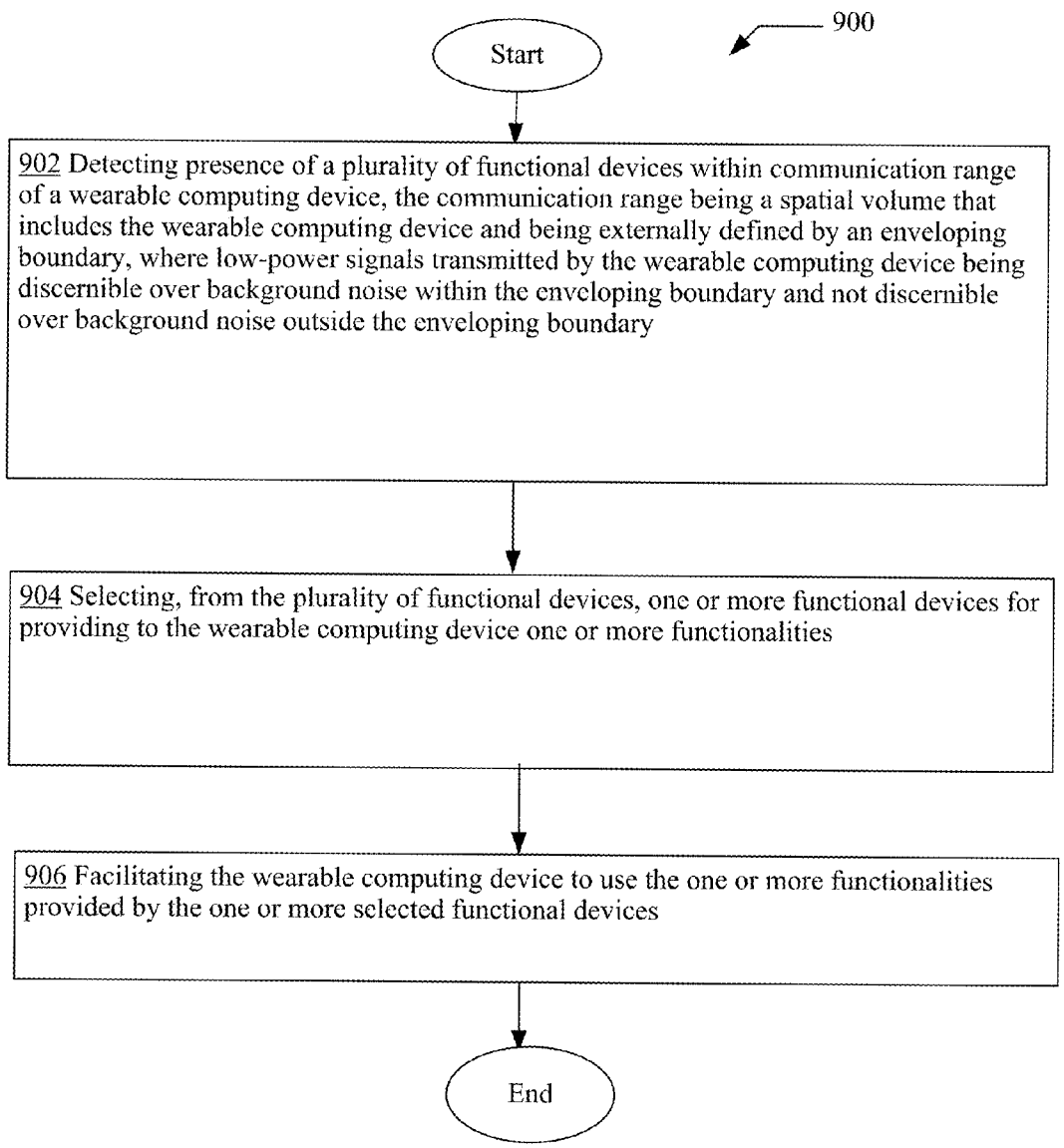
FIG. 9 is another high-level logic flowchart of another process, e.g., operational flow 900, according to some embodiments.

Turning now to FIG. 9 illustrating another operational flow 900. Operational flow 900 includes certain operations that mirror the operations included in operational flow 600 of FIG. 6. These operations include a functional device presence detecting operation 902 and a functional device selecting operation 904 that corresponds to and mirrors the functional device presence detecting operation 602 and the functional device selecting operation 604, respectively, of FIG. 6.

In addition, operational flow 900 further includes a functionality use facilitating operation 906 for facilitating the wearable computing device to use the one or more functionalities provided by the one or more selected functional devices. For instance the functionality use facilitating module 106* of the wearable computing device 10* of FIG. 4A or 4B facilitating the wearable computing device 10* to use the one or more functionalities (e.g., communication links 90* to beyond the communication range 50* of the wearable computing device 10*, sensor functionalities, and so forth) provided by the one or more selected functional devices 20*. As will be further described herein with respect to FIGS. 10A, 10B, and 10C, there are a number of ways to facilitate the wearable computing device 10* to use the one or more functionalities provided by the one or more selected functional devices 20*. In some implementations, the wearable computing device 10* may be facilitated in using the one or more functionalities provided by the one or more selected functional devices 20* by having the functionality use facilitating module 106* of the wearable computing device 10* direct the wearable computing device 10* to use an antenna 130 to communicate with the one or more functional devices 20*.

Figure 10A:
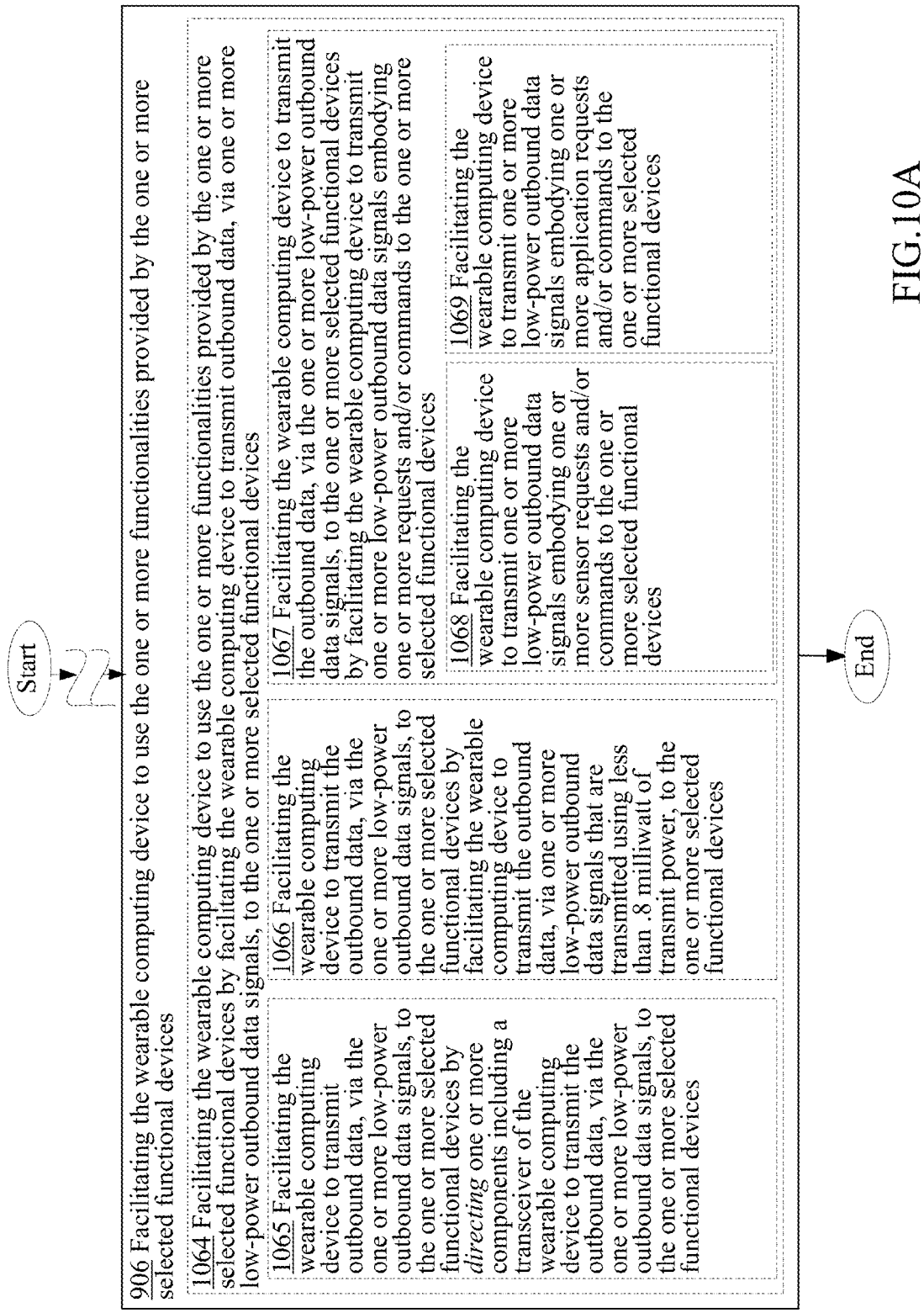
FIG. 10A is a high-level logic flowchart of a process depicting alternate implementations of the functionality use facilitating operation 906 of FIG. 9.

For example, in some implementations, the functionality use facilitating operation 906 of FIG. 9 may actually include or involve an operation 1064 for facilitating the wearable computing device to use the one or more functionalities provided by the one or more selected functional devices by facilitating the wearable computing device to transmit outbound data, via one or more low-power outbound data signals, to the one or more selected functional devices as illustrated in FIG. 10A. For instance, the functionality use facilitating module 106* including the outbound data transmit facilitating module 558 (see FIG. 5C) of the wearable computing device 10* of FIG. 4A or 4B facilitating the wearable computing device 10* to use the one or more functionalities provided by the one or more selected functional devices 20* by having the outbound data transmit facilitating module 558 to facilitate the wearable computing device 10* to transmit outbound data 86* (see, for example, FIG. 1D), via one or more low-power outbound data signals (e.g., data signals that are wirelessly transmitted with less than or equal to 0.8 milliwatt of transmit power), to the one or more selected functional devices 20*.

As further illustrated in FIG. 10A, operation 1064 may further include one or more additional operations in various alternative implementations including, in some cases, an operation 1065 for facilitating the wearable computing device to transmit outbound data, via the one or more low-power outbound data signals, to the one or more selected functional devices by directing one or more components including a transceiver of the wearable computing device to transmit the outbound data, via the one or more low-power outbound data signals, to the one or more selected functional devices. For instance, the outbound data transmit facilitating module 558 including the component directing module 560 (see FIG. 5C) of the wearable computing device 10\* of FIG. 4A or 4B facilitating the wearable computing device 10\* to transmit outbound data 86\*, via the one or more low-power outbound data signals, to the one or more selected functional devices 20\* by having the component directing module 560 direct (e.g., control or instruct) one or more components including a transceiver 118 of the wearable computing device 10\* to transmit the outbound data 86\*, via the one or more low-power outbound data signals (e.g. low-power signals 70\* that are wirelessly transmitted using less than or equal to 0.8 milliwatt of transmit power), to the one or more selected functional devices 20\*.

In the same or alternative implementations, operation 1064 may additionally or alternatively include an operation 1066 for facilitating the wearable computing device to transmit the outbound data, via the one or more low-power outbound data signals, to the one or more selected functional devices by facilitating the wearable computing device to transmit the outbound data, via one or more low-power outbound data signals that are transmitted using less than 0.8 milliwatt of transmit power, to the one or more selected functional devices. For instance, the outbound data transmit facilitating module 558 of the wearable computing device 10\* of FIG. 4A or 4B facilitating the wearable computing device 10\* to transmit the outbound data 86\*, via the one or more low-power outbound data signals, to the one or more selected functional devices 20\* by facilitating the wearable computing device 10\* (e.g., directing or instructing one or more components of the wearable computing device 10\*) to transmit the outbound data 86\*, via one or more low-power outbound data signals that are transmitted using less than 0.8 milliwatt of transmit power (e.g., 0.5 or 0.3 milliwatt of transmit power), to the one or more selected functional devices 20\*.

In the same or alternative implementations, operation 1064 may additionally or alternatively include an operation 1067 for facilitating the wearable computing device to transmit the outbound data, via the one or more low-power outbound data signals, to the one or more selected functional devices by facilitating the wearable computing device to transmit one or more low-power outbound data signals embodying one or more requests and/or commands to the one or more selected functional devices. For instance, the outbound data transmit facilitating module 558 of the wearable computing device 10\* of FIG. 4A or 4B facilitating the wearable computing device 10\* to transmit the outbound data 86\*, via the one or more low-power outbound data signals (e.g., data signals wirelessly transmitted using less than 1 milliwatt of transmit power), to the one or more selected functional devices 20\* by facilitating the wearable computing device 10\* to transmit one or more low-power outbound data signals embodying one or more requests and/or commands to the one or more selected functional devices 20\*.

In some implementations, operation 1067 may actually include or involve an operation 1068 for facilitating the wearable computing device to transmit one or more low-power outbound data signals embodying one or more sensor requests and/or commands to the one or more selected functional devices. For instance, the outbound data transmit facilitating module 558 of the wearable computing device 10\* of FIG. 4A or 4B facilitating the wearable computing device 10\* to transmit one or more low-power outbound data signals (e.g., data signals wirelessly transmitted using less than 1 milliwatt of transmit power) embodying one or more sensor requests and/or commands (e.g., request/command to activate or control a sensor) to the one or more selected functional devices 20\*.

In some implementations, operation 1067 may actually include or involve an operation 1069 for facilitating the wearable computing device to transmit one or more low-power outbound data signals embodying one or more application requests and/or commands to the one or more selected functional devices. For instance, the outbound data transmit facilitating module 558 of the wearable computing device 10\* of FIG. 4A or 4B facilitating the wearable computing device 10\* to transmit one or more low-power outbound data signals (e.g., data signals wirelessly transmitted using less than 1 milliwatt of transmit power) embodying one or more application requests and/or commands (e.g., requests/commands for web-based applications including email or instant messaging applications, or gaming applications) to the one or more selected functional devices 20\*.

Figure 10B:
FIG. 10B is a high-level logic flowchart of a process depicting alternate implementations of the functionality use facilitating operation 906 of FIG. 9.

Referring to FIG. 10B, in some implementations, operation 1064 may include an operation 1070 for facilitating the wearable computing device to transmit the outbound data, via the one or more low-power outbound data signals, to the one or more selected functional devices by facilitating the wearable computing device to transmit one or more low-power outbound data signals embodying one or more electronic messages to the one or more selected functional devices. For instance, the outbound data transmit facilitating module 558 of the wearable computing device 10\* of FIG. 4A or 4B facilitating the wearable computing device 10\* to transmit the outbound data 86\*, via the one or more low-power outbound data signals, to the one or more selected functional devices 20\* by facilitating the wearable computing device 10\* to transmit one or more low-power outbound data signals (e.g., data signals wirelessly transmitted using less than 1 milliwatt of transmit power) embodying one or more electronic messages (e.g., emails, telephone calls, IM, text messages, and so forth) to the one or more selected functional devices 20\*.

In some implementations, operation 1064 may include an operation 1071 for facilitating the wearable computing device to transmit the outbound data, via the one or more outbound low-power data signals, to the one or more selected functional devices by facilitating the wearable computing device to transmit one or more low-power outbound data signals embodying one or more addresses and/or links to the one or more selected functional devices. For instance, the outbound data transmit facilitating module 558 of the wearable computing device 10\* of FIG. 4A or 4B facilitating the wearable computing device 10\* to transmit the outbound data 86\*, via the one or more outbound low-power data signals, to the one or more selected functional devices 20\* by facilitating the wearable computing device 10\* to transmit one or more low-power outbound data signals (e.g., data signals wirelessly transmitted using less than 1 milliwatt of transmit power) embodying one or more addresses (e.g., uniform resource locators or URLs) and/or links (e.g., hyperlinks) to the one or more selected functional devices 20\*.

In some implementations, the functionality use facilitating operation 906 may include or involve an operation 1072 for facilitating the wearable computing device to use the one or more functionalities provided by the one or more selected functional devices by facilitating the wearable computing device to receive inbound data, via one or more inbound data signals, from the one or more selected functional devices. For instance, the functionality use facilitating module 106\* including the inbound data receive facilitating module 562 (see FIG. 5C) of the wearable computing device 10* of FIG. 4A or 4B facilitating the wearable computing device 10* to use the one or more functionalities provided by the one or more selected functional devices 20* by having the inbound data receive facilitating module 562 facilitate (e.g., direct, configure, or instruct) the wearable computing device 10* to receive inbound data 87* (see, for example, FIG. 1D), via one or more inbound data signals, from the one or more selected functional devices 20*.

Figure 10C:
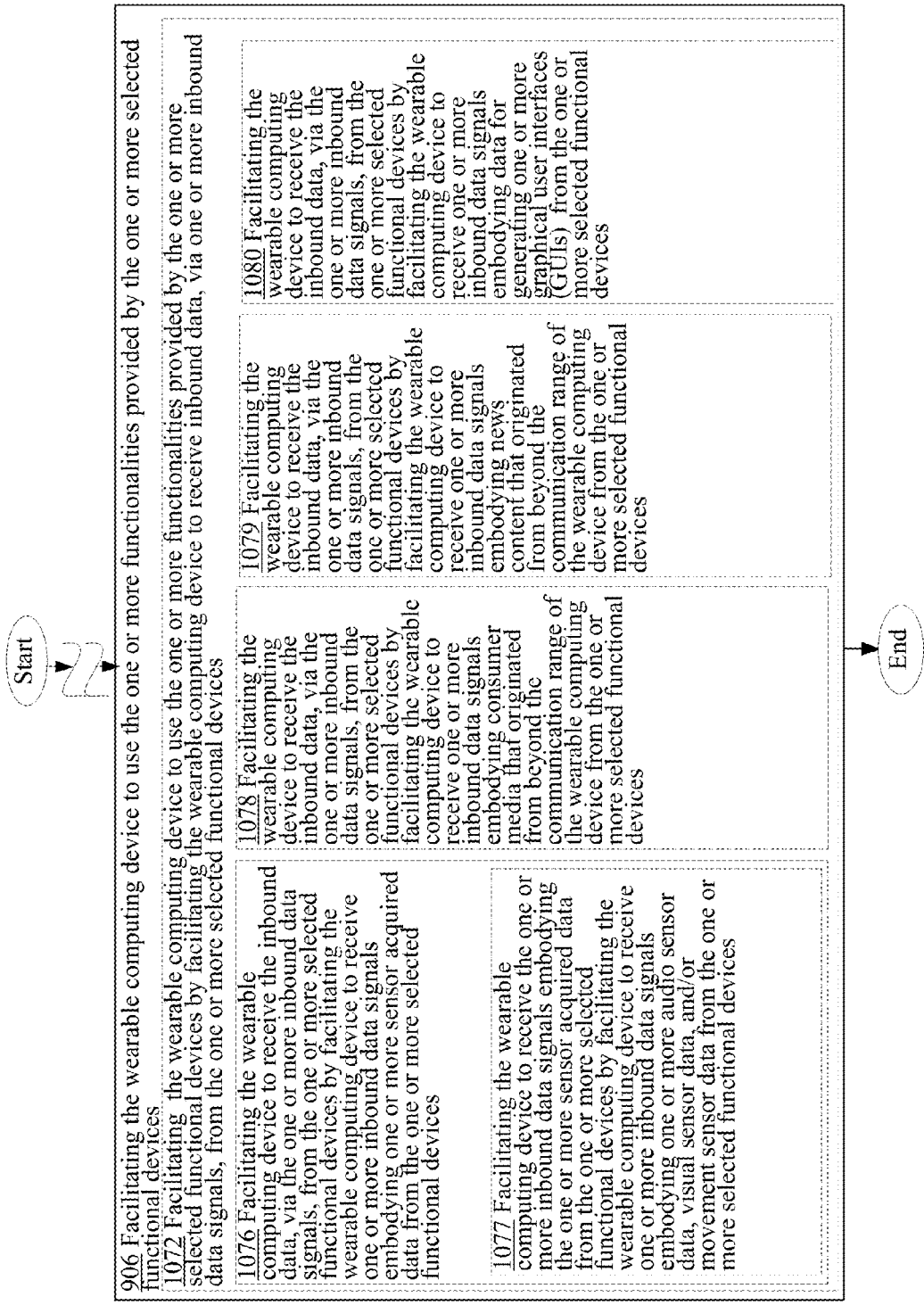
FIG. 10C is a high-level logic flowchart of a process depicting alternate implementations of the functionality use facilitating operation 906 of FIG. 9.

As further illustrated in FIGS. 10B and 10C, operation 1072 may further include one or more additional operations in various alternative implementations including, in some cases, an operation 1073 for facilitating the wearable computing device to receive the inbound data, via the one or more inbound data signals, from the one or more selected functional devices by directing one or more components including a transceiver of the wearable computing device to receive the inbound data, via the one or more inbound data signals, from the one or more selected functional devices. For instance, the inbound data receive facilitating module 562 including the component directing module 564 (see FIG. 5C) of the wearable computing device 10* of FIG. 4A or 4B facilitating the wearable computing device 10* to receive the inbound data 87*, via the one or more inbound data signals, from the one or more selected functional devices by having the component directing module 564 direct (e.g., control or instruct) one or more components including a transceiver 118 of the wearable computing device 10* to receive the inbound data 87*, via the one or more inbound data signals, from the one or more selected functional devices 20*.

In the same or alternative implementations, operation 1072 may additionally or alternatively include or involve an operation 1074 for facilitating the wearable computing device to receive the inbound data, via the one or more inbound data signals, from the one or more selected functional devices by facilitating the wearable computing device to receive one or more inbound data signals embodying data associated with one or more messages that originated from beyond the communication range of the wearable computing device from the one or more selected functional devices. For instance, the inbound data receive facilitating module 562 of the wearable computing device 10* of FIG. 4A or 4B facilitating the wearable computing device 10* to receive the inbound data 87*, via the one or more inbound data signals, from the one or more selected functional devices 20* by facilitating the wearable computing device 10* to receive one or more inbound data signals embodying data associated with one or more messages that originated from beyond the communication range 50* of the wearable computing device 10* (e.g., one or more messages that originated from the Internet) from the one or more selected functional devices 20*.

In some cases, operation 1074 may further include or involve an operation 1075 for facilitating the wearable computing device to receive one or more inbound data signals that embodies data associated with the one or more messages that originated from beyond the communication range of the wearable computing device from the one or more selected functional devices by facilitating the wearable computing device to receive one or more inbound data signals that indicate at least a sender name, telephone number, subject heading, and/or content associated with one or more messages that originated from beyond the communication range of the wearable computing device from the one or more selected functional devices. For instance, the inbound data receive facilitating module 562 of the wearable computing device 10* of FIG. 4A or 4B facilitating the wearable computing device 10* to receive one or more inbound data signals (e.g., inbound data 87* of FIG. 1D) that embodies data associated with the one or more messages that originated from beyond the communication range 50* of the wearable computing device 10* from the one or more selected functional devices 20* by facilitating the wearable computing device 10* to receive one or more inbound data signals that indicate at least a sender name, telephone number, subject heading, and/or content associated with one or more messages that originated from beyond the communication range 50* of the wearable computing device 10* from the one or more selected functional devices 20*.

In some implementations, operation 1072 may additionally or alternatively include or involve an operation 1076 for facilitating the wearable computing device to receive the inbound data, via the one or more inbound data signals, from the one or more selected functional devices by facilitating the wearable computing device to receive one or more inbound data signals embodying one or more sensor acquired data from the one or more selected functional devices. For instance, the inbound data receive facilitating module 562 of the wearable computing device 10* of FIG. 4A or 4B facilitating the wearable computing device 10* to receive the inbound data 87*, via the one or more inbound data signals, from the one or more selected functional devices 20* by facilitating the wearable computing device 10* to receive one or more inbound data signals (e.g., inbound data 87* of FIG. 1D) embodying one or more sensor acquired data (e.g., GPS acquired data, audio and/or visual sensor acquired data, movement sensor acquired data, and so forth) from the one or more selected functional devices 20*.

In some cases, operation 1076 may, in turn, further include an operation 1077 for facilitating the wearable computing device to receive the one or more inbound data signals embodying the one or more sensor acquired data from the one or more selected functional devices by facilitating the wearable computing device to receive one or more inbound data signals embodying one or more audio sensor data, visual sensor data, and/or movement sensor data from the one or more selected functional devices. For instance, the inbound data receive facilitating module 562 of the wearable computing device 10* of FIG. 4A or 4B facilitating the wearable computing device 10* to receive the one or more inbound data signals (e.g., inbound data 87* of FIG. 1D) embodying the one or more sensor acquired data from the one or more selected functional devices 20* by facilitating the wearable computing device 10* to receive one or more inbound data signals embodying one or more audio sensor data, visual sensor data, and/or movement sensor data from the one or more selected functional devices 20*.

In some implementations, operation 1072 may additionally or alternatively include an operation 1078 for facilitating the wearable computing device to receive the inbound data, via the one or more inbound data signals, from the one or more selected functional devices by facilitating the wearable computing device to receive one or more inbound data signals embodying consumer media that originated from beyond the communication range of the wearable computing device from the one or more selected functional devices. For instance, the inbound data receive facilitating module 562 of the wearable computing device 10* of FIG. 4A or 4B facilitating the wearable computing device 10* to receive the inbound data 87*, via the one or more inbound data signals, from the one or more selected functional devices 20* by facilitating the wearable computing device 10* to receive one or more inbound data signals (e.g., inbound data 87* of FIG. 1D) embodying consumer media (e.g., an electronic novel, digital movie, and so forth) that originated from beyond the communication range 50\* of the wearable computing device 10\* from the one or more selected functional devices 20\*.

In some implementations, operation 1072 may additionally or alternatively include an operation 1079 for facilitating the wearable computing device to receive the inbound data, via the one or more inbound data signals, from the one or more selected functional devices by facilitating the wearable computing device to receive one or more inbound data signals embodying news content that originated from beyond the communication range of the wearable computing device from the one or more selected functional devices. For instance, the inbound data receive facilitating module 562 of the wearable computing device 10\* of FIG. 4A or 4B facilitating the wearable computing device 10\* to receive the inbound data 87\*, via the one or more inbound data signals, from the one or more selected functional devices 20\* by facilitating the wearable computing device 10\* to receive one or more inbound data signals (e.g., inbound data 87\* of FIG. 1D) embodying news content that originated from beyond the communication range 50\* of the wearable computing device 10\* from the one or more selected functional devices 20\*.

In some implementations, operation 1072 may additionally or alternatively include an operation 1080 for facilitating the wearable computing device to receive the inbound data, via the one or more inbound data signals, from the one or more selected functional devices by facilitating the wearable computing device to receive one or more inbound data signals embodying data for generating one or more graphical user interfaces (GUIs) from the one or more selected functional devices. For instance, the inbound data receive facilitating module 562 of the wearable computing device 10\* of FIG. 4A or 4B facilitating the wearable computing device 10\* to receive the inbound data 87\*, via the one or more inbound data signals, from the one or more selected functional devices 20\* by facilitating the wearable computing device 10\* to receive one or more inbound data signals (e.g., inbound data 87\* of FIG. 1D) embodying data for generating one or more graphical user interfaces (GUIs) from the one or more selected functional devices 20\*.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," "in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A system, comprising:
    a functional device presence sensing module configured to sense presence of a plurality of functional devices within communication range of a wearable computing device, the communication range of the wearable computing device being a spatial volume that includes the wearable computing device and being externally defined by an enveloping boundary, where low-power signals transmitted by the wearable computing device being discernible over background noise within the enveloping boundary and not discernible over background noise outside the enveloping boundary;
    a functional device choosing module configured to choose, from the plurality of functional devices that were sensed to be within the communication range of the wearable computing device, one or more functional devices for providing to the wearable computing device one or more functionalities; and
    a functionality use facilitating module configured to facilitate the wearable computing device to use the one or more functionalities provided by the one or more chosen functional devices.

2. The system of claim 1, wherein said functional device presence sensing module configured to sense presence of a plurality of functional devices within communication range of a wearable computing device, the communication range of the wearable computing device being a spatial volume that includes the wearable computing device and being externally defined by an enveloping boundary, where low-power signals transmitted by the wearable computing device being discernible over background noise within the enveloping boundary and not discernible over background noise outside the enveloping boundary comprises:
    a functional device presence sensing module configured to sense presence of a plurality of functional devices within the communication range of the wearable computing device based, at least in part, on plurality of signals transmitted by the plurality of functional devices and received by the wearable computing device.

3. The system of claim 2, wherein said functional device presence sensing module configured to sense presence of a plurality of functional devices within the communication range of the wearable computing device based, at least in part, on plurality of signals transmitted by the plurality of functional devices and received by the wearable computing device comprises:
    a low-power prompting signal broadcast directing module configured to direct the wearable computing device to broadcast one or more low-power prompting signals that are designed to, when one or more functional devices detect the one or more low-power prompting signals, prompt the one or more functional devices to generate one or more responsive signals to acknowledge detection by the one or more functional devices of the one or more low-power prompting signals; and
    a responsive signal monitor directing module configured to direct the wearable computing device to monitor for the plurality of signals, the plurality of signals being a plurality of responsive signals that acknowledges that the plurality of functional devices detected the one or more low-power prompting signals.

4. The system of claim 3, wherein said low-power prompting signal broadcast directing module configured to direct the wearable computing device to broadcast one or more low-power prompting signals that are designed to, when one or more functional devices detect the one or more low-power prompting signals, prompt the one or more functional devices to generate one or more responsive signals to acknowledge detection by the one or more functional devices of the one or more low-power prompting signals comprises:
    a low-power prompting signal broadcast directing module configured to direct the wearable computing device to broadcast the one or more low-power prompting signals using less than 0.8 milliwatt of transmit power.

5. The system of claim 3, wherein said low-power prompting signal broadcast directing module configured to direct the wearable computing device to broadcast one or more low-power prompting signals that are designed to, when one or more functional devices detect the one or more low-power prompting signals, prompt the one or more functional devices to generate one or more responsive signals to acknowledge detection by the one or more functional devices of the one or more low-power prompting signals comprises:
    a low-power prompting signal broadcast directing module configured to direct the wearable computing device to broadcast the one or more low-power prompting signals through a directional antenna.

6. The system of claim 3, wherein said low-power prompting signal broadcast directing module configured to direct the wearable computing device to broadcast one or more low-power prompting signals that are designed to, when one or more functional devices detect the one or more low-power prompting signals, prompt the one or more functional devices to generate one or more responsive signals to acknowledge detection by the one or more functional devices of the one or more low-power prompting signals comprises:
    a low-power prompting signal broadcast directing module configured to direct the wearable computing device to broadcast the one or more low-power prompting signals through an antenna using different levels of transmit power, where the one or more low-power prompting signals are transmitted at each level of transmit power for predefined increment or increments of time.

7. The system of claim 6, wherein said low-power prompting signal broadcast directing module configured to direct the wearable computing device to broadcast the one or more low-power prompting signals through an antenna using different levels of transmit power, where the one or more low-power prompting signals are transmitted at each level of transmit power for predefined increment or increments of time comprises:

a low-power prompting signal broadcast directing module configured to direct the wearable computing device to broadcast the one or more low-power prompting signals using a first level of transmit power and directing the wearable computing device to broadcast the one or more low-power prompting signals using a second level of transmit power, the first level of transmit power being different from the second level of transmit power.

8. The system of claim 7, wherein said low-power prompting signal broadcast directing module configured to direct the wearable computing device to broadcast the one or more low-power prompting signals using a first level of transmit power and directing the wearable computing device to broadcast the one or more low-power prompting signals using a second level of transmit power, the first level of transmit power being different from the second level of transmit power comprises:

a low-power prompting signal broadcast directing module configured to direct the wearable computing device to pause broadcasting of the one or more low-power prompting signals after broadcasting the one or more low-power prompting signals using the first level of transmit power and before broadcasting the one or more low-power prompting signals using the second level of transmit power in order to monitor for the one or more responsive signals that acknowledge detection by the one or more functional devices of the one or more low-power prompting signals that was transmitting using the first level of transmit power.

9. The system of claim 7, wherein said low-power prompting signal broadcast directing module configured to direct the wearable computing device to broadcast the one or more low-power prompting signals using a first level of transmit power and directing the wearable computing device to broadcast the one or more low-power prompting signals using a second level of transmit power, the first level of transmit power being different from the second level of transmit power comprises:

a low-power prompting signal broadcast directing module configured to direct the wearable computing device to broadcast the one or more low-power prompting signals using a third level of transmit power, the third level of transmit power being different from the first level of transmit power or the second level of transmit power.

10. The system of claim 3, wherein said low-power prompting signal broadcast directing module configured to direct the wearable computing device to broadcast one or more low-power prompting signals that are designed to, when one or more functional devices detect the one or more low-power prompting signals, prompt the one or more functional devices to generate one or more responsive signals to acknowledge detection by the one or more functional devices of the one or more low-power prompting signals comprises:

a low-power prompting signal broadcast directing module configured to direct the wearable computing device to broadcast the one or more low-power prompting signals having one or more frequencies from a frequency band between 57 GHz and 64 GHz.

11. The system of claim 2, wherein said functional device presence sensing module configured to sense presence of a plurality of functional devices within the communication range of the wearable computing device based, at least in part, on plurality of signals transmitted by the plurality of functional devices and received by the wearable computing device comprises:

a power optimal functional device ascertaining module configured to ascertain, based on the plurality of signals, which one or more of the plurality of functional devices requires least amount of transmit power to communicate with by the wearable computing device amongst the plurality of functional devices.

12. The system of claim 11, wherein said power optimal functional device ascertaining module configured to ascertain, based on the plurality of signals, which one or more of the plurality of functional devices requires least amount of transmit power to communicate with by the wearable computing device amongst the plurality of functional devices comprises:

a signal strength ascertaining module configured to ascertain signal strengths of the plurality of signals.

13. The system of claim 2, wherein said functional device presence sensing module configured to sense presence of a plurality of functional devices within the communication range of the wearable computing device based, at least in part, on plurality of signals transmitted by the plurality of functional devices and received by the wearable computing device comprises:

a functional device relative location ascertaining module configured to ascertain locations of the plurality of functional devices relative to location of the wearable computing device based, at least in part, on the plurality of signals transmitted by the plurality of functional devices.

14. The system of claim 13, wherein said functional device relative location ascertaining module configured to ascertain locations of the plurality of functional devices relative to location of the wearable computing device based, at least in part, on the plurality of signals transmitted by the plurality of functional devices comprises:

a functional device relative location ascertaining module configured to ascertain directions of the plurality of functional devices relative to the location of the wearable computing device based, at least in part, on the plurality of signals transmitted by the plurality of functional devices.

15. The system of claim 14, wherein said functional device relative location ascertaining module configured to ascertain directions of the plurality of functional devices relative to the location of the wearable computing device based, at least in part, on the plurality of signals transmitted by the plurality of functional device comprises:

a directional antenna control module configured to control a directional antenna of the wearable computing device in order to determine the directions of the plurality of functional devices relative to the location of the wearable computing device based on the plurality of signals transmitted by the plurality of functional devices and detected through the directional antenna.

16. The system of claim 1, wherein said functional device presence sensing module configured to sense presence of a plurality of functional devices within communication range of a wearable computing device, the communication range of the wearable computing device being a spatial volume that includes the wearable computing device and being externally defined by an enveloping boundary, where low-power signals transmitted by the wearable computing device being discernible over background noise within the enveloping boundary and not discernible over background noise outside the enveloping boundary comprises:
- a low-power query signal transmit directing module configured to direct the wearable computing device to transmit one or more low-power query signals to obtain from one or more functional devices that detects the one or more low-power query signals one or more confirmations via one or more confirmation signals that indicate that the one or more functional devices provide one or more specific functionalities if the one or more functional devices does indeed provide the one or more specific functionalities; and
- a confirmation signal monitor directing module configured to direct the wearable computing device to monitor for the one or more confirmation signals.

17. The system of claim 16, wherein said low-power query signal transmit directing module configured to direct the wearable computing device to transmit one or more low-power query signals to obtain from one or more functional devices that detects the one or more low-power query signals one or more confirmations via one or more confirmation signals that indicate that the one or more functional devices provide one or more specific functionalities if the one or more functional devices does indeed provide the one or more specific functionalities comprises:
- a low-power query signal transmit directing module configured to direct the wearable computing device to transmit one or more low-power query signals to obtain, from one or more functional devices that detects the one or more low-power query signals, one or more confirmations via one or more confirmation signals that indicate that the one or more functional devices provide one or more communication links to beyond the communication range of the wearable computing device if the one or more functional devices does indeed provide the one or more communication links.

18. The system of claim 17, wherein said low-power query signal transmit directing module configured to direct the wearable computing device to transmit one or more low-power query signals to obtain, from one or more functional devices that detects the one or more low-power query signals, one or more confirmations via one or more confirmation signals that indicate that the one or more functional devices provide one or more communication links to beyond the communication range of the wearable computing device if the one or more functional devices does indeed provide the one or more communication links comprises:
- a low-power query signal transmit directing module configured to direct the wearable computing device to transmit one or more low-power query signals to obtain, from the one or more functional devices that detect the one or more low-power query signals, one or more confirmations via one or more confirmation signals that indicate the data transfer rate of the one or more communication links provided by the one or more functional devices.

19. The system of claim 16, wherein said low-power query signal transmit directing module configured to direct the wearable computing device to transmit one or more low-power query signals to obtain from one or more functional devices that detects the one or more low-power query signals one or more confirmations via one or more confirmation signals that indicate that the one or more functional devices provide one or more specific functionalities if the one or more functional devices does indeed provide the one or more specific functionalities comprises:
- a low-power query signal transmit directing module configured to direct the wearable computing device to transmit one or more low-power query signals to obtain, from one or more functional devices that detect the one or more low-power query signals, one or more confirmations via one or more confirmation signals that indicate that the one or more functional devices provide one or more sensor functionalities if the one or more functional devices does indeed provide the one or more sensor functionalities.

20. The system of claim 16, wherein said low-power query signal transmit directing module configured to direct the wearable computing device to transmit one or more low-power query signals to obtain from one or more functional devices that detects the one or more low-power query signals one or more confirmations via one or more confirmation signals that indicate that the one or more functional devices provide one or more specific functionalities if the one or more functional devices does indeed provide the one or more specific functionalities comprises:
- a low-power query signal transmit directing module configured to direct the wearable computing device to transmit the one or more low-power query signals to obtain, from the one or more functional devices that detect the one or more low-power query signals, one or more confirmations via the one or more confirmation signals that indicate when can the one or more functional devices provide the one or more specific functionalities to the wearable computing device.

21. The system of claim 16, wherein said low-power query signal transmit directing module configured to direct the wearable computing device to transmit one or more low-power query signals to obtain from one or more functional devices that detects the one or more low-power query signals one or more confirmations via one or more confirmation signals that indicate that the one or more functional devices provide one or more specific functionalities if the one or more functional devices does indeed provide the one or more specific functionalities comprises:
- a low-power query signal transmit directing module configured to direct the wearable computing device to transmit the one or more low-power query signals to obtain, from the one or more functional devices that detect the one or more low-power query signals, one or more confirmations via the one or more confirmation signals that indicate that the one or more functional devices has access to one or more applications that supports one or more applications included with the wearable computing device.

22. The system of claim 1, wherein said functional device choosing module configured to choose, from the plurality of functional devices that were sensed to be within the communication range of the wearable computing device, one or more functional devices for providing to the wearable computing device one or more functionalities comprises:
- a functional device choosing module including a least communication power requirement determining module configured to choose, from the plurality of functional devices, one or more functional devices that were determined by the least communication power requirement determining module to require least amount of transmit power to communicate with by the wearable computing device amongst the plurality of functional devices.

23. The system of claim 1, wherein said functional device choosing module configured to choose, from the plurality of functional devices that were sensed to be within the communication range of the wearable computing device, one or more functional devices for providing to the wearable computing device one or more functionalities comprises:

a functional device choosing module including an earliest functionality access determining module configured to choose, from the plurality of functional devices, one or more functional devices that were determined by the earliest functionality access determining module to provide earliest access to the one or more functionalities amongst the plurality of functional devices.

24. The system of claim 1, wherein said functional device choosing module configured to choose, from the plurality of functional devices that were sensed to be within the communication range of the wearable computing device, one or more functional devices for providing to the wearable computing device one or more functionalities comprises:

a functional device choosing module including a relative device location determining module configured to choose, from the plurality of functional devices, the one or more functional devices based, at least in part, on determination by the relative device location determining module of the one or more relative locations of the one or more functional devices relative to the location of the wearable computing device.

25. The system of claim 1, wherein said functional device choosing module configured to choose, from the plurality of functional devices that were sensed to be within the communication range of the wearable computing device, one or more functional devices for providing to the wearable computing device one or more functionalities comprises:

a functional device choosing module including a highest data transfer rate determining module configured to choose, from the plurality of functional devices, one or more functional devices that were determined by the highest data transfer rate determining module to provide highest data transfer rate or rates to the wearable computing device amongst the plurality of functional devices.

26. The system of claim 1, wherein said functional device choosing module configured to choose, from the plurality of functional devices that were sensed to be within the communication range of the wearable computing device, one or more functional devices for providing to the wearable computing device one or more functionalities comprises:

a functional device choosing module including an application access determining module configured to choose, from the plurality of functional devices, one or more functional devices that were determined by the application access determining module to have at least access to one or more applications that supports one or more applications included with the wearable computing device.

27. The system of claim 1, wherein said functional device choosing module configured to choose, from the plurality of functional devices that were sensed to be within the communication range of the wearable computing device, one or more functional devices for providing to the wearable computing device one or more functionalities comprises:

a sensor data based functional device choosing module configured to choose, from the plurality of functional devices, one or more functional devices based, at least in part, on sensor data provided by the one or more functional devices.

28. The system of claim 27, wherein said sensor data based functional device choosing module configured to choose, from the plurality of functional devices, one or more functional devices based, at least in part, on sensor data provided by the one or more functional devices comprises:

a sensor data based functional device choosing module configured to choose, from the plurality of functional devices, the one or more functional devices based, at least in part, on sensor data provided by the one or more functional devices that was determined to include image data of at least a portion of a user's body.

29. The system of claim 28, wherein said sensor data based functional device choosing module configured to choose, from the plurality of functional devices, the one or more functional devices based, at least in part, on sensor data provided by the one or more functional devices that was determined to include image data of at least a portion of a user's body comprises:

a sensor data based functional device choosing module configured to choose, from the plurality of functional devices, the one or more functional devices based, at least in part, on sensor data provided by the one or more functional devices that was determined to include image data of at least one or more portions of one or more limbs of the user.

30. The system of claim 29 wherein said sensor data based functional device choosing module configured to choose, from the plurality of functional devices, the one or more functional devices based, at least in part, on sensor data provided by the one or more functional devices that was determined to include image data of at least one or more portions of one or more limbs of the user comprises:

a sensor data based functional device choosing module configured to choose, from the plurality of functional devices, the one or more functional devices based, at least in part, on sensor data provided by the one or more functional devices that was determined to include image data of one or more movements of the at least one or more portions of the one or more limbs of the user.

31. The system of claim 1, wherein said functional device choosing module configured to choose, from the plurality of functional devices that were sensed to be within the communication range of the wearable computing device, one or more functional devices for providing to the wearable computing device one or more functionalities comprises:

a sensor functionality providing device choosing module configured to choose, from the plurality of functional devices, one or more functional devices for providing to the wearable computing device one or more sensor functionalities.

32. The system of claim 31, wherein said sensor functionality providing device choosing module configured to choose, from the plurality of functional devices, one or more functional devices for providing to the wearable computing device one or more sensor functionalities comprises:

a sensor functionality providing device choosing module configured to choose, from the plurality of functional devices, one or more functional devices for providing to the wearable computing device sensor data collected by one or more sensors.

33. The system of claim 32, wherein said sensor functionality providing device choosing module configured to choose, from the plurality of functional devices, one or more functional devices for providing to the wearable computing device sensor data collected by one or more sensors comprises:

a sensor functionality providing device choosing module configured to choose, from the plurality of functional devices, one or more functional devices for providing to the wearable computing device electrical activity data associated with one or more muscles of a user collected by one or more sensors.

34. The system of claim 1, wherein said functionality use facilitating module configured to facilitate the wearable computing device to use the one or more functionalities provided by the one or more chosen functional devices comprises:

a functionality use facilitating module configured to direct the wearable computing device to use an antenna to communicate with the one or more functional devices.

35. The system of claim 1, wherein said functionality use facilitating module configured to facilitate the wearable computing device to use the one or more functionalities provided by the one or more chosen functional devices comprises:

an outbound data transmit facilitating module configured to facilitate the wearable computing device to transmit outbound data, via one or more low-power outbound data signals, to the one or more selected functional devices.

36. The system of claim 35, wherein said outbound data transmit facilitating module configured to facilitate the wearable computing device to transmit outbound data, via one or more low-power outbound data signals, to the one or more selected functional devices comprises:

an outbound data transmit facilitating module configured to facilitate the wearable computing device to transmit the outbound data, via one or more low-power outbound data signals that are transmitted using less than 0.8 milliwatt of transmit power, to the one or selected functional devices.

37. The system of claim 1, wherein said functionality use facilitating module configured to facilitate the wearable computing device to use the one or more functionalities provided by the one or more chosen functional devices comprises:

an inbound data receive facilitating module configured to facilitate the wearable computing device to receive inbound data, via one or more inbound data signals, from the one or more selected functional devices.

38. The system of claim 37, wherein said inbound data receive facilitating module configured to facilitate the wearable computing device to receive inbound data, via one or more inbound data signals, from the one or more selected functional devices comprises:

an inbound data receive facilitating module configured to facilitate the wearable computing device to receive one or more inbound data signals embodying data associated with one or more messages that originated from beyond the communication range of the wearable computing device from the one or more selected functional devices.

39. The system of claim 37, wherein said inbound data receive facilitating module configured to facilitate the wearable computing device to receive inbound data, via one or more inbound data signals, from the one or more selected functional devices comprises:

an inbound data receive facilitating module configured to facilitate the wearable computing device to receive one or more inbound data signals embodying one or more sensor acquired data from the one or more selected functional devices.

40. An article of manufacture, comprising:

a non-transitory storage medium bearing:

one or more instructions for sensing presence of a plurality of functional devices within communication range of a wearable computing device, the communication range of the wearable computing device being a spatial volume that includes the wearable computing device and being externally defined by an enveloping boundary, where low-power signals transmitted by the wearable computing device being discernible over background noise within the enveloping boundary and not discernible over background noise outside the enveloping boundary;

one or more instructions for choosing, from the plurality of functional devices that were sensed to be within the communication range of the wearable computing device, one or more functional devices for providing to the wearable computing device one or more functionalities; and one or more instructions for facilitating the wearable computing device to use the one or more functionalities provided by the one or more chosen functional devices.

41. A wearable computing device designed to be worn by a person, comprising:

a functional device presence sensing module configured to sense presence of a plurality of functional devices within communication range of a wearable computing device, the communication range of the wearable computing device being a spatial volume that includes the wearable computing device and being externally defined by an enveloping boundary, where low-power signals transmitted by the wearable computing device being discernible over background noise within the enveloping boundary and not discernible over background noise outside the enveloping boundary;

a functional device choosing module configured to choose, from the plurality of functional devices that were sensed to be within the communication range of the wearable computing device, one or more functional devices for providing to the wearable computing device one or more functionalities;

a functionality use facilitating module configured to facilitate the wearable computing device to use the one or more functionalities provided by the one or more chosen functional devices; and one or more components to facilitate coupling the wearable computing device to a portion of the person's body.

* * * * *